(12) United States Patent
Behabtu et al.

(10) Patent No.: US 11,591,729 B2
(45) Date of Patent: Feb. 28, 2023

(54) NONWOVEN WEBS COMPRISING POLYSACCHARIDES

(71) Applicant: NUTRITION & BIOSCIENCES USA 4, INC., Rochester, NY (US)

(72) Inventors: Natnael Behabtu, Leiden (NL); Monica Harvey, Millersville, MD (US); Christian Peter Lenges, Wilmington, DE (US); Ian Robert Beardsall, Shifnal (GB)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 0 days.

(21) Appl. No.: 16/646,436

(22) PCT Filed: Sep. 11, 2018

(86) PCT No.: PCT/US2018/050428
§ 371 (c)(1),
(2) Date: Mar. 11, 2020

(87) PCT Pub. No.: WO2019/055397
PCT Pub. Date: Mar. 21, 2019

(65) Prior Publication Data
US 2020/0370216 A1 Nov. 26, 2020

Related U.S. Application Data

(60) Provisional application No. 62/557,837, filed on Sep. 13, 2017.

(51) Int. Cl.
*D04H 1/587* (2012.01)
*D04H 1/64* (2012.01)
(Continued)

(52) U.S. Cl.
CPC .............. *D04H 1/587* (2013.01); *C08L 5/02* (2013.01); *C08L 23/0853* (2013.01);
(Continued)

(58) Field of Classification Search
CPC ...... D04H 1/587; D04H 1/64; D04H 1/43832; D04H 1/43828; D04H 1/425;
(Continued)

(56) References Cited

U.S. PATENT DOCUMENTS

| | | | |
|---|---|---|---|
| 4,340,442 A * | 7/1982 | Hart | D01D 5/00 162/146 |
| 4,462,917 A | 7/1984 | Conway | |

(Continued)

FOREIGN PATENT DOCUMENTS

| | | |
|---|---|---|
| WO | 2015095358 A1 | 6/2015 |
| WO | 2016126685 A1 | 8/2016 |

(Continued)

OTHER PUBLICATIONS

International Preliminary Report for PCT/US18/50428 dated Mar. 17, 2020.

*Primary Examiner* — Jeremy R Pierce

(57) ABSTRACT

Disclosed herein are nonwoven webs comprising a nonwoven substrate and a binder comprising a polysaccharide. In one embodiment, the polysaccharide can comprise poly alpha-1,3-glucan, a poly alpha-1,3-glucan ether compound as disclosed herein, a poly alpha-1,3-glucan ester compound as disclosed herein, a graft copolymer comprising a backbone comprising dextran and poly alpha-1,3-glucan side chains, a crosslinked graft copolymer comprising a backbone comprising dextran and poly alpha-1,3-glucan chains, or a mixture thereof. Also disclosed are articles comprising the nonwoven webs, and methods of making the nonwoven webs.

18 Claims, 7 Drawing Sheets

(51) Int. Cl.
- *D06M 15/03* (2006.01)
- *C08L 51/02* (2006.01)
- *C08L 5/02* (2006.01)
- *D04H 1/4382* (2012.01)
- *C08L 23/08* (2006.01)
- *D04H 1/425* (2012.01)
- *D04H 1/4291* (2012.01)

(52) U.S. Cl.
CPC .............. *C08L 51/02* (2013.01); *D04H 1/425* (2013.01); *D04H 1/4291* (2013.01); *D04H 1/43828* (2020.05); *D04H 1/43832* (2020.05); *D04H 1/64* (2013.01); *D06M 15/03* (2013.01); *C08L 2312/00* (2013.01)

(58) Field of Classification Search
CPC ...... D04H 1/4291; D06M 15/03; C08L 51/02; C08L 5/02; C08L 23/0853
See application file for complete search history.

(56) References Cited

U.S. PATENT DOCUMENTS

| | | |
|---|---|---|
| 4,464,270 A | 8/1984 | Hollenbeak et al. |
| 4,477,360 A | 10/1984 | Almond |
| 4,799,550 A | 1/1989 | Harris et al. |
| 5,462,972 A | 10/1995 | Smith et al. |
| 5,486,576 A | 1/1996 | Larson et al. |
| 6,306,501 B1 * | 10/2001 | Furuta .................... B32B 27/10 428/411.1 |
| 6,821,331 B2 | 11/2004 | Damodaran |
| 7,000,000 B1 | 2/2006 | O'Brien |
| 7,871,640 B2 | 1/2011 | Flohr et al. |
| 8,361,926 B2 | 1/2013 | Tian et al. |
| 8,486,855 B2 | 7/2013 | Tian et al. |
| 8,642,757 B2 | 2/2014 | O'Brien |
| 8,859,758 B2 | 10/2014 | Frank et al. |
| 9,080,195 B2 | 7/2015 | O'Brien et al. |
| 9,139,718 B2 | 9/2015 | Paullin et al. |
| 2008/0112907 A1 | 5/2008 | Chan et al. |
| 2009/0170978 A1 * | 7/2009 | Kelly ....................... C08L 3/02 524/9 |
| 2012/0330258 A1 * | 12/2012 | Poruthoor ......... A61F 13/51405 493/320 |
| 2013/0244287 A1 | 9/2013 | O'Brien et al. |
| 2013/0244288 A1 | 9/2013 | O'Brien et al. |
| 2014/0087431 A1 * | 3/2014 | Payne .................. C12N 9/1048 435/97 |
| 2014/0179913 A1 | 6/2014 | Paullin et al. |
| 2015/0191550 A1 | 7/2015 | Mishra et al. |
| 2016/0175811 A1 | 6/2016 | Behabtu et al. |
| 2016/0177471 A1 | 6/2016 | Kraft et al. |
| 2016/0311935 A1 * | 10/2016 | Dennes .................. C11D 17/003 |
| 2017/0167063 A1 | 6/2017 | Behabtu |
| 2018/0320291 A1 | 11/2018 | Kraft et al. |

FOREIGN PATENT DOCUMENTS

| | | | |
|---|---|---|---|
| WO | 2016196022 A1 | 12/2016 | |
| WO | 2017003808 A1 | 1/2017 | |
| WO | 2017074862 A1 | 5/2017 | |
| WO | 2017079595 A1 | 5/2017 | |
| WO | 2017083244 A1 | 5/2017 | |
| WO | WO-2017079595 A1 * | 5/2017 | ......... C08B 37/0009 |
| WO | 2018152074 A1 | 8/2018 | |

\* cited by examiner

NONWOVEN WEBS COMPRISING POLYSACCHARIDES

CROSS-REFERENCE TO RELATED APPLICATIONS

This application is the National Stage application of International Application No. PCT/US2018/50428 (filed Sep. 11, 2018), which claims priority to and the benefit of U.S. Provisional Appl. No. 62/557,837 (filed Sep. 13, 20171), both of which prior applications are incorporated herein by reference in their entirety.

FIELD OF THE DISCLOSURE

The present disclosure is directed to nonwovens comprising a nonwoven substrate and a polysaccharide, and articles comprising such nonwovens. The polysaccharide can be used as an additive or as a binder to improve the strength of the nonwoven, or to improve the water absorbency and water transport properties of the nonwoven. Also disclosed are methods of making the nonwovens.

BACKGROUND

Nonwoven or tissue structures can be used for water absorption, for example in personal care products. When enhanced water absorption is desired in nonwoven or tissue structures a superabsorbent polymer, typically acrylate based, is used. The polymer is usually sandwiched between the layers of nonwoven or tissue and the structure is bound using a chemical binder, typically latex, to form a laminate or sheet structure. A disadvantage of using acrylate superabsorbent polymers is that they are not renewable or biodegradable. For some applications such as food packaging, fully biodegradable absorbent packaging can be made by stitching multiple plies of tissue together and laminating to a barrier film material. However, these materials typically can have limited absorption capacity, poor fluid retention, and can delaminate when wet.

Nonwoven structures can be used as a water wicking layer, for example in the acquisition distribution layer of diapers and feminine hygiene products. When enhanced wicking is required for these products, the nonwoven is typically coated with a surfactant, however, this can wash off over time and the performance can be reduced.

There is a continuing need for nonwoven or tissue structures which can provide enhanced water absorption and which contain materials that are made from renewable resources. There is a need for nonwoven or tissue structures with increased water absorption and improved strength, and which are fully renewable and biodegradable under appropriate conditions. There is a continuing need for nonwovens with enhanced water transport and wicking properties that have a sustained performance.

SUMMARY

The disclosure relates to nonwoven webs comprising a nonwoven substrate and a binder comprising a polysaccharide, as well as methods of making the nonwoven webs.

In one embodiment, a nonwoven web is disclosed, the nonwoven web comprising:
a nonwoven substrate and a binder comprising a polysaccharide, wherein the polysaccharide comprises:
a) poly alpha-1,3-glucan;
b) a poly alpha-1,3-glucan ether compound represented by Structure I:

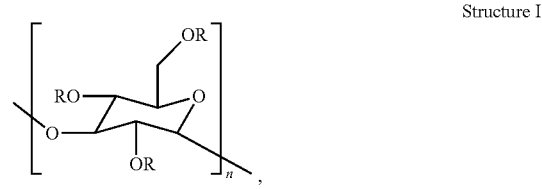

Structure I wherein
(i) n is at least 6,
(ii) each R is independently an H or a positively charged organic group, and
(iii) the compound has a degree of substitution of about 0.001 to about 3.0;
c) a graft copolymer comprising:
(i) a backbone comprising dextran with a weight-average molecular weight (Mw) of at least about 100000 Daltons, and
(ii) poly alpha-1,3-glucan side chains comprising at least about 95% alpha-1,3-glucosidic linkages;
d) a crosslinked graft copolymer, wherein the graft copolymer portion of the crosslinked graft copolymer comprises:
(i) a backbone comprising dextran, and
(ii) poly alpha-1,3-glucan side chains comprising at least about 50% alpha-1,3-glucosidic linkages;
e) a poly alpha-1,3-glucan ester compound represented by Structure III:

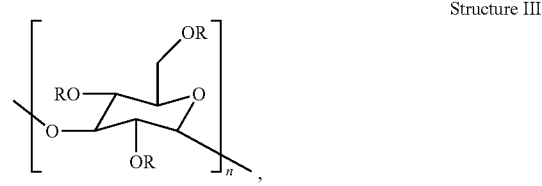

Structure III wherein
(i) n is at least 6;
(ii) each R is independently an —H or a first group comprising —CO—$C_x$—COOH, wherein the —$C_x$— portion of said first group comprises a chain of 2 to 6 carbon atoms; and
(iii) the compound has a degree of substitution with the first group of about 0.001 to about 3; or
f) a combination thereof.

In one embodiment, the polysaccharide is in the form of fibrids. In another embodiment, the polysaccharide comprises poly alpha-1,3-glucan. In an additional embodiment, the polysaccharide comprises a poly alpha-1,3-glucan ether compound represented by Structure I as defined herein, and the positively charged organic group comprises a trimethyl ammonium group or a quaternary ammonium hydroxypropyl group. In yet another embodiment, the polysaccharide comprises:

a) a graft copolymer comprising:
  (i) a backbone comprising dextran with a weight-average molecular weight (Mw) of at least about 100000 Daltons, and
  (ii) poly alpha-1,3-glucan side chains comprising at least about 95% alpha-1,3-glucosidic linkages; and/or
b) a crosslinked graft copolymer, wherein the graft copolymer portion of the crosslinked graft copolymer comprises:
  (i) a backbone comprising dextran, and
  (ii) poly alpha-1,3-glucan side chains comprising at least about 50% alpha-1,3-glucosidic linkages.

In a further embodiment, the polysaccharide comprises a poly alpha-1,3-glucan ester compound represented by Structure III as defined herein.

In one embodiment, the nonwoven substrate is an airlaid nonwoven substrate, a multi-bonded airlaid nonwoven substrate, a carded nonwoven substrate, a wet laid nonwoven substrate, a spun lace nonwoven substrate, a meltblown nonwoven substrate, or a spun bond nonwoven substrate. In another embodiment, the nonwoven substrate comprises natural fibers; synthetic fibers comprising rayon, polyester, polyamide, polyolefin, or combinations thereof; bicomponent fibers; or combinations thereof.

In a further embodiment, the binder further comprises a polymeric component comprising a polymer polymerized from one or more of acrylic monomers, vinyl monomers, styrene monomers, or a combination thereof. In yet another embodiment, the web comprises the binder in an amount from about 0.5 weight percent to about 50 weight percent, based on the total weight of the nonwoven substrate and the binder.

In one embodiment of the nonwoven web, the nonwoven substrate comprises cellulosic fibers, the polysaccharide comprises poly alpha-1,3-glucan, and the binder further comprises vinyl acetate ethylene copolymer.

In an additional embodiment of the nonwoven web, the polysaccharide comprises:
a) a graft copolymer comprising:
  (i) a backbone comprising dextran with a weight-average molecular weight (Mw) of at least about 100000 Daltons, and
  (ii) poly alpha-1,3-glucan side chains comprising at least about 95% alpha-1,3-glucosidic linkages; and/or
b) a crosslinked graft copolymer, wherein the graft copolymer portion of the crosslinked graft copolymer comprises:
  (i) a backbone comprising dextran, and
  (ii) poly alpha-1,3-glucan side chains comprising at least about 50% alpha-1,3-glucosidic linkages; and the nonwoven substrate comprises bicomponent fibers having a side-by-side or sheath/core orientation, and the bicomponent fibers comprise a polyethylene/polyethylene terephthalate composition or at least one of polyolefin, polytetrafluoroethylene, polyester, polyvinyl acetate, polyvinyl chloride acetate, polyvinyl butyral, acrylic resins, polymethylacrylate, polymethylmethacrylate, polyimide, polyvinyl chloride, polyvinylidene chloride, polystyrene, polyvinyl alcohol, polyurethane, or cellulosic resins.

In yet another embodiment, a process for preparing a nonwoven web is disclosed, the process comprising the steps:
a) providing a nonwoven substrate comprising a first surface;
b) contacting the first surface with a polysaccharide and with a polymeric component to form a coated nonwoven substrate;
c) heating the coated nonwoven substrate at a temperature in the range of about 90° C. to about 170° C. to form a bonded nonwoven web; and
d) optionally, calendaring the bonded nonwoven web.

In an additional embodiment, a process for preparing a nonwoven web is disclosed, the process comprising the steps:
a) providing a nonwoven substrate having a first surface and comprising side-by-side or sheath/core bicomponent fibers comprising a polyethylene/polyethylene terephthalate composition or at least one of polyolefin, polytetrafluoroethylene, polyester, polyvinyl acetate, polyvinyl chloride acetate, polyvinyl butyral, acrylic resins, polymethylacrylate, polymethylmethacrylate, polyamide, polyvinyl chloride, polyvinylidene chloride, polystyrene, polyvinyl alcohol, polyurethane, or cellulosic resins;
b) providing a polysaccharide comprising:
  A) a graft copolymer comprising:
    (i) a backbone comprising dextran with a weight-average molecular weight (Mw) of at least about 100000 Daltons, and
    (ii) poly alpha-1,3-glucan side chains comprising at least about 95% alpha-1,3-glucosidic linkages; and/or
  B) a crosslinked graft copolymer, wherein the graft copolymer portion of the crosslinked graft copolymer comprises:
    (i) a backbone comprising dextran, and
    (ii) poly alpha-1,3-glucan side chains comprising at least about 50% alpha-1,3-glucosidic linkages;
c) contacting at least a portion of the first surface of the nonwoven substrate with the polysaccharide;
d) heating the material obtained in step c) at a temperature in the range of about 90° C. to about 170° C. to form a bonded nonwoven web comprising the polysaccharide; and
e) optionally, calendaring the bonded nonwoven web obtained in step d).

In one embodiment of the process, step c) further comprises adding water to the polysaccharide and/or to the surface of the nonwoven substrate. In another embodiment of the process, step c) further comprises adding bicomponent fibers to the polysaccharide and/or to at least a portion of the first surface of the nonwoven substrate.

Also disclosed are articles comprising the nonwoven webs. In one embodiment, the article is an absorbing wipe; paper towel; tissue; napkin; or a component of a personal care product, household product, agricultural product, or medical product. In another embodiment, article is a laminate or a pouched laminate.

BRIEF DESCRIPTION OF THE DRAWINGS

The disclosure is illustrated by way of example and not limited to the accompanying figures.

DETAILED DESCRIPTION

Figure 1:
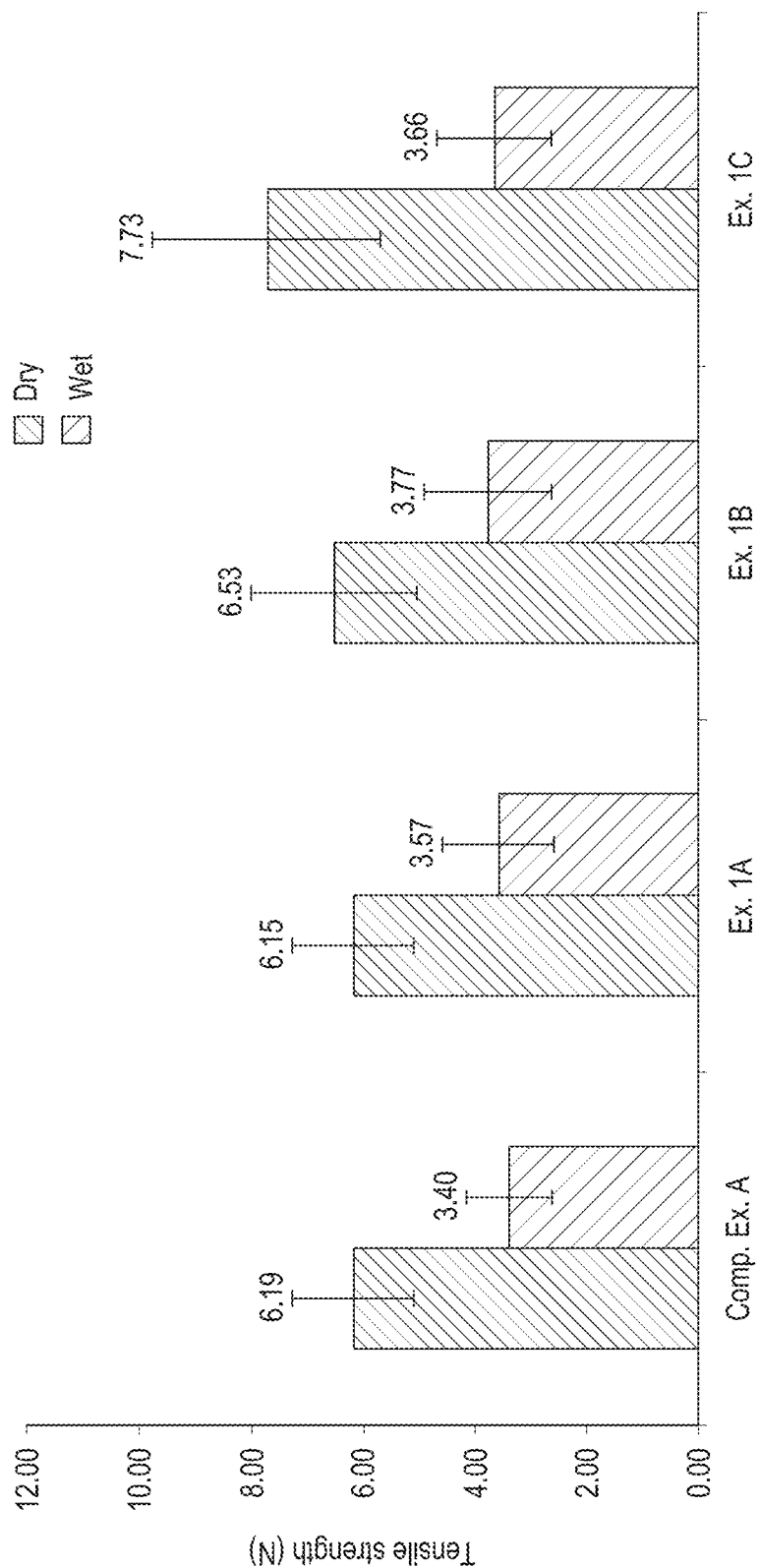
FIG. 1 is a graphical representation of the dry and wet tensile strength of the bonded airlaid nonwovens of Comparative Example A and Examples 1A (80:20), 1B (70:30), and 1C (65:35).

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

Unless otherwise disclosed, the terms "a" and "an" as used herein are intended to encompass one or more (i.e., at least one) of a referenced feature.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The term "copolymer" herein refers to a polymer comprising at least two different types of alpha-glucan, such as dextran and poly alpha-1,3-glucan.

The terms "graft copolymer", "branched copolymer" and the like herein generally refer to a copolymer comprising a "backbone" (or "main chain") and side chains branching from the backbone. The side chains are structurally distinct from the backbone. Examples of graft copolymers herein comprise a backbone comprising dextran with a Mw of at least about 100000 Daltons, and side chains of poly alpha-1,3-glucan comprising at least about 95% alpha-1,3-glucosidic linkages. In some aspects, a dextran backbone can have a poly alpha-1,3-glucan extension, since the non-reducing end of dextran can prime poly alpha-1,3-glucan synthesis by a glucosyltransferase enzyme. A backbone can thus be a dextran-poly alpha-1,3-glucan linear copolymer in some instances. A backbone in some aspects can itself be a branched structure as disclosed below; the addition of poly alpha-1,3-glucan to such a backbone increases the branching of the original branched structure.

The terms "poly alpha-1,3-glucan side chain" and "poly alpha-1,3-glucan branch" can be used interchangeably herein. A poly alpha-1,3-glucan side chain is typically an extension of a dextran branch (e.g., pendant glucose or short chain), since a dextran branch has a non-reducing end that can prime poly alpha-1,3-glucan synthesis by a glucosyltransferase enzyme.

"Poly alpha-1,3-glucan homopolymer" and like terms as used herein refer to poly alpha-1,3-glucan that is not part of (i) a graft copolymer or (ii) part of a dextran-poly alpha-1,3-glucan linear copolymer.

The terms "alpha-glucan", "alpha-glucan polymer" and the like are used interchangeably herein. An alpha-glucan is a polymer comprising glucose monomeric units linked together by alpha-glucosidic linkages. Dextran and poly alpha-1,3-glucan are examples of alpha-glucans.

The terms "glycosidic linkage", "glycosidic bond" and the like are used interchangeably herein and refer to the covalent bond that joins a carbohydrate molecule to another carbohydrate molecule. The terms "glucosidic linkage", "glucosidic bond" and the like are used interchangeably herein and refer to a glycosidic linkage between two glucose molecules. The term "alpha-1,6-glucosidic linkage" as used herein refers to the covalent bond that joins alpha-D-glucose molecules to each other through carbons 1 and 6 on adjacent alpha-D-glucose rings. The term "alpha-1,3-glucosidic linkage" as used herein refers to the covalent bond that joins alpha-D-glucose molecules to each other through carbons 1 and 3 on adjacent alpha-D-glucose rings. The term "alpha-1,2-glucosidic linkage" as used herein refers to the covalent bond that joins alpha-D-glucose molecules to each other through carbons 1 and 2 on adjacent alpha-D-glucose rings. The term "alpha-1,4-glucosidic linkage" as used herein refers to the covalent bond that joins alpha-D-glucose molecules to each other through carbons 1 and 4 on adjacent alpha-D-glucose rings. Herein, "alpha-D-glucose" will be referred to as "glucose." All glycosidic linkages disclosed herein are alpha-glucosidic linkages, except as otherwise noted.

The phrase "poly alpha-1,3-glucan" means a polysaccharide comprising glucose monomer units linked together by glycosidic linkages wherein at least 50% of the glycosidic linkages are α-1,3-glycosidic linkages. In other embodiments, the percentage of α-1,3-glycosidic linkages can be greater than or equal to 90%, 95%, 96%, 97%, 98%, 99% or 100% (or any integer value between 50% and 100%). Accordingly, the α-(1,3→glucan) polymer comprises less than or equal to 10%, 5%, 4%, 3%, 2%, 1% or 0% of glycosidic linkages that are not α-1,3-glycosidic linkages. The poly alpha-1,3-glucan polymer also has a number average degree of polymerization in the range of from 10 to 600,000, for example 55 to 10,000 or 200 to 600,000.

The terms "dextran", "dextran polymer", "dextran molecule" and the like are used interchangeably herein and refer to an alpha-glucan generally comprising a main chain with substantially (mostly) alpha-1,6-linked glucose monomers, with periodic branches linked to the main chain by alpha-1,3, alpha-1,2, and/or alpha-1,4 linkages.

A dextran main chain herein comprises more than about 90-95% of all the glucose monomers of a dextran polymer in some aspects. A dextran main chain in some instances can comprise substantially [or mostly] alpha-1,6 linkages, meaning that it can have at least about 98.0% alpha-1,6 linkages. A dextran main chain can comprise a small amount of alpha-1,3 linkages in some aspects, meaning that it can have less than about 2.0% alpha-1,3 linkages.

Dextran branches typically are short, being one (pendant) to three glucose monomers in length, and comprise less than about 10% of all the glucose monomers of a dextran polymer. Such short branches can comprise alpha-1,2-, alpha-1,3-, and/or alpha-1,4-glucosidic linkages. Dextran in some embodiments can also have branches comprising mostly alpha-1,6 linkages. The length of such a branch can be similar to the length of the chain from which the branch originates.

The glycosidic linkage profile of an alpha-glucan herein can be determined using any method known in the art. For example, a linkage profile can be determined using methods that use nuclear magnetic resonance (NMR) spectroscopy (e.g., $^{13}$C NMR or $^{1}$H NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, Fla., 2005), which is incorporated herein by reference.

The term "degree of substitution" (DoS) as used herein refers to the average number of hydroxyl groups substituted in each monomeric unit (glucose) of a derivatized poly alpha-1,3-glucan compound, for example a poly alpha-1,3-glucan ether or ester compound.

The "molecular weight" of dextran herein can be represented as number-average molecular weight (Mn) or as weight-average molecular weight (Mw), the units of which are in Daltons or grams/mole. Alternatively, molecular weight can be represented as DPw (weight average degree of polymerization) or DPn (number average degree of polymerization). Various means are known in the art for calculating these molecular weight measurements such as with high-pressure liquid chromatography (HPLC), size exclusion chromatography (SEC), or gel permeation chromatography (GPC).

The term "absorb" as used herein refers to the action of taking up (soaking up) an aqueous liquid. Absorption by a composition as presently disclosed can be measured in terms of water retention value (WRV), or as g aqueous liquid/g graft copolymer (the maximum amount of aqueous liquid that can be soaked into and retained by a certain amount of graft copolymer), for example. WRV can be calculated with respect to any aqueous liquid herein using the following formula, for example: ((mass of wet polymer−mass of dry polymer)/mass of dry polymer)*100.

The terms "aqueous liquid", "aqueous fluid" and the like as used herein can refer to water or an aqueous solution. An "aqueous solution" herein can comprise one or more dissolved salts, where the maximal total salt concentration can be about 3.5 wt % in some embodiments. Although aqueous liquids herein typically comprise water as the only solvent in the liquid, an aqueous liquid can optionally comprise one or more other solvents (e.g., polar organic solvent) that are miscible in water. Thus, an aqueous solution can comprise a solvent having at least about 10 wt % water.

The term "starch" means a polymeric carbohydrate consisting of amylose and amylopectin.

The term "hydroxyalkyl starch" means an ether derivative of partially hydrolyzed natural starches, in which hydroxyl groups in the starch are hydroxyl alkylated.

As used herein, the term "nonwoven substrate" means a web having a physical structure of individual fibers or filaments which are interlaid in a generally random manner rather than in a regular, identifiable manner as in a knitted or woven fabric. The fibers or filaments can comprise natural fibers, synthetic fibers, or a combination thereof.

As used herein, the term "nonwoven web" encompasses sheet or web structures comprising one or more nonwoven substrates bonded together by entangling fiber or filaments mechanically, thermally, or chemically. Many medical care, protective, mortuary, and veterinary products are partially or wholly constructed of nonwoven web materials. Examples of such products include personal hygiene wipes, diapers, training pants, swimwear, incontinence garments, pads, sanitary napkins, as well as antimicrobial surgical gowns and bandages, and protective workwear garments such as coveralls and lab coats. As used herein, the term "nonwoven web" refers to a nonwoven substrate in combination with a polysaccharide, wherein the polysaccharide may be present in a binder, in a coating, or as an additive to at least one surface of a nonwoven substrate.

As used herein, the term "airlaid nonwoven" refers to a nonwoven fabric made by an air-forming process in which the fibers are distributed by air currents to give a random orientation within the web and a fabric with isotropic properties.

As used herein, the term "multi-bonded airlaid nonwoven" refers to a nonwoven fabric made by an air-forming process and bonded with a combination of latex and thermal bonding; typically bicomponent fibers are incorporated within the web for thermal bonding and the outer surfaces of the web are bonded with latex to reduce dusting.

As used herein the term "carded nonwoven" refers to a nonwoven fabric made by a carding process in which the fibers are combed into a web by a carding machine; the carded web is typically bonded by one or more techniques to provide fabric integrity.

As used herein, the term "wet laid nonwoven" refers to a nonwoven fabric made by a wet-forming process in which a nonwoven fabric web is produced from an aqueous suspension of fibers by filtering the short fibers onto a screen belt or perforated drum; the short fibers typically have more random orientation in the web and the web has more isotropic properties than carded webs.

As used herein, the term "spun lace nonwoven" refers to a nonwoven fabric produced by entangling fibers in a repeating pattern to form a strong fabric free of binders.

As used herein, the term "meltblown nonwoven" refers to a nonwoven fabric formed by extruding molten polymer through a die then attenuating and breaking the resulting filaments with hot, high-velocity air or steam, resulting in short fiber lengths; the short fibers are then collected on a moving screen where they bond during cooling.

As used herein, the term "spun bond nonwoven" refers to a nonwoven fabric formed by filaments that have been extruded, drawn, then laid on a continuous belt; bonding is accomplished by methods such as by hot-roll calendering or by passing the web through a saturated-steam chamber at an elevated pressure.

As used herein, the term "binder" refers to a material which binds fibers together in a nonwoven substrate or a nonwoven web, or which binds one nonwoven substrate to another nonwoven substrate, or one nonwoven web to another nonwoven web. In one embodiment, a binder is an adhesive material applied as a solid, a solution, or a latex composition to a nonwoven substrate or nonwoven web. In another embodiment, a binder can be a soften-able polymeric material which functions as an adhesive upon melting and re-solidifying.

The phrase "consists essentially of" means that the composition contains all of the recited components and less than 5% by weight, based on the total weight of the composition of any other component or combination of components. For example, a composition consisting essentially of A and B must contain at least 95% by weight of A and B and no more than 5% by weight of any other component or combination components, wherein the percentage by weight is based on the total weight of the composition. In other embodiments, the phrase consisting essentially of means that the composition contains less than 4% or 3% or 2% or 1% or less than 0.5% by weight of the components that are not recited, based on the total weight of the composition.

The present disclosure is directed to nonwoven webs comprising a nonwoven substrate and a polysaccharide. In a first embodiment, a nonwoven web comprises a nonwoven substrate and a binder comprising a polysaccharide as disclosed herein below. The nonwoven substrate can be an airlaid, multi-bonded airlaid, carded, wet laid, spun lace, meltblown, or spun bond nonwoven substrate. The polysaccharide polysaccharide comprises:

a) poly alpha-1,3-glucan;
b) a poly alpha-1,3-glucan ether compound represented by Structure I:

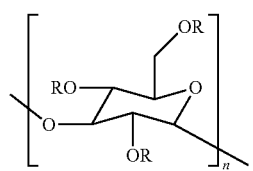

Structure I wherein
(i) n is at least 6,
(ii) each R is independently an H or a positively charged organic group, and
(iii) the compound has a degree of substitution of about 0.001 to about 3.0;
c) a graft copolymer comprising:
(i) a backbone comprising dextran with a weight-average molecular weight (Mw) of at least about 100000 Daltons, and
(ii) poly alpha-1,3-glucan side chains comprising at least about 95% alpha-1,3-glucosidic linkages;
d) a crosslinked graft copolymer, wherein the graft copolymer portion of the crosslinked graft copolymer comprises:
(i) a backbone comprising dextran, and
(ii) poly alpha-1,3-glucan side chains comprising at least about 50% alpha-1,3-glucosidic linkages;
e) a poly alpha-1,3-glucan ester compound represented by Structure III:

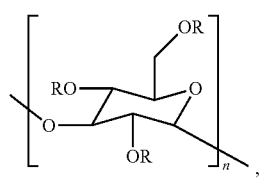

Structure III wherein
(i) n is at least 6;
(ii) each R is independently an —H or a first group comprising —CO—$C_x$—COOH, wherein the —$C_x$— portion of said first group comprises a chain of 2 to 6 carbon atoms; and
(iii) the compound has a degree of substitution with the first group of about 0.001 to about 3; or
f) a combination thereof.

In some embodiments, the ether compound represented by Structure I has a degree of substitution of about 0.05 to about 3.0. In some embodiments, the ether compound contains a positively charged organic group comprising a trimethylammonium group or a quaternary ammonium hydroxypropyl group. In some embodiment, the ester compound represented by Structure III has a degree of substitution of about 0.05 to about 3.

If desired, the nonwoven substrate can comprise only natural fibers, in which case the nonwoven webs comprising a nonwoven substrate and a polysaccharide can be fully renewable and biodegradable under appropriate conditions. Alternatively, the nonwoven substrate can comprise synthetic fibers, for example rayon, polyester, polyamide, polyolefin, or combinations thereof. Optionally, the nonwoven substrate can comprise bicomponent fibers. The nonwoven substrate can also comprise a combination of natural fibers, synthetic fibers, and bicomponent fibers. Nonwoven webs as disclosed herein can also have improved properties, such as improved wet or dry strength, improved water absorption, and/or improved water retention relative to those properties for a corresponding nonwoven web of analogous composition but lacking the polysaccharide component.

In one embodiment, the polysaccharide can function as a binder for the nonwoven, and can improve the dry strength of the nonwoven, and in some cases the wet strength of the nonwoven. In one embodiment, the polysaccharide can function as a coating on the nonwoven. In another embodiment, the polysaccharide can function as both a coating and also a binder. In yet another embodiment, the polysaccharide can provide improved moisture management, water absorbency, and/or water transport properties to the nonwoven web.

Nonwoven webs as disclosed herein can also comprise at least one additive. Useful additives can include, for example, suspension aids, thickening agents, parting agents, penetrating agents, wetting agents, thermal gelling agents, sizing agents, defoaming agents, foam suppressors, blowing gents, coloring agents, oxidation inhibitors, quenchers, antimicrobial agents such as biocides and fungicides, dispersants, antistatic agents, cross linking agents, lubricants, plasticizers, pH regulators, flow modifiers, setting promoters, and water-proofing agents. The at least one additive can be used in an amount which imparts the desired property to the nonwoven web.

Airlaid, multi-bonded airlaid, carded, wet laid, spun lace, meltblown, and spun bond nonwoven substrates can each be made using techniques known in the art. The nonwoven substrates can comprise natural fibers, synthetic fibers, or a combination thereof. Bicomponent fibers can also be used. Useful natural fibers include animal fibers such as wool, silk, fur, and hair; and vegetable fibers such as cellulose, cotton, flax, linen, and hemp. In one embodiment, the nonwoven substrate comprises cellulosic fibers, such as fluff pulp fibers. Examples of synthetic fibers include rayon, lyocell, polysaccharides, polyolefin, polyester, and polyamide. Useful polyolefin fibers include polyethylene, polypropylene, and blends thereof. Useful polyester fibers include polyethylene terephthalate, polytrimethylene terephthalate, polybutylene terephthalate, and blends thereof. In one embodiment, the nonwoven substrate comprises cellulose fibers. In one embodiment, the nonwoven substrate comprises polyethylene terephthalate fibers. In one embodiment, the nonwoven substrate comprises polytrimethylene terephthalate fibers. In one embodiment, the nonwoven substrate comprises polyamide fibers. In one embodiment, the nonwoven substrate comprises polyolefin fibers.

In one embodiment, an air laid nonwoven substrate comprises natural fibers, and further comprises synthetic fibers. Useful synthetic fibers include rayon, polyester, polyamide, and polyolefin fibers. In one embodiment, an air laid nonwoven substrate comprises cellulosic fibers. In one embodiment, an air laid nonwoven substrate comprises cellulosic fibers, and further comprises rayon fibers. In one embodiment, an air laid nonwoven substrate comprises cellulosic fibers, and further comprises polyester fibers. In one embodiment, an air laid nonwoven substrate comprises cellulosic fibers, and further comprises polyamide fibers. In one embodiment, an air laid nonwoven substrate comprises cellulosic fibers, and further comprises polyolefin fibers.

In another embodiment, the nonwoven substrate comprises bicomponent fibers having a side-by-side or sheath/core orientation. The bicomponent fibers can comprise a polyethylene/polyethylene terephthalate composition, or at least one of polyolefin, polytetrafluoroethylene, polyester, polyvinyl acetate, polyvinyl chloride acetate, polyvinyl butyral, acrylic resins, polymethylacrylate, polymethylmethacrylate, polyimide, polyvinyl chloride, polyvinylidene chloride, polystyrene, polyvinyl alcohol, polyurethane, or cellulosic resins.

In some embodiments, the polysaccharide comprises poly alpha-1,3-glucan, that is, poly alpha-1,3-glucan as a homopolymer [to distinguish from a) a graft copolymer comprising a backbone comprising dextran and poly alpha-1,3-glucan side chains, and from b) a crosslinked graft copolymer wherein the graft copolymer portion comprises a backbone comprising dextran, and poly alpha-1,3-glucan side chains, as disclosed herein below]. Poly alpha-1,3-glucan can be enzymatically produced from sucrose using one or more glucosyltransferase (gtf) enzymes, as described in U.S. Pat. Nos. 7,000,000; 8,642,757; and 9,080,195, for example. Using the procedures given therein, the polymer is made directly in a one-step enzymatic reaction using a recombinant glucosyltransferase enzyme, for example the gtfJ enzyme, as the catalyst and sucrose as the substrate. The poly alpha-1,3-glucan is produced with fructose as the by-product. As the reaction progresses, the poly alpha-1,3-glucan precipitates from solution.

The term "glucan" herein refers to a polysaccharide of D-glucose monomers that are linked by glycosidic linkages. Poly alpha-1,3-glucan is a polymer comprising glucose monomeric units linked together by glycosidic linkages, wherein at least 50% of the glycosidic linkages are alpha-1,3-glycosidic linkages. Poly alpha-1,3-glucan is a type of polysaccharide. The structure of poly alpha-1,3-glucan can be illustrated as follows:

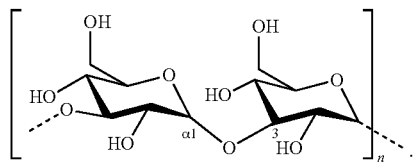

The process to produce poly alpha-1,3-glucan from sucrose using, for example, a glucosyl transferase enzyme, can result in a slurry of the poly alpha-1,3-glucan in water. The slurry can be filtered to remove some of the water, giving the solid poly alpha-1,3-glucan as a wet cake containing in the range of from 30 to 50 percent by weight of poly alpha-1,3-glucan, with the remainder being water. In some embodiments, the wet cake comprises in the range of from 35 to 45 percent by weight of the poly alpha-1,3-glucan. The wet cake can be washed with water to remove any water soluble impurities, for example, sucrose, fructose, or phosphate buffers. In some embodiments, the wet cake comprising the poly alpha-1,3-glucan can be used as is. In other embodiments, the wet cake can be further dried under reduced pressure, at elevated temperature, by freeze drying, or a combination thereof, to give a powder comprising greater than or equal to 50 percent by weight of the poly alpha-1,3-glucan. In some embodiments, the poly alpha-1,3-glucan can be a powder, comprising less than or equal to 20 percent by weight water. In other embodiments, the poly alpha-1,3-glucan can be a dry powder comprising less than or equal to 15, 14, 13, 12, 11, 10, 9, 8, 7, 6, 5, 4, 3, 2, or 1 percent by weight water.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1% or 0% (or any integer value between 0% and 50%) of glycosidic linkages that are not alpha-1,3.

The "molecular weight" of poly alpha-1,3-glucan can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

The poly alpha-1,3-glucan may have a weight average degree of polymerisation (DPw) of at least about 400. In some embodiments, the poly alpha-1,3-glucan has a DPw of from about 400 to about 1400, or from about 400 to about 1000, or from about 500 to about 900.

In some embodiments, the polysaccharide comprises a poly alpha 1,3-glucan ether compound represented by Structure I:

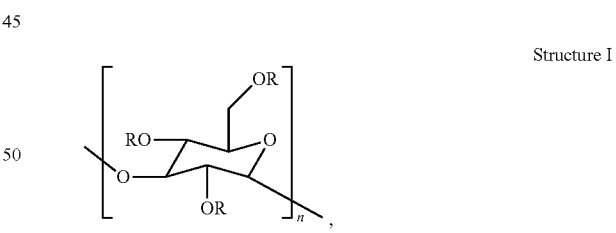

Structure I wherein
(i) n is at least 6,
(ii) each R is independently an H or a positively charged organic group, and
(iii) the compound has a degree of substitution of about 0.001 to about 3.0.

Such alpha-1,3-glucan ether compounds but having a degree of substitution of about 0.05 to about 3.0 and methods of preparing them are disclosed in published patent application WO 2015/095358, which is herein incorporated by reference in its entirety. To prepare ether compounds having a degree of substitution below about 0.05, less etherification agent relative to the glucan can be used.

The degree of substitution (DoS) of a poly alpha-1,3-glucan ether compound disclosed herein can be in the range of from about 0.001 to about 3.0. Alternatively, the DoS can be in the range of from about 0.05 to about 3.0, or from about 0.001 to about 0.3, or from about 0.2 to about 3.0. Alternatively still, the DoS can be about 0.001, 0.002, 0.003, 0.004, 0.005, 0.006, 0.007, 0.008, 0,009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 (or any value between 0.001 and 3). It would be understood by those skilled in the art that since a poly alpha-1,3-glucan ether compound herein has a degree of substitution between about 0.001 to about 3.0, and by virtue of being an ether, the R groups of the compound cannot only be hydrogen.

A positively charged organic group comprises a chain of one or more carbons having one or more hydrogens substituted with another atom or functional group, where one or more of the substitutions is with a positively charged group.

A positively charged group may be a substituted ammonium group, for example. Examples of substituted ammonium groups are primary, secondary, tertiary and quaternary ammonium groups. The terms "substituted ammonium group", "substituted ammonium ion" and "substituted ammonium cation" are used interchangeably herein. A substituted ammonium group herein comprises Structure II:

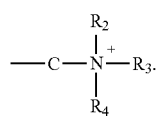

Structure II $R_2$, $R_3$ and $R_4$ in Structure II each independently represent a hydrogen atom or an alkyl, aryl, cycloalkyl, aralkyl, or alkaryl group. The carbon atom (C) in Structure II is part of the chain of one or more carbons ("carbon chain") of the positively charged organic group. The carbon atom is either directly ether-linked to a glucose monomer of poly alpha-1,3-glucan, or is part of a chain of two or more carbon atoms ether-linked to a glucose monomer of poly alpha-1,3-glucan. The carbon atom in Structure II can be —$CH_2$—, —CH— (where a H is substituted with another group such as a hydroxy group), or —C— (where both H's are substituted).

The nitrogen atom in a substituted ammonium group represented by Structure II is bonded to a chain of one or more carbons as comprised in a positively charged organic group. This chain of one or more carbons ("carbon chain") is ether-linked to a glucose monomer of poly alpha-1,3-glucan, and may have one or more substitutions in addition to the substitution with the nitrogen atom of the substituted ammonium group. There can be 1, 2, 3, 4, 5, 6, 7, 8, 9 or 10 carbons, for example, in a carbon chain herein.

Examples of a carbon chain of a positively charged organic group that do not have a substitution in addition to the substitution with a positively charged group include —$CH_2$—, —$CH_2CH_2$—, —$CH_2CH_2CH_2$—, —$CH_2CH_2CH_2CH_2$— and —$CH_2CH_2CH_2CH_2CH_2$—. In each of these examples, the first carbon atom of the chain is ether-linked to a glucose monomer of poly alpha-1,3-glucan, and the last carbon atom of the chain is linked to a positively charged group. Where the positively charged group is a substituted ammonium group, the last carbon atom of the chain in each of these examples is represented by the C in Structure II.

Where a carbon chain of a positively charged organic group has a substitution in addition to a substitution with a positively charged group, such additional substitution may be with one or more hydroxyl groups, oxygen atoms (thereby forming an aldehyde or ketone group), alkyl groups (e.g., methyl, ethyl, propyl, butyl), and/or additional positively charged groups. A positively charged group is typically bonded to the terminal carbon atom of the carbon chain.

Examples of a carbon chain having one or more substitutions with a hydroxyl group include hydroxyalkyl (e.g., hydroxyethyl, hydroxypropyl, hydroxybutyl, hydroxypentyl) groups and dihydroxyalkyl (e.g., dihydroxyethyl, dihydroxypropyl, dihydroxybutyl, dihydroxypentyl) groups. Examples of hydroxyalkyl and dihydroxyalkyl (diol) carbon chains include —CH(OH)—, —CH(OH)$CH_2$—, —C(OH)$_2CH_2$—, —$CH_2$CH(OH)$CH_2$—, —CH(OH)$CH_2CH_2$—, —CH(OH)CH(OH)$CH_2$—, —$CH_2CH_2$CH(OH)$CH_2$—, —$CH_2$CH(OH)$CH_2CH_2$—, —CH(OH)$CH_2CH_2CH_2$—, —$CH_2$CH(OH)CH(OH)$CH_2$—, —CH(OH)CH(OH)$CH_2CH_2$— and —CH(OH)$CH_2$CH(OH)$CH_2$—. In each of these examples, the first carbon atom of the chain is ether-linked to a glucose monomer of poly alpha-1,3-glucan, and the last carbon atom of the chain is linked to a positively charged group. Where the positively charged group is a substituted ammonium group, the last carbon atom of the chain in each of these examples is represented by the C in Structure II.

Examples of a carbon chain having one or more substitutions with an alkyl group include chains with one or more substituent methyl, ethyl and/or propyl groups. Examples of methylalkyl groups include —CH($CH_3$)$CH_2CH_2$— and —$CH_2$CH($CH_3$)$CH_2$—, which are both propyl groups having a methyl substitution. In each of these examples, the first carbon atom of the chain is ether-linked to a glucose monomer of poly alpha-1,3-glucan, and the last carbon atom of the chain is linked to a positively charged group. Where the positively charged group is a substituted ammonium group, the last carbon atom of the chain in each of these examples is represented by the C in Structure II.

Poly alpha-1,3-glucan ether compounds in certain embodiments may contain one type of positively charged organic group as an R group. For example, one or more positively charged organic groups ether-linked to the glucose monomer of poly alpha-1,3-glucan may be trimethylammonium hydroxypropyl groups; the R groups in this particular example would thus independently be hydrogen and trimethylammonium hydroxypropyl groups. Alternatively, poly alpha-1,3-glucan ether compounds disclosed herein can contain two or more different types of positively charged organic groups as R groups.

In one embodiment the polysaccharide comprises a poly alpha-1,3-glucan ether compound wherein at least one positively charged organic group comprises a substituted ammonium group. In one embodiment, the positively charged organic group comprises a trimethylammonium group. In another embodiment, the positively charged organic group is a quaternary ammonium group. In a further embodiment, at least one positively charged organic group comprises an alkyl group or hydroxy alkyl group. In yet another embodiment, at least one positively charged organic group is a quaternary ammonium hydroxypropyl group.

In one embodiment, the polysaccharide comprises poly alpha-1,3-glucan in the form of a graft copolymer. In one embodiment a composition comprising a graft copolymer comprises:

(i) a backbone comprising dextran with a weight-average molecular weight (Mw) of at least about 100000 Daltons, and (ii) poly alpha-1,3-glucan side chains comprising at least about 95% alpha-1,3-glucosidic linkages. Such graft copolymers and methods for preparing the graft copolymers are disclosed in published patent application WO 2017/079595, which is incorporated herein by reference in its entirety.

A dextran that forms the backbone of a graft copolymer herein can comprise, for example, about or at least about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% alpha-1,6-glucosidic linkages. Such a percent alpha-1,6 linkage profile is that taking account the total of all linkages in the dextran (main chain and branch portions combined). "Dextran branches" and like terms herein are meant to encompass any branches that exist in a dextran polymer prior to its use to prepare a graft copolymer as presently disclosed. In some embodiments, a dextran comprises a main chain comprising about, or at least about, 90%, 91%, 92%, 93%, 94%, 95%, 96%, 97%, 98%, 99%, or 100% alpha-1,6-glucosidic linkages.

A dextran herein can comprise, for example, about or at least about 1%, 2%, 3%, 4%, 5%, 6%, 7%, 8%, 9%, 10%, 11%, 12%, 13%, 14%, 15%, 16%, 17%, 18%, 19%, or 20% alpha-1,4, alpha-1,3 and/or alpha-1,2 glucosidic linkages. Typically, such linkages exist entirely, or almost entirely, in branch portions of the dextran, including branch points. In some embodiments, dextran branches may comprise one, two (e.g., alpha-1,4 and alpha-1,3; alpha-1,4 and alpha-1,2; alpha-1,3 and alpha-1,2), or all three of these types of linkages. The total percentage of alpha-1,4, alpha-1,3 and/or alpha-1,2 glucosidic linkages in a dextran herein is typically not greater than 50%. In some aspects, such as with dextran comprising a main chain having about, or at least about, 90%, 91%, 92%, 93%, 94%, 95%, 96%, 97%, 98%, 99%, or 100% alpha-1,6-glucosidic linkages, such dextran comprises about, or at least about, 1%, 2%, 3%, 4%, 5%, 6%, 7%, 8%, 9%, or 10% alpha-1,4, alpha-1,3 and/or alpha-1,2 glucosidic linkages.

A branch point of a dextran herein can comprise an alpha-1,4, alpha-1,3, or alpha-1,2 glucosidic linkage (e.g., a branch may be alpha-1,3-linked to a dextran main chain). In some embodiments, all three of these branch points may exist, whereas in some embodiments only one or two (e.g., alpha-1,4 and alpha-1,3; alpha-1,4 and alpha-1,2; alpha-1,3 and alpha-1,2) types of these branch points exist. It is contemplated that a branch point occurs on average every (or at least every) 5, 10, 15, 20, 25, 30, 35, 40, 45, 50, 10-30, 15-25, 20-30, or 20-40 glucose units of a dextran main chain, for example. Branches of a dextran molecule comprising alpha-1,4, alpha-1,3, and/or alpha-1,2 glucosidic linkages herein typically are one to three glucose monomers in length and comprise less than about 5-10% of all the glucose monomers of a dextran polymer. A branch comprising one glucose unit can be optionally be referred to as a pendant glucose group. In some embodiments, the branches of a dextran molecule can comprise less than about 10%, 9%, 8%, 7%, 6%, 5%, 4%, 3%, 2% or 1% of all the glucose monomers of a dextran molecule. A dextran in certain embodiments can have about 1% 2%, 3%, 4%, 5%, 6%, 7%, 8%, 9%, or 10% branch points as a percent of the glucosidic linkages in the polymer. The glucosidic linkage profile of a branch herein can optionally be characterized to include the glucosidic linkage by which the branch is linked to another chain.

A backbone of a graft copolymer in certain embodiments can be comprised entirely of a dextran as presently disclosed. However, in some aspects, a backbone can comprise other elements. For example, a graft copolymer backbone may comprise poly alpha-1,3-glucan originating from the non-reducing side of a dextran main chain, by virtue of the main chain (at its non-reducing end) serving to prime poly alpha-1,3-glucan synthesis during synthesis of the graft copolymer.

The molecular weight (Mw [weight-average molecular weight]) of a dextran that forms the backbone of a graft copolymer herein can be at least about 100000 Daltons A graft copolymer herein comprises a dextran backbone from which there are poly alpha-1,3-glucan side chains comprising at least about 95% alpha-1,3-glucosidic linkages. These side chains typically result via reacting a dextran as presently disclosed herein with a glucosyltransferase that can synthesize poly alpha-1,3-glucan. For clarity purposes, these side chains ought not be considered branches of dextran.

A poly alpha-1,3-glucan side chain in certain aspects can comprise about, or at least about, 95%, 96%, 97%, 98%, 99%, 99.5%, or 100% alpha-1,3 glucosidic linkages. Such a side chain is contemplated in some aspects to be synthesized with a glucosyltransferase enzyme using a pendant glucose or other branch portion of dextran (both of which present non-reducing ends to the enzyme for extension) as a primer. Where a side chain is synthesized from a pendant glucose that is itself alpha-1,3-linked to the dextran main chain, the resulting side chain can have 100% or a very high (e.g., 98% or greater) percentage of alpha-1,3-glucosidic linkages. In some embodiments, the glucosidic linkage between a dextran main chain and a pendant glucose or longer branch is considered a linkage of the side chain. In some embodiments, the glucosidic linkage between a dextran main chain and a branch, as well as the glucosidic linkages within a branch from which a side chain was synthesized, are considered in determining the linkage profile of the side chain. Side chains in some embodiments have no alpha-1,6 glucosidic linkages, such as with graft copolymers in which the dextran component is of 100000 to 200000 Daltons.

The Mw of a poly alpha-1,3-glucan side chain herein can be about, or at least about 1620, 1650, 1700, 2000, 5000, 10000, 15000, 16200, 20000, 25000, 30000, 40000, 50000, 60000, 70000, 75000, 80000, 90000, 100000, 110000, 120000, 125000, 130000, 140000, 150000, 160000, 162000, or 165000 Daltons, for example. It is contemplated that the side chains of a graft copolymer herein are relatively homogenous in size. For instance, the sides chains of a graft copolymer may each be at least about 100000, 120000, 140000, 160000, 162000, or 165000 Daltons. Also for instance, the sides chains of a graft copolymer may each have a Mw in the range of about 150000-165000, 155000-165000, or 160000-165000 Daltons. The average Mw of the side chains of a graft copolymer can also be referred to, if desired; any of the foregoing side chain Mw's can be considered an average Mw of all the side chains of a copolymer. Any of the side chain Mw's (or any glucan Mw) disclosed herein can optionally be characterized in terms of DPw (Mw/162.14).

The number of poly alpha-1,3-glucan side chains of a graft copolymer herein can be at least 3, 4, 5, 6, 7, 8, 9, 10, 11, 12, 13, 14, 15, 16, 17, 18, 19, 20, 21, 22, 23, 24, 25, 26, 27, 28, 29, or 30, for example. In some embodiments, the number of side chains is 4, 5, or 6, for example. The foregoing number of poly alpha-1,3-glucan side chains in some aspects is a characteristic of side chains that are at least about 100000, 120000, 140000, 160000, 162000, or 165000 Daltons; any dextran component herein such as a very large dextran or a dextran of 100000 to 200000 Daltons can be comprised in such a copolymer. Still, in further aspects, the foregoing number of poly alpha-1,3-glucan side chains can characterize a graft copolymer in which the dextran component has a pendant glucose and/or branch (from which a side chain can be primed/synthesized) on average once every 15, 16, 17, 18, 19, 20, 21, 22, 23, 24, or 25 glucose units of a dextran main chain. Based on the size of a dextran component (e.g., 100000-200000 Daltons), the positioning of branches/pendant glucoses on the dextran main chain (e.g., about one every 20 glucose units), and the number of poly alpha-1,3-glucan side chains of a graft copolymer, it is contemplated in some cases that a graft copolymer has a majority (e.g., at least 80%, 85%, 90%, 95%) of its original dextran branches/pendant glucoses non-extended into a poly alpha-1,3-glucan side chain (i.e., most of the branches/pendant glucoses are as they existed in the dextran before use thereof to synthesize a graft copolymer herein). Still, in some other embodiments, it is believed possible that a graft copolymer herein can have up to about 50, 100, 500, 1000, 5000, 10000, 15000, or 20000 poly alpha-1,3-glucan side chains.

The weight-average molecular weight of a dextran-poly alpha-1,3-glucan graft copolymer herein (i.e., the combined Mw of the original dextran molecule and the poly alpha-1, 3-glucan side chains of a graft copolymer) can be about, or at least about, 750000, 800000, 900000, 1000000, 1100000, 1200000, 1300000, 1400000, 1500000, 1600000, 1700000, 1800000, 1900000, or 2000000 Daltons, for example. The weight-average molecular weight of a dextran-poly alpha-1,3-glucan graft copolymer that comprises a very large dextran component in some embodiments is believed to similar to the weight as disclosed above for the very large dextran component itself, but with the addition of about 0.5, 0.75, 1, 1.25, 1.5, 1.75 or 2 million Daltons (in embodiments in which there are a few poly alpha-1,3-glucan side chains). In yet some more aspects, the weight-average molecular weight of a dextran-poly alpha-1,3-glucan graft copolymer can be the sum of the Mw of any dextran molecule herein and the Mw of any poly alpha-1,3-glucan side chains (taking into account the number of side chains and Mw of each) disclosed herein. Also, Mw of a graft copolymer herein can optionally be expressed in terms of the dextran component Mw and poly alpha-1,3-glucan side chain Mw. In some aspects, the weight-average molecular weight of a dextran-poly alpha-1,3-glucan graft copolymer is not less than 600000, 650000, or 700000 Daltons.

In certain embodiments, a dextran-poly alpha-1,3-glucan graft copolymer can comprise about, or at least about, 2.0 wt % dextran. The wt % of dextran in a graft copolymer in some additional aspects can be about, or at least about, 0.5%, 1.0%, 1.5%, 2.0%, 2.1%, 2.2%, 2.3%, 2.4%, 2.5%, 3.0%, 3.5%, 4.0%, 5.5%, 6.0%, 6.5%, 7.0%, 7.5%, 8.0%, 8.5%, 9.0%, 9.5%, 10.0%, 10.5%, 11.0%, 11.5%, 12.0%, 15%, 20%, 25%, 30%, 35%, 40%, 45%, 50%, 55%, 60%, 65%, 70%, 75%, 80%, 85%, 90%, 95%, 96%, 97%, 98%, or 99% (or any integer between 1%-99%).

The polydispersity index (Mw/Mn) (PDI) of a dextran-poly alpha-1,3-glucan graft copolymer herein can be about, at least about, or less than about, 5.0, 4.75, 4.5, 4.25, 4.0, 3.75, 3.5, 3.25, 3.0, 2.75, 2.5, 2.25, or 2.0, for example.

A dextran-poly alpha-1,3-glucan graft copolymer as presently disclosed is typically insoluble under aqueous conditions (aqueous insoluble). For example, a graft copolymer can be insoluble or not completely dissolved in water or another aqueous composition at a temperature up to about 50, 60, 70, 80, 90, 100, 110, or 120° C. An aqueous composition herein such as an aqueous solution can comprise a solvent having at least about 10 wt % water.

A dextran-poly alpha-1,3-glucan graft copolymer or a composition comprising the graft copolymer can absorb an aqueous liquid. An aqueous liquid can be water for instance. An aqueous liquid in certain aspects can be an aqueous solution, such as a salt solution (saline solution).

Absorption of an aqueous liquid by a dextran-poly alpha-1,3-glucan graft copolymer or a composition comprising the graft copolymer can be gauged by measuring the water retention value (WRV) of the composition or graft copolymer, for example. WRV herein can be measured by any means known in the art, such as with the protocol presently disclosed in the Examples. Briefly, WRV can be calculated using the following formula: ((mass of wet polymer−mass of dry polymer)/mass of dry polymer)*100. WRV can be measured with respect to any aqueous liquid as presently disclosed, for example. Thus, while the term WRV contains the word "water", it would be understood that a polymer WRV can be measured regarding any type of aqueous liquid disclosed herein, such as an aqueous solution.

A dextran-poly alpha-1,3-glucan graft copolymer, and/or a composition in which it is comprised, can have a water retention value (WRV) of about, or at least about, 100 in some embodiments. For instance, WRV herein can be about, or at least about, 100, 110, 120, 130, 140, 150, 160, 170, 180, 190, 200, 250, 500, 1000, 1500, 2000, 2500, 3000, 3500, or 4000.

Absorption herein can optionally be measured in terms of the maximum amount of aqueous liquid that can be soaked into and retained by a certain amount of dextran-poly alpha-1,3-glucan graft copolymer (g aqueous liquid/g graft copolymer). Graft copolymer with an absorption capacity of at least 15 g aqueous liquid/g graft copolymer can be characterized as being superabsorbent in some aspects.

In one embodiment, the polysaccharide comprises a composition comprising a crosslinked graft copolymer, wherein the graft copolymer portion of the crosslinked graft copolymer comprises:

(i) a backbone comprising dextran, and
(ii) poly alpha-1,3-glucan side chains comprising at least about 50% alpha-1,3-glucosidic linkages. Such cross-linked graft copolymers and methods for preparing the cross-linked graft copolymers are disclosed in published patent application WO 2018/152074, which is incorporated herein by reference in its entirety.

In typical embodiments, one or more crosslinks of a crosslinked graft copolymer are covalent (i.e., the graft copolymers are chemically crosslinked with each other). However, it is contemplated that one or more crosslinks can be non-covalent in some alternative embodiments. Crosslinks herein can be between at least two graft copolymer molecules (i.e., intermolecular crosslinks). It is contemplated that crosslinks in some embodiments can also be intramolecular, such as between separate poly alpha-1,3-glucan side chains of the same graft copolymer molecule, and/or between different sections of the dextran backbone of the same graft copolymer molecule.

A crosslink herein typically joins moieties via two or more covalent bonds. Such a crosslink can comprise, for example, at least a covalent bond to an oxygen atom (previously of a hydroxyl group before crosslinking) of a glucose monomer, and a covalent bond to an oxygen atom (previously of a hydroxyl group before crosslinking) of another glucose monomer. A crosslink joining moieties via two covalent bonds can have an atom ("crosslinking atom") that is bonded to (i) an oxygen atom of a glucose monomer, and (ii) an oxygen atom of another glucose monomer. A crosslinking atom(s) can optionally have one or more other bonds to other atom(s) (e.g., hydrogen, oxygen) that typically are derived from the crosslinking agent used to create the crosslink. For example, if phosphoryl chloride ($POCl_3$, also known as phosphorus oxychloride) or sodium trimetaphosphate (STMP) is used to create a crosslink, such a crosslink can optionally be characterized as having a phosphorus atom as a single crosslinking atom; aside from its two covalent bonds to oxygens of the glucose monomers being linked, the phosphorus atom is also bonded to an oxygen via a double-bond and another oxygen via a single bond. A crosslinker in some embodiments can have two or more (e.g., 3, 4, 5, 6, 7, 8 or more) crosslinking atoms; the number of covalent bonds that effectively link moieties in these embodiments increases accordingly with the number of crosslinking atoms.

One or more crosslinks of a crosslinked graft copolymer can comprise phosphorus in some aspects of the present disclosure. An example of such a crosslink is a phosphodiester bond. A phosphodiester bond herein typically is formed between hydroxyl groups of glucose monomers. For example, a phosphodiester bond can be formed between a hydroxyl group of a glucose monomer within a first graft copolymer and a hydroxyl group of a glucose monomer within a second graft copolymer (such linkage is intermolecular in this example). A crosslinking agent that can be used herein to prepare a crosslink comprising a phosphodiester bond can be $POCl_3$, for example. In some aspects, a crosslinking agent that can be used to prepare a crosslink comprising phosphorus can include $POCl_3$, polyphosphate, or STMP.

As described above, a crosslink herein can be prepared using $POCl_3$, polyphosphate, or STMP as a crosslinking agent, for example. Other examples of suitable crosslinking agents include boron-containing compounds (e.g., boric acid, diborates, tetraborates such as tetraborate decahydrate, pentaborates, polymeric compounds such as Polybor®, alkali borates), polyvalent metals (e.g., titanium-containing compounds such as titanium ammonium lactate, titanium triethanolamine, titanium acetylacetonate, or polyhydroxy complexes of titanium; zirconium-containing compounds such as zirconium lactate, zirconium carbonate, zirconium acetylacetonate, zirconium triethanolamine, zirconium diisopropylamine lactate, or polyhydroxy complexes of zirconium), glyoxal, glutaraldehyde, divinyl sulfone, epichlorohydrin, polycarboxylic acids (e.g., citric acid, malic acid, tartaric acid, succinic acid, glutaric acid, adipic acid), dichloro acetic acid, and polyamines. Still other examples of suitable crosslinking agents are described in U.S. Pat. Nos. 4,462,917, 4,464,270, 4,477,360 and 4,799,550, and in U.S. Patent Appl. Publ. No. 2008/0112907, which are all incorporated herein by reference. A crosslinker in certain aspects can dissolve in an aqueous solvent. Yet in some aspects, a crosslinking agent is not a boron-containing compound (e.g., as described above).

A crosslink in certain aspects herein can involve (e.g., be prepared from) a carboxyl group that may have been derivatized onto a glucose monomer. A graft copolymer can in certain aspects comprise added carboxyl groups for utilization in such crosslinking chemistry. Yet, in some aspects, a crosslinked graft copolymer does not comprise a crosslink based on this chemistry.

A crosslinked graft copolymer can in some aspects be surface-crosslinked following initial crosslinking. Examples of surface-crosslinking schemes herein include using a polyhydroxyl compound (e.g., polyvinyl alcohol) and/or using carboxymethyl cellulose (CMC) plus a crosslinker (e.g., epichlorohydrin, STMP, phosphoric acid, aminopropyl siloxanes). Surface-crosslinking can optionally involve (e.g., be prepared from), for example, a carboxyl group that may have been derivatized onto a glucose monomer and/or a carboxyl group that may have been introduced during the initial crosslinking. Surface-crosslinking herein can incorporate an agent and/or process as disclosed in any of U.S. Pat. Nos. 5,462,972, 6,821,331, 7,871,640, 8,361,926, or 8486855, which are all incorporated herein by reference. Yet, in some aspects, a crosslinked graft copolymer is not surface-crosslinked.

A dextran forming the backbone of a graft copolymer portion of a crosslinked graft copolymer herein can comprise, for example, about or at least about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% alpha-1,6-glucosidic linkages. Such a percent alpha-1,6 linkage profile takes into account the total of all linkages in the dextran (main chain and branch portions combined). "Dextran branches" and like terms herein are meant to encompass any branches that exist in a dextran polymer prior to its use to prepare a graft copolymer. In some embodiments, a dextran comprises a main chain comprising about, or at least about, 90%, 91%, 92%, 93%, 94%, 95%, 96%, 97%, 98%, 99%, or 100% alpha-1,6-glucosidic linkages.

A dextran herein can comprise, for example, about or at least about 1%, 2%, 3%, 4%, 5%, 6%, 7%, 8%, 9%, 10%, 11%, 12%, 13%, 14%, 15%, 16%, 17%, 18%, 19%, or 20% alpha-1,4, alpha-1,3 and/or alpha-1,2 glucosidic linkages. Typically, such linkages exist entirely, or almost entirely, in branch portions of the dextran, including branch points. In some embodiments, dextran branches may comprise one, two (e.g., alpha-1,4 and alpha-1,3; alpha-1,4 and alpha-1,2; alpha-1,3 and alpha-1,2), or all three of these types of linkages. The total percentage of alpha-1,4, alpha-1,3 and/or alpha-1,2 glucosidic linkages in a dextran herein is typically not greater than 50%. In some aspects, such as with dextran comprising a main chain having about, or at least about, 90%, 91%, 92%, 93%, 94%, 95%, 96%, 97%, 98%, 99%, or 100% alpha-1,6-glucosidic linkages, such dextran comprises about, or at least about, 1%, 2%, 3%, 4%, 5%, 6%, 7%, 8%, 9%, or 10% alpha-1,4, alpha-1,3 and/or alpha-1,2 glucosidic linkages.

A branch point of a dextran herein can comprise an alpha-1,4, alpha-1,3, or alpha-1,2 glucosidic linkage (e.g., a branch may be alpha-1,3-linked to a dextran main chain). In some embodiments, all three of these branch points may exist, whereas in some embodiments only one or two (e.g., alpha-1,4 and alpha-1,3; alpha-1,4 and alpha-1,2; alpha-1,3 and alpha-1,2) types of these branch points exist. It is contemplated that a branch point occurs on average every (or at least about every) 5, 10, 15, 20, 25, 30, 35, 40, 45, 50, 10 to 30, 15 to 25, 20 to 30, or 20 to 40 glucose units of a dextran main chain, for example. Branches of a dextran molecule comprising alpha-1,4, alpha-1,3, and/or alpha-1,2 glucosidic linkages herein typically are one to three glucose monomers in length and comprise less than about 5-10% of all the glucose monomers of a dextran polymer. A branch comprising one glucose unit can be optionally be referred to as a pendant glucose group. In some embodiments, the branches of a dextran molecule can comprise less than about 10%, 9%, 8%, 7%, 6%, 5%, 4%, 3%, 2%, or 1% of all the glucose monomers of a dextran molecule. A dextran in certain embodiments can have about 1% 2%, 3%, 4%, 5%, 6%, 7%, 8%, 9%, or 10% branch points as a percent of the glucosidic linkages in the polymer. The glucosidic linkage profile of a branch herein can optionally be characterized to include the glucosidic linkage by which the branch is linked to another chain.

A backbone of a graft copolymer in certain embodiments can be comprised entirely of a dextran as presently disclosed. However, in some aspects, a backbone can comprise other elements. For example, a graft copolymer backbone may comprise poly alpha-1,3-glucan originating from the non-reducing side of a dextran main chain, by virtue of the main chain (at its non-reducing end) serving to prime poly alpha-1,3-glucan synthesis during synthesis of the graft copolymer.

The molecular weight (Mw [weight-average molecular weight]) of a dextran herein can be about, or at least about, 1000, 2000, 5000, 10000, 25000, 40000, 50000, 75000, 100000, 125000, 150000, 175000, 200000, 240000, 250000, 500000, 750000, or 1000000 Daltons, or be in a range of about 100000-200000, 125000-175000, 130000-170000, 135000-165000, 140000-160000, or 145000-155000 Daltons, for example. In some aspects, dextran can have a Mw of about, or at least about, 2, 3, 4, 5, 6, 7, 8, 9, 10, 20, 30, 40, 50, 60, 70, 80, 90, 100, 110, 120, 130, 140, 150, 160, 170, 180, 190, or 200 million Daltons, or can be in a range of about 10-80, 20-70, 30-60, 40-50, 50-200, 60-200, 70-200, 80-200, 90-200, 100-200, 110-200, 120-200, 50-180, 60-180, 70-180, 80-180, 90-180, 100-180, 110-180, 120-180, 50-160, 60-160, 70-160, 80-160, 90-160, 100-160, 110-160, 120-160, 50-140, 60-140, 70-140, 80-140, 90-140, 100-140, 110-140, 120-140, 50-120, 60-120, 70-120, 80-120, 90-120, 100-120, 110-120, 50-110, 60-110, 70-110, 80-110, 90-110, 100-110, 50-100, 60-100, 70-100, 80-100, 90-100, or 95-105 million Daltons. Dextran with a Mw of at least about 50 million Daltons (e.g., 50-200 million Daltons) herein can optionally be referred to as a "very large dextran" or "very high molecular weight dextran". The Mw of dextran in some aspects is not below 100000 Daltons, and thus is not T10 (Mw=10000), T25 (Mw=25000), or T40 (Mw=40000) dextran, for example. Any dextran Mw herein can optionally be expressed as weight-average degree of polymerization (DPw), which is Mw divided by 162.14.

A very large dextran in some aspects can comprise (i) about 87-93 wt % glucose linked only at positions 1 and 6; (ii) about 0.1-1.2 wt % glucose linked only at positions 1 and 3; (iii) about 0.1-0.7 wt % glucose linked only at positions 1 and 4; (iv) about 7.7-8.6 wt % glucose linked only at positions 1, 3 and 6; and (v) about 0.4-1.7 wt % glucose linked only at: (a) positions 1, 2 and 6, or (b) positions 1, 4 and 6. In certain embodiments, a dextran can comprise (i) about 89.5-90.5 wt % glucose linked only at positions 1 and 6; (ii) about 0.4-0.9 wt % glucose linked only at positions 1 and 3; (iii) about 0.3-0.5 wt % glucose linked only at positions 1 and 4; (iv) about 8.0-8.3 wt % glucose linked only at positions 1, 3 and 6; and (v) about 0.7-1.4 wt % glucose linked only at: (a) positions 1, 2 and 6, or (b) positions 1, 4 and 6. Suitable examples of very large dextran herein are described in Examples 5 and 6 below.

A very large dextran in some aspects can comprise about 87, 87.5, 88, 88.5, 89, 89.5, 90, 90.5, 91, 91.5, 92, 92.5, or 93 wt % glucose linked only at positions 1 and 6. There can be about 87-92.5, 87-92, 87-91.5, 87-91, 87-90.5, 87-90, 87.5-92.5, 87.5-92, 87.5-91.5, 87.5-91, 87.5-90.5, 87.5-90, 88-92.5, 88-92, 88-91.5, 88-91, 88-90.5, 88-90, 88.5-92.5, 88.5-92, 88.5-91.5, 88.5-91, 88.5-90.5, 88.5-90, 89-92.5, 89-92, 89-91.5, 89-91, 89-90.5, 89-90, 89.5-92.5, 89.5-92, 89.5-91.5, 89.5-91, or 89.5-90.5 wt % glucose linked only at positions 1 and 6, in some instances.

A very large dextran in some aspects can comprise about 0.1, 0.2, 0.3, 0.4, 0.5, 0.6, 0.7, 0.8, 0.9, 1.0, 1.1, or 1.2 wt % glucose linked only at positions 1 and 3. There can be about 0.1-1.2, 0.1-1.0, 0.1-0.8, 0.3-1.2, 0.3-1.0, 0.3-0.8, 0.4-1.2, 0.4-1.0, 0.4-0.8, 0.5-1.2, 0.5-1.0, 0.5-0.8, 0.6-1.2, 0.6-1.0, or 0.6-0.8 wt % glucose linked only at positions 1 and 3, in some instances.

A very large dextran in some aspects can comprise about 0.1, 0.2, 0.3, 0.4, 0.5, 0.6, or 0.7 wt % glucose linked only at positions 1 and 4. There can be about 0.1-0.7, 0.1-0.6, 0.1-0.5, 0.1-0.4, 0.2-0.7, 0.2-0.6, 0.2-0.5, 0.2-0.4, 0.3-0.7, 0.3-0.6, 0.3-0.5, or 0.3-0.4 wt % glucose linked only at positions 1 and 4, in some instances.

A very large dextran in some aspects can comprise about 7.7, 7.8, 7.9, 8.0, 8.1, 8.2, 8.3, 8.4, 8.5, or 8.6 wt % glucose linked only at positions 1, 3 and 6. There can be about 7.7-8.6, 7.7-8.5, 7.7-8.4, 7.7-8.3, 7.7-8.2, 7.8-8.6, 7.8-8.5, 7.8-8.4, 7.8-8.3, 7.8-8.2, 7.9-8.6, 7.9-8.5, 7.9-8.4, 7.9-8.3, 7.9-8.2, 8.0-8.6, 8.0-8.5, 8.0-8.4, 8.0-8.3, 8.0-8.2, 8.1-8.6, 8.1-8.5, 8.1-8.1, 8.1-8.3, or 8.1-8.2 wt % glucose linked only at positions 1, 3 and 6, in some instances.

A very large dextran in some aspects can comprise about 0.4, 0.5, 0.6, 0.7, 0.8, 0.9, 1.0, 1.1, 1.2, 1.3, 1.4, 1.5, 1.6, or 1.7 wt % glucose linked only at (a) positions 1, 2 and 6, or (b) positions 1, 4 and 6. There can be about 0.4-1.7, 0.4-1.6, 0.4-1.5, 0.4-1.4, 0.4-1.3, 0.5-1.7, 0.5-1.6, 0.5-1.5, 0.5-1.4, 0.5-1.3, 0.6-1.7, 0.6-1.6, 0.6-1.5, 0.6-1.4, 0.6-1.3, 0.7-1.7, 0.7-1.6, 0.7-1.5, 0.7-1.4, 0.7-1.3, 0.8-1.7, 0.8-1.6, 0.8-1.5, 0.8-1.4, 0.8-1.3 wt % glucose linked only at (a) positions 1, 2 and 6, or (b) positions 1, 4 and 6, in some instances.

A graft copolymer portion of a crosslinked graft copolymer herein comprises a dextran backbone from which there are poly alpha-1,3-glucan side chains comprising at least about 50% alpha-1,3-glucosidic linkages. These side chains typically can be obtained via reacting a dextran as presently disclosed herein with a glucosyltransferase that can synthesize poly alpha-1,3-glucan. For clarity purposes, these side chains ought not be considered branches of dextran.

A poly alpha-1,3-glucan side chain in certain aspects can comprise about, or at least about, 50%, 51%, 52%, 53%, 54%, 55%, 56%, 5,%, 58%, 59%, 60%, 61%, 62%, 63%, 64%, 65%, 66%, 67%, 69%, 70%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% alpha-1,3 glucosidic linkages. A side chain is contemplated in some aspects to be synthesized with a glucosyltransferase enzyme using a pendant glucose or other branch of dextran (both of which present non-reducing ends to the enzyme for extension) as a primer. Where a side chain is synthesized from a pendant glucose that is itself alpha-1,3-linked to the dextran main chain, the resulting side chain can have 100% or a very high (e.g., 98% or greater) percentage of alpha-1,3-glucosidic linkages. In some embodiments, the glucosidic linkage between a dextran main chain and a pendant glucose or longer branch is considered a linkage of the side chain. In some embodiments, the glucosidic linkage between a dextran main chain and a branch, as well as the glucosidic linkages within a branch from which a side chain was synthesized, are considered in determining the linkage profile of the side chain. In some alternative embodiments, a poly alpha-1,3-glucan side chain can comprise about, or at least about, 30% alpha-1,3 glucosidic linkages. The balance of linkages in any poly alpha-1,3-glucan side chain herein typically can be with alpha-1,6 linkages.

The Mw of a poly alpha-1,3-glucan side chain herein can be about, or at least about 1620, 1650, 1700, 2000, 5000, 10000, 15000, 16200, 20000, 25000, 30000, 40000, 50000, 60000, 70000, 75000, 80000, 90000, 100000, 110000, 120000, 125000, 130000, 140000, 150000, 160000, 162000, or 165000 Daltons, for example. It is contemplated that the side chains of a graft copolymer herein are relatively homogenous in size. For instance, the sides chains of a graft copolymer can each have a Mw in the range of about 150000-165000, 155000-165000, or 160000-165000 Daltons. The average Mw of the side chains of a graft copolymer can also be referred to, if desired; any of the foregoing side chain Mw's can be considered an average Mw of all the side chains of a copolymer. Any of the side chain Mw's (or any glucan Mw) disclosed herein can optionally be characterized in terms of DPw (Mw/162.14).

The number of poly alpha-1,3-glucan side chains of a graft copolymer herein can be at least 3, 4, 5, 6, 7, 8, 9, 10, 11, 12, 13, 14, 15, 16, 17, 18, 19, 20, 21, 22, 23, 24, 25, 26, 27, 28, 29, or 30, for example. In some embodiments, the number of side chains is 4, 5, or 6, for example. The foregoing number of poly alpha-1,3-glucan side chains in some aspects is a characteristic of side chains that are at least about 100000, 120000, 140000, 160000, 162000, or 165000 Daltons. Still, in further aspects, the foregoing number of poly alpha-1,3-glucan side chains can characterize a graft copolymer in which the dextran component has a pendant glucose and/or branch (from which a side chain can be primed/synthesized) on average once every 15, 16, 17, 18, 19, 20, 21, 22, 23, 24, or 25 glucose units of a dextran main chain. Based on the size of a dextran component (e.g., 100000-200000 Daltons), the positioning of branches/pendant glucoses on the dextran main chain (e.g., about one every 20 glucose units), and the number of poly alpha-1,3-glucan side chains of a graft copolymer, it is contemplated in some cases that a graft copolymer has a majority (e.g., at least 80%, 85%, 90%, 95%) of its original dextran branches/pendant glucoses non-extended into a poly alpha-1,3-glucan side chain (i.e., most of the branches/pendant glucoses are as they existed in the dextran before use thereof to synthesize a graft copolymer). Still, in some other embodiments, it is believed possible that a graft copolymer herein can have up to about 50, 100, 500, 1000, 5000, 10000, 15000, or 20000 poly alpha-1,3-glucan side chains.

The weight-average molecular weight of a graft copolymer portion of a crosslinked graft copolymer herein (i.e., the combined Mw of the original dextran molecule and the poly alpha-1,3-glucan side chains of a graft copolymer) can be about, or at least about, 750000, 800000, 900000, 1000000, 1100000, 1200000, 1300000, 1400000, 1500000, 1600000, 1700000, 1800000, 1900000, or 2000000 Daltons, for example. The weight-average molecular weight of a graft copolymer that comprises a very large dextran component in some embodiments is believed to be similar to the weight as disclosed above for the very large dextran component itself, but with the addition of about 0.5, 0.75, 1, 1.25, 1.5, 1.75 or 2 million Daltons (in embodiments in which there are a few poly alpha-1,3-glucan side chains). The polydispersity index (Mw/Mn) (PDI) of a graft copolymer herein can be about, at least about, or less than about, 5.0, 4.75, 4.5, 4.25, 4.0, 3.75, 3.5, 3.25, 3.0, 2.75, 2.5, 2.25, or 2.0, for example.

In certain embodiments, a graft copolymer can comprise about, or at least about, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99, 50-95, 60-95, 50-90, or 60-90 wt % one or more dextran compounds as disclosed herein.

A graft copolymer portion of a crosslinked graft copolymer herein can be produced using an enzymatic reaction as disclosed in International Appl. No. PCT/US2016/060579, which is incorporated herein by reference, for example. Such an enzymatic reaction typically comprises at least: (i) water, (ii) sucrose, (iii) one or more dextran compounds as disclosed herein, and (iv) a glucosyltransferase enzyme that synthesizes poly alpha-1,3-glucan. Poly alpha-1,3-glucan synthesis by a glucosyltransferase enzyme in this reaction can, in part at least, be via use of the dextran as a primer for poly alpha-1,3-glucan synthesis. Following enzymatic production of dextran-poly alpha-1,3-glucan graft copolymer, it can be chemically crosslinked to produce a crosslinked graft copolymer as presently disclosed.

The initial concentration of dextran in an enzymatic reaction for preparing graft copolymer herein can be about, or at least about, 0.5 g/L, 1.0 g/L, 1.5 g/L, 2 g/L, 2.5 g/L, 3 g/L, 4 g/L, 5 g/L, 7.5 g/L, 10 g/L, 15 g/L, 20 g/L, or 25 g/L, for example. "Initial concentration of dextran" refers to the dextran concentration in a glucosyltransferase reaction just after all the reaction components have been added (e.g., at least water, sucrose, dextran, glucosyltransferase enzyme). Dextran for entry into a reaction can be from a commercial source or prepared enzymatically, for example. Dextran produced enzymatically (e.g., using dextransucrase) can, in some aspects, be (i) isolated in some manner from an initial dextran synthesis enzymatic reaction (e.g., separated from a dextransucrase reaction) and then entered into an enzymatic reaction for alpha-1,3-glucan side chain synthesis, or (ii) entered into an enzymatic reaction for alpha-1,3-glucan side chain synthesis without being separated from an initial dextran synthesis enzymatic reaction (e.g., completed and/or heat-killed reaction is used directly for the alpha-1,3-glucan side chain synthesis reaction).

An enzymatic reaction for producing a graft copolymer typically comprises a glucosyltransferase enzyme that can synthesize poly alpha-1,3-glucan comprising at least about 30%, 35%, 40%, 45%, 50%, 55%, 60%, 65%, 70%, 75%, 80%, 85%, 90%, 95% alpha-1,3-glucosidic linkages. Such an enzyme can synthesize poly alpha-1,3-side chains (as disclosed above) from dextran primer sites, forming a dextran-poly alpha-1,3-glucan graft copolymer herein. In particular aspects, a glucosyltransferase enzyme can synthesize poly alpha-1,3-glucan that (i) comprises about 100%, or at least about 90%, 91%, 92%, 93%, 94%, 95%, 96%, 97%, 98%, or 99%, alpha-1,3-glucosidic linkages, and/or (ii) is at least about 16200 Daltons.

A glucosyltransferase enzyme in certain embodiments for producing poly alpha-1,3-glucan side chains can comprise, or consist of, an amino acid sequence as disclosed in U.S. Patent Appl. Publ. No. 2014/0087431, for example, which is incorporated herein by reference. Examples of such sequences include those that are 100% identical to, or at least 90%, 91%, 92%, 93%, 94%, 95%, 96%, 97%, 98%, 98.5%, 99%, or 99.5% A identical to, SEQ ID NO:2, 4, 6, 8, 10, 12, 14, 16, 18, 20, 26, 28, 30, 34, or 59 as disclosed in U.S. Patent Appl. Publ. No. 2014/0087431, and have glucosyltransferase activity. A glucosyltransferase enzyme with SEQ ID NO:2, 4, 8, 10, 14, 20, 26, 28, 30, or 34 can synthesize poly alpha-1,3-glucan comprising at least about 90% alpha-1,3-glucosidic linkages in some aspects.

The temperature of an enzymatic reaction for producing a graft copolymer can be controlled, if desired. In certain embodiments, the temperature of a reaction can be between about 5° C. to about 50° C., about 20° C. to about 40° C., or about 20° C. to about 30° C. (e.g., about 22-25° C.). The pH of an enzymatic reaction in certain embodiments can be between about 4.0 to about 8.0, or between about 5.0 to about 6.0. Alternatively, the pH can be about 4.0, 4.5, 5.0, 5.5, 6.0, 6.5, 7.0, 7.5, or 8.0, for example. The pH can be adjusted or controlled by the addition or incorporation of a suitable buffer, including but not limited to: phosphate, tris, citrate, or a combination thereof. Buffer concentration in a glucan synthesis reaction can be from 0 mM to about 100 mM, or about 10, 20, or 50 mM, for example.

The initial concentration of sucrose in an enzymatic reaction for producing a graft copolymer can be about 20-400, 200-400, 250-350, 75-175, or 50-150 g/L, for example. In some aspects, the initial concentration of sucrose can be about, or at least about, 40, 50, 60, 70, 80, 90, 100, 110, 120, 130, 140, 150, 160, 180, 200, 250, 300, or 400 g/L, for example. "Initial concentration of sucrose" refers to the sucrose concentration in a glucosyltransferase reaction just after all the reaction components have been added (e.g., at least water, sucrose, dextran, glucosyltransferase enzyme).

One or more glucosyltransferase enzymes may be used in an enzymatic reaction for producing a graft copolymer. An enzymatic reaction herein may contain one, two, or more glucosyltransferase enzymes, for example. Typically, the reaction time can be about 1, 2, 3, 4, 5, 10, 12, 24, 36, 48, 60, 72, 84, or 96 hours.

Following its enzymatic synthesis, a graft copolymer can be isolated (e.g., by filtration or centrifugation), if desired, prior to being crosslinked. In doing so, the graft copolymer is separated from most of the reaction solution, which may comprise water, fructose, residual sucrose and certain byproducts (e.g., leucrose, soluble oligosaccharides DP2-DP7, glucose). Isolation can optionally further comprise washing a graft copolymer product one, two, or more times with water or other aqueous liquid, and/or drying the product. Such washing can use wash volumes of about, or at least about, 0.5-, 1-, 1.5-, or 2-times the volume of the original reaction or of a product sample, and/or involve filtration and/or centrifugation, for example.

A crosslinked graft copolymer as presently disclosed can be produced, for example, by contacting a graft copolymer herein with at least a crosslinking agent and a solvent. This process step can optionally be characterized as contacting a graft copolymer with a crosslinking agent under aqueous conditions or non-aqueous conditions, depending on the solvent being used. Any crosslinking agent and/or graft copolymer disclosed herein can be employed accordingly.

A method/process of producing a crosslinked graft copolymer can comprise:

(a) contacting at least a solvent, a crosslinking agent, and a graft copolymer as presently disclosed, whereby a crosslinked graft copolymer is produced, and (b) optionally, isolating the crosslinked graft copolymer produced in step (a).

Method step (a) can optionally be characterized as contacting a graft copolymer with a crosslinking agent under aqueous or non-aqueous conditions (depending on the solvent), and/or can optionally be characterized as a crosslinking reaction. Any crosslinking agent and/or graft copolymer disclosed herein can be employed in this method accordingly. In the contacting step of the above process and product-by-process embodiments, it is generally desired that such is conducted under conditions suitable for allowing the crosslinking agent to make a crosslink. It should be evident from the present disclosure that a graft copolymer itself, which is entered into a crosslinking reaction, typically is made enzymatically as disclosed herein without any chemical crosslinking.

A crosslinking reaction herein can be performed under aqueous conditions in certain aspects. For example, a reaction can comprise, optionally as a first step, providing a preparation (typically a slurry or mixture) of at least one graft copolymer (e.g., any as disclosed herein) in an aqueous liquid (e.g., water). The wt % of graft copolymer in such a preparation can be about, or at least about, 1, 5, 10, 15, 20, 25, 30, 1-30, 1-25, 1-20, 1-15, 1-10, 1-5, 5-30, 5-25, 5-20, 5-15, 5-10, 10-30, 10-25, 10-20, or 10-15, for example (such a wt % can likewise be applied to a non-aqueous reaction, if desired). This preparation can optionally be incubated, preferably with agitation, for at least about 0.25, 0.50, 1, 2, 3, 4, 5, 6, 7, 8, 9, 10, 11, 12, 18, 24, or 48 hours, and/or be at room temperature of a temperature of about 15, 20, 25, 30, 35, 40, 50, 15-25, 15-30, 15-40, 15-50, 20-25, 20-30, 20-40, or 20-50° C. This preparation typically is made first without pH adjustment, but can optionally be prepared simultaneously with pH adjustment (below).

The pH of the aqueous preparation can in certain aspects be adjusted (increased or decreased) accordingly. For example, such as when using $POCl_3$ as a crosslinking agent, a base (e.g., sodium hydroxide [NaOH]) can be added to raise the pH to about 8, 8.5, 9, 9.5, 10, 10.5, 11, 11.5, 12, 8-12, 9-12, 10-12, 8-11.5, 9-11.5, or 10-11.5. A pH-adjusted preparation can optionally be incubated, preferably with agitation, for at least about 10, 15, 20, 25, 30, 45 or 60 minutes, and/or be at a temperature as listed above. Adjustment of pH is generally done before, but can optionally be done simultaneously with, addition of a crosslinking agent (below). Increasing pH in some aspects can partially or completely dissolve a graft copolymer.

A crosslinking agent (e.g., any as disclosed herein that can dissolve in aqueous conditions) is dissolved in the preparation, typically following pH-adjustment. The concentration of the crosslinking agent in the resulting preparation can be about, or at least about 0.2, 0.4, 0.5, 1, 1.5, 1.6, 1.7, 2, 4, 6, 8, 10, 0.5-2, 1-2, 1.5-2, or 1.5-1.7 wt %, for example (such a wt % can likewise be applied to a non-aqueous reaction, if desired). Agitation (e.g., shaking or stirring) is typically applied while dissolving the crosslinking agent. This preparation is typically incubated, preferably with agitation, for at least about 0.25, 0.50, 1, 2, 3, 4, or 5 hours, and/or be at a temperature as listed above.

A crosslinking reaction, if pH-adjusted, can optionally be neutralized upon completion (e.g., using HCl if pH had been increased), or neutralized while isolating the crosslinked graft copolymer product of the reaction. Neutralization typically brings a pH around 7.0 (e.g., 6.0-8.0, 6.5-7.5, 6.8-7.2).

The aforementioned conditions/parameters for performing a crosslinking reaction can be adjusted accordingly, depending on the type of crosslinker being employed, for example.

A crosslinked graft copolymer produced in a crosslinking reaction herein can optionally be isolated. For example, a crosslinked product can be separated by filtration or centrifugation (or any other method known in the art for removal of liquids from solids) from the reaction/post-reaction liquid. Isolation can optionally further comprise washing a crosslinked product one, two, or more times with water or other aqueous liquid, and/or drying the product. Washing in some aspects can be done such that no salts (e.g., NaCl) can be detected in the washed product. Drying in some aspects can be performed using any method known in the art, such as vacuum drying, air drying, or freeze drying. Drying can optionally be performed at a temperature of at least about 70, 80, 90, or 70-90° C. Dried product can be made into a particulate form, if desired, such as through crushing and/or grinding.

The percent yield of a crosslinked graft copolymer product of a crosslinking reaction herein can be about, or at least about, 20%, 25%, 30%, 35%, 40%, 45%, 50%, 55%, 60%, 65%, 70%, 75%, 80%, 85%, 90%, or 95%, for example. Percent yield of a crosslinked graft copolymer can be measured, for instance, by dividing the actual product yield by the theoretical product yield, and multiplying by 100%.

A crosslinked graft copolymer as comprised in a composition herein can absorb an aqueous liquid. An aqueous liquid can be water for instance. An aqueous liquid in certain aspects can be an aqueous solution, such as a salt solution (saline solution). A salt solution can optionally comprise about, or at least about, 0.01, 0.025, 0.05, 0.075, 0.1, 0.25, 0.5, 0.75, 0.9, 1.0, 1.25, 1.5, 1.75, 2.0, 2.5, 3.0, 0.5-1.5, 0.5-1.25, 0.5-1.0, 0.75-1.5, 0.75-1.25, or 0.75-1.0 wt % of salt (such wt % values typically refer to the total concentration of one or more salts). Examples of a salt that can be used in an aqueous solution herein include one or more sodium salts (e.g., NaCl, $Na_2SO_4$). Other non-limiting examples of salts include those having (i) an aluminum, ammonium, barium, calcium, chromium (II or III), copper (I or II), iron (II or III), hydrogen, lead (II), lithium, magnesium, manganese (II or III), mercury (I or II), potassium, silver, sodium strontium, tin (II or IV), or zinc cation, and (ii) an acetate, borate, bromate, bromide, carbonate, chlorate, chloride, chlorite, chromate, cyanamide, cyanide, dichromate, dihydrogen phosphate, ferricyanide, ferrocyanide, fluoride, hydrogen carbonate, hydrogen phosphate, hydrogen sulfate, hydrogen sulfide, hydrogen sulfite, hydride, hydroxide, hypochlorite, iodate, iodide, nitrate, nitride, nitrite, oxalate, oxide, perchlorate, permanganate, peroxide, phosphate, phosphide, phosphite, silicate, stannate, stannite, sulfate, sulfide, sulfite, tartrate, or thiocyanate anion. Thus, any salt having a cation from (i) above and an anion from (ii) above can be in an aqueous liquid as presently disclosed, for example.

Absorption of an aqueous liquid by a crosslinked graft copolymer or a composition comprising the crosslinked graft copolymer can be gauged by measuring the water retention value (WRV) of the crosslinked graft copolymer, for example. WRV herein can be measured by any means known in the art, such as via the methodology disclosed in U.S. Patent Appl. Publ. No. 2016/0175811 (e.g., Example 7 therein), which is incorporated herein by reference, or such as with the protocol presently disclosed in the Examples. Briefly, WRV can be calculated using the following formula: ((mass of wet crosslinked graft copolymer−mass of dry crosslinked graft copolymer)/mass of dry crosslinked graft copolymer)*100. WRV can be measured with respect to any aqueous liquid as presently disclosed, for example. Thus, while the term WRV contains the word "water", it would be understood that WRV can be measured with regard to any type of aqueous liquid disclosed herein, such as an aqueous solution.

A crosslinked graft copolymer, and/or a composition in which it is comprised, can have a water retention value (WRV) of about, or at least about, 400 in some embodiments. For instance, WRV herein can be about, or at least about, 400, 500, 600, 700, 800, 900, 1000, 1250, 1500, 1750, 2000, 2250, 2500, 2750, 3000, or 3300.

Absorption of an aqueous liquid by a crosslinked graft copolymer as comprised in a composition herein can be optionally gauged by measuring centrifugal retention capacity (CRC) as disclosed in U.S. Pat. No. 8,859,758 (incorporated herein by reference), for example. A CRC value herein can be provided in terms of grams of aqueous fluid per grams of crosslinked graft copolymer ("g/g"). A crosslinked graft copolymer can have a CRC of about, or at least about, 6, 7, 8, 9, 10, 11, 12, 13, 14, 15, 16, 17, 18, 19, 20, 21, 22, 23, 24, 25, 26, 27, 28, 29, 30, 31, 32, 33, 28-33, 28-32, 20-25, 21-24, or 22-24 g/g in some embodiments. A corresponding WRV can be made by multiplying a CRC measurement by 100, if desired. Further yet, absorption herein can optionally be measured by determining absorption under load (AUL), such as via the methodology disclosed in U.S. Pat. No. 8,859,758 or EDANA (European Disposables and Non-woven Association) standard test WSP 242.2.R3 (12), which are both incorporated herein by reference. AUL measurements can be provided in terms of grams of aqueous fluid per grams of crosslinked graft copolymer ("g/g"), and can be measured under a suitable pressure (e.g., psi of about 0.5-1.0, 0.75-1.0, 0.80-0.85, or 0.82).

The absorbency of a crosslinked graft copolymer is contemplated in most or all aspects to be greater than the absorbency of the graft copolymer as it existed before being crosslinking to form the crosslinked graft copolymer. For example, a crosslinked graft copolymer can be at least about 2, 3, 4, 5, 6, 7, or 8 times greater than the absorbency of the graft copolymer as it existed before being crosslinking.

Absorption herein can optionally be characterized in terms of the maximum amount of aqueous liquid that can be soaked into and retained by a certain amount of crosslinked graft copolymer. A crosslinked graft copolymer with an absorption capacity of at least 15, 20 or 15-20 g aqueous liquid/g crosslinked graft copolymer can be characterized as being superabsorbent in some aspects.

In one embodiment, the polysaccharide comprises a poly alpha-1,3-glucan ester compound represented by Structure III:

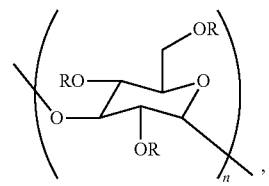

Structure III wherein
(i) n is at least 6;
(ii) each R is independently an —H or a first group comprising —CO—$C_x$—COOH, wherein the —$C_x$— portion of said first group comprises a chain of 2 to 6 carbon atoms; and
(iii) the compound has a degree of substitution with the first group of about 0.001 to about 3.

Such poly alpha-1,3-glucan esters and their preparation are disclosed in published patent application WO 2017/003808, which is incorporated herein by reference in its entirety. Under suitable reaction conditions (e.g., time, temperature, pH), esterification of one or more hydroxyl groups of the glucose units of poly alpha-1,3-glucan with a first group provided by a cyclic organic anhydride can occur, yielding a poly alpha-1,3-glucan ester compound of Structure III.

A poly alpha-1,3-glucan ester compound of Structure III is termed an "ester" herein by virtue of comprising the substructure —$C_G$—O—CO—$C_x$—, where "—$C_G$—" represents carbon 2, 4, or 6 of a glucose monomeric unit of a poly alpha-1,3-glucan ester compound, and where "—CO—$C_x$" is comprised in the first group.

A "first group" herein comprises —CO—$C_x$—COOH. The term "—$C_x$—" refers to a portion of the first group that typically comprises a chain of 2 to 6 carbon atoms, each carbon atom preferably having four covalent bonds. A poly alpha-1,3-glucan monoester contains one type of first group. A poly alpha-1,3-glucan mixed ester contains two or more types of a first group.

A cyclic organic anhydride herein can have a formula represented by Structure IV shown below:

Structure IV

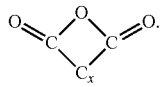

The —$C_x$— portion of Structure IV typically comprises a chain of 2 to 6 carbon atoms; each carbon atom in this chain preferably has four covalent bonds. It is contemplated that, in some embodiments, the —$C_x$— portion can comprise a chain of 2 to 16, 2 to 17, or 2 to 18 carbon atoms. During an esterification reaction herein, the anhydride group (—CO—O—CO—) of a cyclic organic anhydride breaks such that one end of the broken anhydride becomes a —COOH group and the other end is esterified to a hydroxyl group of poly alpha-1,3-glucan, thereby rendering an esterified first group (—CO—$C_x$—COOH). Depending on the cyclic organic anhydride used, there typically can be one or two possible products of such an esterification reaction.

Each R group in the formula of a poly alpha-1,3-glucan ester compound represented by Structure III can independently be an —H or a first group comprising —CO—$C_x$—COOH. In general, each carbon in the chain, aside from being covalently bonded with an adjacent carbon atom(s) in the chain or a carbon atom of the flanking C=O and COOH groups, can also be bonded to hydrogen(s), a substituent group(s) such as an organic group, and/or be involved in a carbon-carbon double-bond. For example, a carbon atom in the —$C_x$— chain can be saturated (i.e., —$CH_2$—), double-bonded with an adjacent carbon atom in the —$C_x$— chain (e.g., —CH=CH—), and/or be bonded to a hydrogen and an organic group (i.e., one hydrogen is substituted with an organic group).

In certain embodiments, the —$C_x$— portion of the first group (—CO—$C_x$—COOH) comprises only $CH_2$ groups. Examples of a first group in which the —$C_x$— portion comprises only $CH_2$ groups are —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, and —CO—$CH_2$—$CH_2$—$CH_2$—$CH_2$—$CH_2$—$CH_2$—COOH. These first groups can be derived, respectively, by reacting succinic anhydride, glutaric anhydride, adipic anhydride, pimelic anhydride, or suberic anhydride with poly alpha-1,3-glucan.

In some embodiments, the —$C_x$— portion of the first group (—CO—$C_x$—COOH) can comprise (i) at least one double-bond in the carbon atom chain, and/or (ii) at least one branch comprising an organic group. For instance, the —$C_x$— portion of the first group can have at least one double-bond in the carbon atom chain. Examples of a first group in which the —$C_x$— portion comprises a carbon-carbon double-bond include —CO—CH=CH—COOH, —CO—CH=CH—$CH_2$—COOH, —CO—CH=CH—$CH_2$—$CH_2$—COOH, —CO—CH=CH—$CH_2$—$CH_2$—$CH_2$—COOH, —CO—CH=CH—$CH_2$—$CH_2$—$CH_2$—$CH_2$—COOH, —CO—$CH_2$—CH=CH—COOH, —CO—$CH_2$—CH=CH—$CH_2$—COOH, —CO—$CH_2$—CH=CH—$CH_2$—$CH_2$—COOH, —CO—$CH_2$—CH=CH—$CH_2$—$CH_2$—$CH_2$—COOH, —CO—$CH_2$—$CH_2$—CH=CH—COOH, —CO—$CH_2$—$CH_2$—CH=CH—$CH_2$—COOH, —CO—$CH_2$—$CH_2$—CH=CH—$CH_2$—$CH_2$—COOH, —CO—$CH_2$—$CH_2$—$CH_2$—CH=CH—COOH, —CO—$CH_2$—$CH_2$—$CH_2$—CH=CH—$CH_2$—COOH, and —CO—$CH_2$—$CH_2$—$CH_2$—$CH_2$—CH=CH—COOH.

Each of these first groups comprising a —$C_x$— portion with at least one organic group branch can be derived by reacting the appropriate cyclic organic anhydride with poly alpha-1,3-glucan. An illustrative example includes using methylsuccinic anhydride to ester-derivatize poly alpha-1,3-glucan, where the resultant first group is —CO—$CH_2$—CH($CH_3$)—COOH or —CO—CH($CH_3$)—$CH_2$—COOH. As another example, to produce a first group comprising —CO—CH=CH—COOH, maleic anhydride can be reacted with poly alpha-1,3-glucan. Thus, a cyclic organic anhydride comprising a —$C_x$— portion represented in any of the above-listed first groups (where the corresponding —$C_x$— portion of a cyclic organic anhydride is that portion linking each side of the anhydride group [—CO—O—CO-] together to form a cycle) can be reacted with poly alpha-1,3-glucan to produce an ester thereof having the corresponding first group (—CO—$C_x$—COOH).

Poly alpha-1,3-glucan ester compounds in certain embodiments can contain one type of a first group comprising —CO—$C_x$—COOH. For example, one or more R groups ester-linked to the glucose group in the above formula may be —CO—$CH_2$—$CH_2$—COOH; the R groups in this particular example would thus independently be hydrogen and —CO—$CH_2$—$CH_2$—COOH groups (such an ester compound can be referred to as poly alpha-1,3-glucan succinate).

The —$C_x$— portion of the first group (—CO—$C_x$—COOH) in some aspects herein can comprise at least one branch comprising an organic group. Examples of a first group in which the —$C_x$— portion comprises at least one organic group branch include:

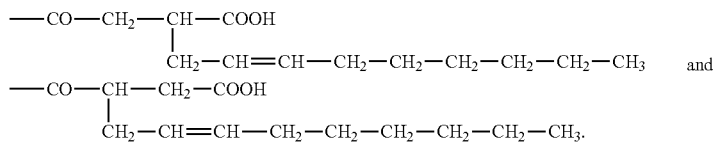

Each of these two first groups can be derived by reacting 2-nonen-1-yl succinic anhydride with poly alpha-1,3-glucan. It can be seen that the organic group branch (generically termed "$R^b$" herein) in both these examples is —$CH_2$—$CH$=$CH$—$CH_2$—$CH_2$—$CH_2$—$CH_2$—$CH_2$—$CH_3$. It can also be seen that the $R^b$ group substitutes for a hydrogen in the —$C_x$— carbon chain.

Thus, for example, a first group (—CO—$C_x$—COOH) herein can be any of —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, or —CO—$CH_2$—$CH_2$—$CH_2$—$CH_2$—$CH_2$—$CH_2$—COOH, but in which at least one, two, three, or more hydrogens thereof is/are substituted with an $R^b$ group. Also for example, a first group (—CO—$C_x$—COOH) herein can be any of —CO—CH=CH—$CH_2$—COOH, —CO—CH=CH—$CH_2$—$CH_2$—COOH, —CO—CH=CH—$CH_2$—$CH_2$—$CH_2$—COOH, —CO—CH=CH—$CH_2$—$CH_2$—$CH_2$—$CH_2$—COOH, —CO—$CH_2$—CH=CH—COOH, —CO—$CH_2$—CH=CH—$CH_2$—COOH, —CO—$CH_2$—CH=CH—$CH_2$—$CH_2$—COOH, —CO—$CH_2$—CH=CH—$CH_2$—$CH_2$—$CH_2$—COOH, —CO—$CH_2$—$CH_2$—CH=CH—COOH, —CO—$CH_2$—$CH_2$—CH=CH—$CH_2$—COOH, —CO—$CH_2$—$CH_2$—CH=CH—$CH_2$—$CH_2$—COOH, —CO—$CH_2$—$CH_2$—$CH_2$—CH=CH—COOH, —CO—$CH_2$—$CH_2$—$CH_2$—CH=CH—$CH_2$—COOH, or —CO—$CH_2$—$CH_2$—$CH_2$—$CH_2$—CH=CH—COOH, but in which at least one, two, three, or more hydrogens thereof is/are substituted with an $R^b$ group (such first groups are examples in which the —$C_x$— portion comprises at least one double-bond in the carbon atom chain and at least one branch comprising an organic group). Suitable examples of $R^b$ groups herein include alkyl groups and alkenyl groups. An alkyl group herein can comprise 1-18 carbons (linear or branched), for example (e.g., methyl, ethyl, propyl, butyl, pentyl, hexyl, heptyl, octyl, nonyl, or decyl group). An alkenyl group herein can comprise 1-18 carbons (linear or branched), for example (e.g., methylene, ethenyl, propenyl, butenyl, pentenyl, hexenyl, heptenyl, octenyl [e.g., 2-octenyl], nonenyl [e.g., 2-nonenyl], or decenyl group). One of skill in the art would understand, based on the formula of the cyclic organic anhydride represented by Structure IV and its involvement in the esterification process to prepare poly alpha-1,3-glucan esters of Structure III herein as disclosed in WO 2017/003808, what particular cyclic organic anhydride is suitable for deriving any of these first groups.

Examples of cyclic organic anhydrides by name that can be included in a reaction with poly alpha-1,3-glucan to form a poly alpha-1,3-glucan ester compound represented by Structure III include maleic anhydride, methylsuccinic anhydride, methylmaleic anhydride, dimethylmaleic anhydride, 2-ethyl-3-methylmaleic anhydride, 2-hexyl-3-methylmaleic anhydride, 2-ethyl-3-methyl-2-pentenedioic anhydride, itaconic anhydride (2-methylenesuccinic anhydride), 2-nonen-1-ylsuccinic anhydride, and 2-octen-1-ylsuccinic anhydride. Alkenyl succinic anhydrides and alkylketene dimers, for example those derived from palmitic acid or other long chain carboxylic acids, can also be used. In particular, for example, maleic anhydride can be used to esterify —CO—CH=CH—COOH as a first group to poly alpha-1,3-glucan; methylsuccinic anhydride can be used to esterify —CO—$CH_2$—CH($CH_3$)—COOH and/or —CO—CH($CH_3$)—$CH_2$—COOH as a first group to poly alpha-1,3-glucan; methylmaleic anhydride can be used to esterify —CO—CH=C($CH_3$)—COOH and/or —CO—C($CH_3$)=CH—COOH as a first group to poly alpha-1,3-glucan; dimethylmaleic anhydride can be used to esterify —CO—C($CH_3$)=C($CH_3$)—COOH as a first group to poly alpha-1,3-glucan; 2-ethyl-3-methylmaleic anhydride can be used to esterify —CO—C($CH_2CH_3$)=C($CH_3$)—COOH and/or —CO—C($CH_3$)=C($CH_2CH_3$)—COOH as a first group to poly alpha-1,3-glucan; 2-hexyl-3-methylmaleic anhydride can be used to esterify —CO—C($CH_2CH_2CH_2CH_2CH_2CH_3$)=C($CH_3$)—COOH and/or —CO—C($CH_3$)=C($CH_2CH_2CH_2CH_2CH_2CH_3$)—COOH as a first group to poly alpha-1,3-glucan; itaconic anhydride can be used to esterify —CO—$CH_2$—C($CH_2$)—COOH and/or —CO—C($CH_2$)—$CH_2$—COOH as a first group to poly alpha-1,3-glucan; 2-nonen-1-yl succinic anhydride can be used to esterify —CO—$CH_2$—CH($CH_2$CH=CH$CH_2CH_2CH_2CH_2CH_3$)—COOH and/or —CO—CH($CH_2$CH=CH$CH_2CH_2CH_2CH_2CH_3$)—$CH_2$—COOH as a first group to poly alpha-1,3-glucan.

As disclosed in WO 2017/003808, each of these first groups comprising a —$C_x$— portion with at least one organic group branch can be derived by reacting the appropriate cyclic organic anhydride with poly alpha-1,3-glucan. An example of using 2-nonen-1-yl succinic anhydride is described above. Another illustrative example includes using methylmaleic anhydride to ester-derivatize poly alpha-1,3-glucan, where the resultant first group is —CO—CH=C($CH_3$)—COOH or —CO—C($CH_3$)=CH—COOH. Still another illustrative example includes using itaconic anhydride (2-methylenesuccinic anhydride) to ester-derivatize poly alpha-1,3-glucan, where the resultant first group is —CO—$CH_2$—C($CH_2$)—COOH or —CO—C($CH_2$)—$CH_2$—COOH. Thus, a cyclic organic anhydride comprising a —$C_x$-portion represented in any of the above-listed first groups (where the corresponding —$C_x$— portion of a cyclic organic anhydride is that portion linking each side of the anhydride group [—CO—O—CO-] together to form a cycle) can be reacted with poly alpha-1,3-glucan to produce an ester thereof having the corresponding first group (—CO—$C_x$—COOH).

Those skilled in the art would understand that in certain embodiments herein, a poly alpha-1,3-glucan ester compound can be in an anionic form under aqueous conditions. This anionic behavior is due to the presence of a carboxyl group (COOH) in the esterified first group (—CO—$C_x$—COOH). Carboxyl (COOH) groups of a poly alpha-1,3-glucan ester compound herein can convert to carboxylate (COO$^-$) groups in aqueous conditions. These anionic groups can interact with salt cations such as potassium, sodium, or lithium cations, if present.

In one embodiment, a poly alpha-1,3-glucan ester compound represented by Structure III as disclosed herein comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, poly alpha-1,3-glucan 2-octene-1-yl succinate, or mixtures thereof. In another embodiment, the poly alpha-1,3-glucan ester compound represented by Structure III comprises poly alpha-1,3-glucan succinate.

The term "degree of substitution" (DoS) as used herein refers to the average number of hydroxyl groups substituted in each monomeric unit (glucose) of a derivatized poly alpha-1,3-glucan compound. Poly alpha-1,3-glucan ester compounds represented by Structure III useful in the nonwoven webs disclosed herein have a degree of substitution (DoS) with one or more first groups (—CO—$C_x$—COOH) of about 0.001 to about 3. In one embodiment, the poly alpha-1,3-glucan ester compounds have a DoS in the range of about 0.001 to about 0.3, or from about 0.001 to about 0.2. Alternatively, the DoS of a poly alpha-1,3-glucan ester compound can be at least about 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. It would be understood by those skilled in the art that, since a poly alpha-1,3-glucan ester compound has a degree of substitution between about 0.001 to about 3, the R groups of the compound cannot only be hydrogen. With appropriate choice of the first group comprising —CO—$C_x$—COOH and the degree of substitution of the glucan polymer, the alpha-1,3-glucan ester compound can be insoluble in aqueous solution. The structure, molecular weight and DoS of a poly alpha-1,3-glucan ester product can be confirmed using various physiochemical analyses known in the art such as NMR spectroscopy and size exclusion chromatography (SEC).

A poly alpha-1,3-glucan ester compound herein can have at least about 50%, 60%, 70%, 80%, 90%, 95%, 96%, 97%, 98%, 99%, or 100% (or any integer between 50% and 100%) glycosidic linkages that are alpha-1,3. In such embodiments, accordingly, the poly alpha-1,3-glucan ester compound has less than about 50%, 40%, 30%, 20%, 10%, 5%, 4%, 3%, 2%, 1%, or 0% (or any integer value between 0% and 50%) of glycosidic linkages that are not alpha-1,3. A poly alpha-1,3-glucan ester compound preferably has at least about 98%, 99%, or 100% glycosidic linkages that are alpha-1,3.

The backbone of a poly alpha-1,3-glucan ester compound herein is preferably linear/unbranched. In certain embodiments, the compound has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The formula of a poly alpha-1,3-glucan ester compound in certain embodiments can have an n value of at least 6. Alternatively, n can have a value of at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000), for example. The value of n in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The molecular weight of a poly alpha-1,3-glucan ester compound disclosed herein can be measured as number-average molecular weight ($M_n$) or as weight-average molecular weight ($M_w$). Alternatively, molecular weight can be measured in Daltons or grams/mole. It may also be useful to refer to the DPw (weight average degree of polymerization) or $DP_n$ (number average degree of polymerization) of the poly alpha-1,3-glucan polymer component of the compound. The $M_n$ or $M_w$ of a poly alpha-1,3-glucan ester compound herein can be at least about 1000, for example. Alternatively, the $M_n$ or $M_w$ can be at least about 1000 to about 600000. Alternatively still, the $M_n$ or $M_w$ can be at least about 10000, 25000, 50000, 75000, 100000, 125000, 150000, 175000, 200000, 225000, 250000, 275000, or 300000 (or any integer between 10000 and 300000), for example.

The polysaccharide can be used in the form of a colloidal dispersion, wet cake, dry powder, fibrids, or a combination thereof. In one embodiment, the polysaccharide can be used in the form of a colloidal dispersion. As used herein, the term "colloidal dispersion" refers to a heterogeneous system having a dispersed phase and a dispersion medium, i.e., microscopically dispersed insoluble particles are suspended throughout another substance, for example water or an aqueous solution. An example of a colloidal dispersion in water is a hydrocolloid. The colloidal dispersion may be a stable colloidal dispersion or an unstable colloidal dispersion. The stable colloidal dispersion is stable at room temperature and/or at elevated temperature, for example, between 40 and 50° C. for a period of at least one month with no visible settling. The unstable dispersion, under the same conditions, may see at least a portion of the polysaccharide settle out of the dispersion. Agitation of the settled material will generally re-form the colloidal dispersion. In some embodiments, the colloidal dispersion is a stable dispersion. In other embodiments, the colloidal dispersion is an unstable dispersion. Colloidal dispersions of polysaccharides such as poly alpha-1,3-glucan or poly alpha-1,3-1,6-glucan can be prepared by dispersing the wet cake in water to form a polysaccharide colloidal dispersion, for example as disclosed in published patent application WO 2016/126685.

In another embodiment, the polysaccharide can be used in the form of a wet cake, for example containing greater than 5% by weight of water. A glucan wet cake is formed from a glucan colloidal dispersion by removing water by filtration. Water remains on the surface of glucan solid particles and trapped between particles. Whereas the glucan colloidal dispersion is a pourable liquid, the wet cake has a soft solid-like consistency. The term "poly alpha-1,3-glucan wet cake" herein refers to poly alpha-1,3-glucan that has been separated from a slurry and washed with water or an aqueous solution. Poly alpha-1,3-glucan or other polysaccharide is not dried when preparing a wet cake.

In a further embodiment, the polysaccharide can be used in the form of a dry powder. The polysaccharide as a wet cake can be dried under reduced pressure, at elevated temperature, by freeze drying, or a combination thereof, to give a powder comprising greater than or equal to 50 percent by weight of the polysaccharide. In some embodiments, the polysaccharide can be a powder, comprising less than or equal to 20 percent by weight water. In other embodiments, the polysaccharide can be a dry powder comprising less than or equal to 15, 14, 13, 12, 11, 10, 9, 8, 7, 6, 5, 4, 3, 2, or 1 percent by weight water.

In yet another embodiment, the polysaccharide can be used in the form of fibrids. The term "fibrids", as used herein, means nongranular, fibrous or film-like particles with at least one of their three dimensions being of minor magnitude relative to the largest dimension. In some embodiments, the polysaccharide can have a fiber-like and/or a sheet-like structure with a relatively large surface area when compared to a fiber. The surface area can be in the range of 5 to 50 meter$^2$/gram of material, with the largest dimension particle size of about 10 to 1000 micrometers and the smallest dimension size, length or thickness of 0.05 to 0.25 micrometers, resulting in an aspect ratio of largest to smallest dimension of 40 to 20,000. The terms "fibrids" and "polysaccharide fibrids" are used interchangeably herein.

Fibrids can be prepared by precipitation of a solution of polymeric material such as poly alpha-1,3-glucan or a poly alpha-1,3-glucan derivative (such as a poly alpha-1,3-glucan ether compound or a poly alpha-1,3-glucan ester compound) using a non-solvent under shear, preferably, high shear, for example as disclosed in published patent application WO 2016/196022, which is incorporated herein by reference in its entirety. The term "non-solvent" as used herein means that it is a poor solvent for the polymeric material, for example, the polymeric material has a solubility of less than 5 wt % in the solvent. In other embodiments, the polymeric material can have a solubility of less than 4, 3, 2, 1 or 0.5 wt % in the solvent. Examples of suitable non-solvents for the poly alpha-1,3-glucan or poly alpha-1,3-glucan derivative include, for example, methanol, ethanol, isopropanol, acetone, aqueous acidic solution, water, etc.

Fibrids can be made by a process comprising:
(a) dissolving poly alpha-1,3-glucan or poly alpha-1,3-glucan derivative in a solvent to make a poly alpha-1,3-glucan or poly alpha-1,3-glucan derivative solution;
(b) precipitating poly alpha-1,3-glucan fibrids or poly alpha-1,3-glucan derivative fibrids under shear to produce a suspension containing the fibrids.

Fibrids can also be made by the addition of a poly alpha-1,3-glucan solution or poly alpha-1,3-glucan derivative into a precipitating bath of liquid ("non-solvent"). The addition of the poly alpha-1,3-glucan solution or poly alpha-1,3-glucan derivative solution into the precipitating bath can be accomplished using any standards methods known to those skilled in the art. For example, direct injection can be used.

During the addition, the stream of polymer solution is subjected to shearing forces and turbulence causing the fibrids to precipitate in the form of a suspension by using a non-solvent (i.e., a liquid that has a solubility for the poly alpha-1,3-glucan or poly alpha-1,3-glucan derivative of less than 5 wt %), in other words, that is immiscible with poly alpha-1,3-glucan or poly alpha-1,3-glucan derivative. In some embodiments, the precipitating bath can comprise acid or alkali aqueous solution or alcohol.

It is possible to control (i) the viscosity of the suspension containing fibrids (ii) the size and/or (iii) the shape of the fibrids by controlling one or more process parameters such as, for example, the dope concentration, the type of solvent, the type of mixer, the mixing speed, the pH of precipitation bath, the rate of addition of the solution containing polymer, the amount of non-solvent used, the duration of mixing, the neutralization rate and the concentration of neutralizer. The term "dope" as used herein refers to solution containing polymer. A dope can be prepared by mixing polymer into a solvent. Thus, as well known to those skilled in the art, dope concentration refers to the amount of polymer mixed into the solvent.

The fibrids can be isolated by filtering the suspension. Optionally, the isolated fibrids can be washed with water and/or dried. It is believed that it is possible to re-suspend the dried fibrids either by adding a component such as carboxymethyl cellulose and the like or by functionalizing the fibrids by adding certain groups that would facilitate resuspension in a liquid.

Types of solvent for the poly alpha-1,3-glucan or poly alpha-1,3-glucan derivative that can be used include, but are not limited to, an aqueous basic solution containing components such as sodium hydroxide, potassium hydroxide, lithium hydroxide, lithium chloride/DMAC, or DMSO/lithium chloride. The solvent should be miscible with the liquid used for the precipitation bath. The mixing speed and the duration of mixing can be adjusted as desired. The pH of the precipitation bath can be adjusted from acidic to neutral to basic depending upon the solvent chosen.

Alternatively, in the mixing step the polysaccharide can be provided as a basic aqueous polysaccharide solution. In one embodiment, the polysaccharide may be solubilized in a range of from about 1 to about 13 weight percent in basic solution, for example about 4.5 wt % NaOH solution, under high shear mixing. To prepare a basic aqueous polysaccharide solution, an aqueous polysaccharide dispersion can be prepared with the desired amount of polysaccharide, and then a calculated quantity of base such as NaOH can be added. Preparation of basic aqueous polysaccharide solution is disclosed, for example, in published patent application US 2015/0191550 A1. Aqueous solutions containing sodium hydroxide, potassium hydroxide, lithium hydroxide, lithium chloride/N,N-dimethyacetamide, or tetraethyl ammonium hydroxide in a concentration sufficient to dissolve the polysaccharide can be used. The solvent compositions include but are not limited to aqueous NaOH (where the NaOH concentration typically ranges from 4 to 6 wt %), aqueous KOH (typically 7.5-10 wt % in water), and aqueous tetraethyl ammonium hydroxide (typically 20 wt %). A typical solution composition using aqueous bases can be 10% polymer, 6.8% KOH and the rest water, or 10% polymer, 4% NaOH and the rest water, or 7% polymer, 18.5% tertraethyl ammonium hydroxide, and the rest water. The polysaccharide polymer can be mixed into the solvent by application of shear. For aqueous solvent systems, a slurry of the polysaccharide polymer in water can be made, followed by addition of concentrated aqueous base. The polysaccharide polymer can be completely dried before use, or the moisture content in the polysaccharide polymer can be measured and accounted for in the solution preparation.

In one embodiment, the nonwoven web comprises a nonwoven substrate and a binder comprising a polysaccharide, wherein the polysaccharide is in the form of fibrids, and the polysaccharide is present in an amount from about 0.5 to about 20 weight percent, or from about 0.5 to about 15 weight percent, or from about 0.5 to about 10 weight percent, or from about 1 to about 5 weight percent, based on the weight of the nonwoven web. In one embodiment of the nonwoven web, the nonwoven substrate is a wet laid nonwoven substrate and the polysaccharide comprises poly alpha-1,3-glucan in the form of fibrids. In another embodiment of the nonwoven web, the nonwoven substrate is a wet laid nonwoven substrate and the polysaccharide comprises a poly alpha-1,3-glucan ether compound represented by Structure I as defined herein, and the polysaccharide is in the form of fibrids. In yet another embodiment of the nonwoven web, the nonwoven substrate is a wet laid nonwoven substrate and the polysaccharide comprises a poly alpha-1,3-glucan ether compound represented by Structure I as defined herein, wherein the positively charged organic group comprises a trimethylammonium group or a quaternary ammonium hydroxypropyl group, and the polysaccharide is in the form of fibrids.

In one embodiment is disclosed a nonwoven web, the nonwoven web comprising:

a nonwoven substrate and a binder comprising a polysaccharide, wherein the polysaccharide comprises:
  a) poly alpha-1,3-glucan;
  b) a poly alpha-1,3-glucan ether compound represented by Structure I:

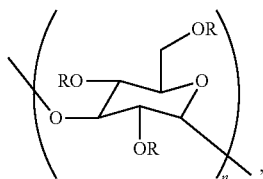

Structure I wherein
  (i) n is at least 6,
  (ii) each R is independently an H or a positively charged organic group, and
  (iii) the compound has a degree of substitution of about 0.001 to about 3.0;
  c) a composition comprising a graft copolymer comprising:
    (i) a backbone comprising dextran with a weight-average molecular weight (Mw) of at least about 100000 Daltons, and
    (ii) poly alpha-1,3-glucan side chains comprising at least about 95% alpha-1,3-glucosidic linkages;
  d) a composition comprising a crosslinked graft copolymer, wherein the graft copolymer portion of the crosslinked graft copolymer comprises:
    (i) a backbone comprising dextran, and
    (ii) poly alpha-1,3-glucan side chains comprising at least about 50% alpha-1,3-glucosidic linkages;
  e) a poly alpha-1,3-glucan ester compound represented by Structure III:

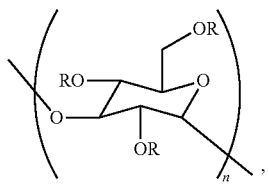

Structure III wherein
  (i) n is at least 6;
  (ii) each R is independently an —H or a first group comprising —CO—$C_x$—COOH, wherein the —$C_x$— portion of said first group comprises a chain of 2 to 6 carbon atoms; and
  (iii) the compound has a degree of substitution with the first group of about 0.001 to about 3; or
  f) a combination thereof.

The nonwoven substrate can be an airlaid nonwoven substrate, a multi-bonded airlaid nonwoven substrate, a carded nonwoven substrate, a wet laid nonwoven substrate, a spun lace nonwoven substrate, meltblown, or a spun bond nonwoven substrate. The nonwoven substrate can comprise natural fibers, synthetic fibers, or a combination thereof. In one embodiment the nonwoven substrate is an air laid nonwoven substrate. In one embodiment, the nonwoven substrate is a multi-bonded airlaid nonwoven substrate. In one embodiment, the nonwoven substrate is a carded nonwoven substrate. In one embodiment, the nonwoven substrate is a wet laid nonwoven substrate. In one embodiment, the nonwoven substrate is a spun lace nonwoven substrate. In one embodiment, the nonwoven substrate is a meltblown nonwoven substrate. In one embodiment, the nonwoven substrate is a spun bond nonwoven substrate.

In one embodiment, the binder comprises a polysaccharide, and the nonwoven web comprises the binder in an amount from about 0.5 weight percent to about 50 weight percent, based on the total weight of the nonwoven substrate and the binder. In one embodiment, the nonwoven web comprises 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (or any value in between 0.5 and 50) weight percent binder, based on the total weight of the nonwoven substrate and the binder. In another embodiment, the nonwoven web comprises from about 2 to about 40 weight percent binder, or from about 5 to about 40 weight percent binder, or from about 10 to about 35 weight percent binder. In a further embodiment, the binder comprises the polysaccharide without any additional components.

In some embodiments, the binder further comprises an additional component, in addition to the polysaccharide. For example, the binder may further comprise starch; hydroxyalkyl starch; modified starch; polyvinyl alcohol; ethylcellulose; hydroxyethylcellulose; methylcellulose; hydroxymethylcellulose; carboxymethylcellulose; sodium, potassium, or magnesium salts of carboxymethylcellulose; dextrin; gum arabic; a surfactant; or mixtures thereof.

The surfactant can be neutral, cationic, or anionic.

The binder can comprise one or more of the additional components in an amount ranging from about 0.05 weight percent to about 20 weight percent, based on the total weight of binder. In one embodiment, the binder comprises 0.05, 0.1, 0.15, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, or 20 (or any value between 0.05 and 20) weight percent, based on the total weight of binder. In one embodiment, the binder further comprises polyvinyl alcohol. In one embodiment, the binder further comprises ethylcellulose, hydroxyethylcellulose, methylcellulose, hydroxymethylcellulose, or carboxymethylcellulose. In another embodiment, the binder further comprises a sodium, potassium, or magnesium salt of carboxymethylcellulose. In another embodiment, the binder further comprises a surfactant. Yet in one embodiment, the binder is essentially free from starch, hydroxyalkyl starch, or modified starch. As used herein, the phrase "essentially free from" means that the binder contains less than 1% by weight of the component, or less than 0.5% by weight or less than 0.1% by weight or less than 0.01% by weight of the component. In still further embodiments, "essentially free from" means that the particular component is undetectable by $^1$H NMR analysis.

In one embodiment, the binder further comprises a polymeric component, for example a polymeric component derived from a latex composition. Optionally, a latex composition used to prepare the nonwoven web may contain both a polymeric component and a polysaccharide. In one embodiment, the binder further comprises a polymeric component which comprises a polymer polymerized from one or more copolymerizable monoethylenically unsaturated monomers. In one embodiment, the polymeric component comprises a polymer polymerized from one or more copolymerizable monoethylenically unsaturated monomers in water. In one embodiment, the one or more monoethylenically unsaturated monomer comprises vinyl monomers, acrylic monomers, allylic monomers, acrylamide monomers, monocarboxylic unsaturated acids, dicarboxylic unsaturated acids, or a mixture thereof. In one embodiment, the polymeric component comprises a polymer polymerized from vinyl monomers, acrylic monomers, or a mixture thereof. In another embodiment, the polymeric component comprises a polymer polymerized from vinyl monomers and acrylic monomers. In a further embodiment, the polymeric component comprises a polymer polymerized from vinyl copolymers and acrylic monomers. In yet another embodiment, the polymeric component comprises a polymer polymerized from vinyl monomers and acrylic copolymers. In a further embodiment, the polymeric component comprises a polymer polymerized from vinyl copolymers and acrylic copolymers. In yet an additional embodiment, the polymeric component comprises a polymer polymerized from one or more monomers comprising acrylic monomers, vinyl monomers, styrene monomers, or a combination thereof. Any of the known free-radical emulsion polymerization techniques can be used to formulate latex polymer, for example as disclosed in U.S. Pat. No. 5,486,576.

Vinyl monomers suitable for use in preparing the polymeric component include any compounds having vinyl functionality, i.e. ethylenic unsaturation, exclusive of compounds having acrylic functionality, e.g., acrylic acid, methacrylic acid, esters of such acids, acrylonitrile and acrylamides. In one embodiment, the vinyl monomers are selected from the group consisting of vinyl esters, vinyl aromatic hydrocarbons, vinyl aliphatic hydrocarbons, vinyl alkyl ethers, and mixtures thereof.

Suitable vinyl monomers can include vinyl esters such as, for example, vinyl acetate, vinyl propionate, vinyl laurate, vinyl pivalate, vinyl nonanoate, vinyl decanoate, vinyl neodecanoate, vinyl butyrates, vinyl benzoates, vinyl isopropyl acetates, and similar vinyl esters; vinyl aromatic hydrocarbons such as, for example, styrene, methyl styrenes, and similar lower alkyl styrenes, chlorostyrene, vinyl toluene, vinyl naphthalene, and divinyl benzene; vinyl aliphatic hydrocarbon monomers such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers such as, for example, methyl vinyl ether, isopropyl vinyl ether, n-butyl vinyl ether, and isobutyl vinyl ether.

The acrylic monomers suitable for use in preparing the polymeric component can include any compounds having acrylic functionality. In one embodiment, the acrylic monomers are selected from the group consisting of alkyl acrylates, alkyl methacrylates, acrylate acids, and methacrylate acids as well as aromatic derivatives of acrylic and methacrylic acid, acrylamides, and acrylonitrile. Typically, the alkyl acrylate and methacrylic monomers (also referred to as alkyl esters of acrylic or methacrylic acid) have an alkyl ester portion containing from 1 to about 18 carbon atoms per molecule, or from 1 to about 8 carbon atoms per molecule.

Suitable acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, isobornyl acrylate and methacrylate, neopentyl acrylate and methacrylate, and 1-adamantyl methacrylate. If acid functionality is desired, acids such as acrylic acid or methacrylic acid can also be used.

In addition to the specific monomers listed above, other monomers such as allylic monomers, or monomers which impart wet adhesion, such as monomers having tertiary amine, ethylene ureide, or N-heterocyclic groups can be used in place of, or in addition to, the specifically listed monomers in the preparation of the polymer dispersions. Representative wet adhesion promoting monomers include methacrylamidoetyyl ethylene urea, dimethylaminoethyl methacrylate, vinyl imidazole, and 2-ethyleneuriedo-ethyl methacrylate. The amount of such other monomers id dependent on the particular monomers and their intended function, which can be determined by those of skill in the art.

In one embodiment, the binder comprises a polysaccharide and further comprises a polymeric component, and the nonwoven web comprises the binder in an amount from about 1 weight percent to about 40 weight percent, based on the total weight of the binder and the nonwoven substrate. In one embodiment, the nonwoven web comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 (or any value between 1 and 40) weight percent binder, based on the total weight of the nonwoven substrate and the binder.

In one embodiment, the nonwoven web comprises a nonwoven substrate and a binder comprising a polysaccharide, wherein the nonwoven substrate comprises cellulosic fibers, the polysaccharide comprises poly alpha-1,3-glucan, and the binder further comprises a polymeric component comprising a polymer polymerized from one or more monomers comprising acrylic monomers, vinyl monomers, styrene monomers, or a combination thereof. In one embodiment, the nonwoven web comprises a nonwoven substrate and a binder comprising a polysaccharide, wherein the nonwoven substrate comprises cellulosic fibers, the polysaccharide comprises a poly alpha-1,3-glucan ether compound represented by Structure I as defined herein, and the binder further comprises a polymeric component comprising a polymer polymerized from one or more monomers comprising acrylic monomers, vinyl monomers, styrene monomers, or a combination thereof. In one embodiment, the nonwoven web comprises a nonwoven substrate and a binder comprising a polysaccharide, wherein the nonwoven substrate comprises cellulosic fibers, the polysaccharide comprises a composition comprising a graft copolymer comprising: (i) a backbone comprising dextran with a weight-average molecular weight of at least about 100000 Daltons, and (ii) poly alpha-1,3-glucan side chains comprising at least about 95% alpha-1,3-glucosidic linkages, and the binder further comprises a polymeric component comprising a polymer polymerized from one or more monomers comprising acrylic monomers, vinyl monomers, styrene monomers, or a combination thereof. In one embodiment, the nonwoven web comprises a nonwoven substrate and a binder comprising a polysaccharide, wherein the nonwoven substrate comprises cellulosic fibers, the polysaccharide comprises, a composition comprising a graft copolymer comprising (i) a backbone comprising dextran with a weight-average molecular weight (Mw) of at least about 100000 Daltons, and (ii) poly alpha-1,3-glucan side chains comprising at least about 95% alpha-1,3-glucosidic linkages, and the binder further comprises a polymeric component comprising a polymer polymerized from one or more monomers comprising acrylic monomers, vinyl monomers, styrene monomers, or a combination thereof.

In one embodiment, the nonwoven web comprises a nonwoven substrate and a binder comprising polysaccharide, wherein the nonwoven substrate comprises cellulosic fibers and the polysaccharide comprises poly alpha-1,3-glucan. In one embodiment, the nonwoven web comprises a nonwoven substrate and a binder comprising a polysaccharide, wherein the nonwoven substrate comprises cellulosic fibers, the polysaccharide comprises poly alpha-1,3-glucan, and the binder further comprises vinyl acetate ethylene copolymer. In one embodiment, the nonwoven web comprises a nonwoven substrate and a binder comprising a polysaccharide, wherein the nonwoven substrate comprises cellulosic fibers, the polysaccharide comprises a poly alpha-1,3-glucan ether compound represented by Structure I as defined herein, and the binder further comprises vinyl acetate ethylene copolymer. In one embodiment, the nonwoven web comprises a nonwoven substrate and a binder comprising a polysaccharide, wherein the nonwoven substrate comprises cellulosic fibers, the polysaccharide comprises a graft copolymer comprising: (i) a backbone comprising dextran with a weight-average molecular weight of at least about 100000 Daltons, and (ii) poly alpha-1,3-glucan side chains comprising at least about 95% alpha-1,3-glucosidic linkages, and the binder further comprises vinyl acetate ethylene copolymer. In one embodiment, the nonwoven web comprises a nonwoven substrate and a binder comprising a polysaccharide, wherein the nonwoven substrate comprises cellulosic fibers, the polysaccharide comprises a graft copolymer comprising (i) a backbone comprising dextran with a weight-average molecular weight (Mw) of at least about 100000 Daltons, and (ii) poly alpha-1,3-glucan side chains comprising at least about 95% alpha-1,3-glucosidic linkages, and the binder further comprises vinyl acetate ethylene copolymer. In one embodiment, the nonwoven web comprises a nonwoven substrate and a binder comprising a polysaccharide, wherein the nonwoven substrate comprises cellulosic fiber, the polysaccharide comprises a poly alpha-1,3-glucan ester compound represented by Structure III as defined herein, and the binder further comprises vinyl acetate ethylene copolymer. In another embodiment, the nonwoven web comprises a nonwoven substrate and a binder comprising a polysaccharide, wherein the nonwoven substrate comprises cellulosic fiber, the polysaccharide comprises a poly alpha-1,3-glucan ester compound represented by Structure III as defined herein wherein the positively charged organic group comprises a trimethylammonium group or a quaternary ammonium hydroxypropyl group, and the binder further comprises vinyl acetate ethylene copolymer.

In one embodiment, the nonwoven web comprises a nonwoven substrate and a binder comprising a polysaccharide, wherein the nonwoven substrate comprises cellulosic fibers and the polysaccharide comprises a graft copolymer comprising (i) a backbone comprising dextran with a weight-average molecular weight of at least about 100000 Daltons, and (ii) poly alpha-1,3-glucan side chains comprising at least about 95% alpha-1,3-glucosidic linkages. In another embodiment, the nonwoven web comprises a nonwoven substrate and a binder comprising a polysaccharide, wherein the nonwoven substrate comprises cellulosic and viscose fibers, and the polysaccharide comprises a graft copolymer comprising (i) a backbone comprising dextran with a weight-average molecular weight of at least about 100000 Daltons, and (ii) poly alpha-1,3-glucan side chains comprising at least about 95% alpha-1,3-glucosidic linkages. In an additional embodiment, the nonwoven web comprises a nonwoven substrate and a binder comprising a polysaccharide, wherein the nonwoven substrate comprises cellulosic and polypropylene fibers, and the polysaccharide comprises a graft copolymer comprising (i) a backbone comprising dextran with a weight-average molecular weight of at least about 100000 Daltons, and (ii) poly alpha-1,3-glucan side chains comprising at least about 95% alpha-1,3-glucosidic linkages. In a further embodiment, the nonwoven web comprises a nonwoven substrate and a binder comprising a polysaccharide, wherein the nonwoven substrate comprises bicomponent fibers having a side-by-side or sheath/core orientation and comprising a polyethylene/polyethylene terephthalate composition or at least one of polyolefin, polytetrafluoroethylene, polyester, polyvinyl acetate, polyvinyl chloride acetate, polyvinyl butyral, acrylic resins, polymethylacrylate, polymethylmethacrylate, polyimide, polyvinyl chloride, polyvinylidene chloride, polystyrene, polyvinyl alcohol, polyurethane, or cellulosic resins, and the polysaccharide comprises a graft copolymer comprising (i) a backbone comprising dextran with a weight-average molecular weight of at least about 100000 Daltons, and (ii) poly alpha-1,3-glucan side chains comprising at least about 95% alpha-1,3-glucosidic linkages.

In one embodiment, the nonwoven web comprises a nonwoven substrate and a binder comprising a polysaccharide, wherein the nonwoven substrate comprises cellulosic fibers and the polysaccharide comprises a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages. In another embodiment, the nonwoven web comprises a nonwoven substrate and a binder comprising a polysaccharide, wherein the nonwoven substrate comprises cellulosic and viscose fibers, and the polysaccharide comprises a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages. In an additional embodiment, the nonwoven web comprises a nonwoven substrate and a binder comprising a polysaccharide, wherein the nonwoven substrate comprises cellulosic and polypropylene fibers, and the polysaccharide comprises a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages. In a further embodiment, the nonwoven web comprises a nonwoven substrate and a binder comprising a polysaccharide, wherein the nonwoven substrate comprises bicomponent fibers having a side-by-side or sheath/core orientation and comprising a polyethylene/polyethylene terephthalate composition or at least one of polyolefin, polytetrafluoroethylene, polyester, polyvinyl acetate, polyvinyl chloride acetate, polyvinyl butyral, acrylic resins, polymethylacrylate, polymethylmethacrylate, polyamide, polyvinyl chloride, polyvinylidene chloride, polystyrene, polyvinyl alcohol, polyurethane, or cellulosic resins, and the polysaccharide comprises a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages.

In one embodiment, the nonwoven web comprises a nonwoven substrate and a binder comprising a polysaccharide, wherein the polysaccharide comprises poly alpha-1,3-glucan (homopolymer) and a graft copolymer comprising (i) a backbone comprising dextran with a weight-average molecular weight of at least about 100000 Daltons, and (ii) poly alpha-1,3-glucan side chains comprising at least about 95% alpha-1,3-glucosidic linkages. In another embodiment, the nonwoven web comprises a nonwoven substrate and a binder comprising a polysaccharide, wherein the nonwoven substrate comprises cellulosic fibers and the polysaccharide comprises poly alpha-1,3-glucan (homopolymer) and a graft copolymer comprising (i) a backbone comprising dextran with a weight-average molecular weight of at least about 100000 Daltons, and (ii) poly alpha-1,3-glucan side chains comprising at least about 95% alpha-1,3-glucosidic linkages. In a further embodiment, the nonwoven web comprises a nonwoven substrate and a binder comprising a polysaccharide, wherein the nonwoven substrate comprises cellulosic fibers and the polysaccharide comprises poly alpha-1,3-glucan (homopolymer) and a graft copolymer comprising (i) a backbone comprising dextran with a weight-average molecular weight of at least about 100000 Daltons, and (ii) poly alpha-1,3-glucan side chains comprising at least about 95% alpha-1,3-glucosidic linkages, and the binder further comprises a polymeric component. In yet an additional embodiment, the nonwoven web comprises a nonwoven substrate and a binder comprising a polysaccharide, wherein the nonwoven substrate comprises cellulosic fibers and the polysaccharide comprises poly alpha-1,3-glucan (homopolymer) and a graft copolymer comprising (i) a backbone comprising dextran with a weight-average molecular weight of at least about 100000 Daltons, and (ii) poly alpha-1,3-glucan side chains comprising at least about 95% alpha-1,3-glucosidic linkages, and the binder further comprises vinyl acetate ethylene copolymer.

In one embodiment, the nonwoven web comprises a nonwoven substrate and a binder comprising a polysaccharide, wherein the polysaccharide comprises poly alpha-1,3-glucan (homopolymer) and a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages. In another embodiment, the nonwoven web comprises a nonwoven substrate and a binder comprising a polysaccharide, wherein the nonwoven substrate comprises cellulosic fibers and the polysaccharide comprises poly alpha-1,3-glucan (homopolymer) and a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages. In a further embodiment, the nonwoven web comprises a nonwoven substrate and a binder comprising a polysaccharide, wherein the nonwoven substrate comprises cellulosic fibers and the polysaccharide comprises poly alpha-1,3-glucan (homopolymer) and a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages, and the binder further comprises a polymeric component. In yet an additional embodiment, the nonwoven web comprises a nonwoven substrate and a binder comprising a polysaccharide, wherein the nonwoven substrate comprises cellulosic fibers and the polysaccharide comprises poly alpha-1,3-glucan (homopolymer) and a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages, and the binder further comprises vinyl acetate ethylene copolymer.

Processes for preparing the nonwoven webs disclosed herein above are provided. In one embodiment, the process comprises the steps:

a) providing a nonwoven substrate comprising a first surface;

b) contacting the first surface with a polysaccharide and with a polymeric component to form a coated nonwoven substrate;

c) heating the coated nonwoven substrate at a temperature in the range of about 90° C. to about 170° C. to form a bonded nonwoven web; and d) optionally, calendaring the bonded nonwoven web.

In some embodiments, the polysaccharide comprises:

a) poly alpha-1,3-glucan;

b) a poly alpha-1,3-glucan ether compound represented by Structure I:

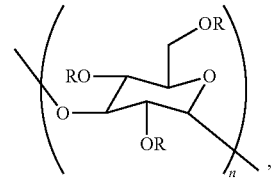

Structure I wherein
(i) n is at least 6,
(ii) each R is independently an H or a positively charged organic group, and
(iii) the compound has a degree of substitution of about 0.05 to about 3.0;

c) a composition comprising a graft copolymer comprising:
(i) a backbone comprising dextran with a weight-average molecular weight (Mw) of at least about 100000 Daltons, and
(ii) poly alpha-1,3-glucan side chains comprising at least about 95% alpha-1,3-glucosidic linkages;

d) a composition comprising a crosslinked graft copolymer, wherein the graft copolymer portion of the crosslinked graft copolymer comprises:
(i) a backbone comprising dextran, and
(ii) poly alpha-1,3-glucan side chains comprising at least about 50% alpha-1,3-glucosidic linkages;

e) a poly alpha-1,3-glucan ester compound represented by Structure III:

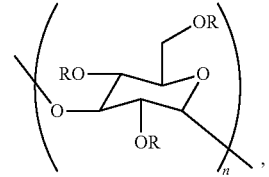

Structure III wherein
(i) n is at least 6;
(ii) each R is independently an —H or a first group comprising —CO—$C_x$—COOH, wherein the —$C_x$— portion of said first group comprises a chain of 2 to 6 carbon atoms; and
(iii) the compound has a degree of substitution with the first group of about 0.001 to about 3; or
f) a combination thereof.

In some embodiments, the polymeric component comprises a polymer polymerized from one or more monomers comprising acrylic monomers, vinyl monomers, styrene monomers, or combinations thereof.

In one embodiment, the nonwoven substrate is an air laid nonwoven substrate. In one embodiment, the nonwoven substrate is a wet laid nonwoven substrate.

In the contacting step, the polysaccharide and the polymeric component can be contacted with the surface of the nonwoven substrate at the same time or sequentially. The polysaccharide can be used in a solid form, for example as dry powder or as wet cake. Alternatively, the polysaccharide can be used as a colloidal dispersion, as fibrids, or as a solution in which the polysaccharide is dissolved in an appropriate solvent. The polymeric component can be used as a solid, as a solution in which the polymeric component is dissolved in an appropriate solvent, or as a dispersion, for example as a latex composition comprising the polymeric component. Optionally, a latex composition comprising the polymeric component can be contacted with the nonwoven substrate to form a coated nonwoven substrate. The nonwoven substrate can be contacted with a latex composition comprising the polymeric component, and optionally further comprising the polysaccharide, by methods known in the art, including spraying or dipping.

In one embodiment, the contacting step disposes a polysaccharide and a polymeric component in a substantially continuous layer on the first surface of the nonwoven substrate. The phrase "substantially continuous layer" means a layer of a composition applied to at least a portion of a substrate, wherein a dried layer of the composition covers greater than or equal to 99% of the surface to which it has been applied and having less than 1% voids in the layer that expose the substrate surface. The greater than or equal to 99% of the surface to which the layer has been applied excludes any area of the substrate to which the layer has not been applied. For example, a continuous layer can be applied to only a portion of a nonwoven substrate and still be considered a continuous layer to the area which the layer has been applied. In another embodiment, the contacting step disposes a polysaccharide and a polymeric component in a discontinuous manner on the first surface of the nonwoven substrate, for example in a random manner or in a selected pattern.

The coated nonwoven substrate can be heated at a temperature in the range of about 90° C. to about 170° C., for example in the range of about 90° C. to about 165° C., or from about 100° C. to about 160° C., or from about 125° C. to about 170° C., to form a bonded nonwoven web. The heating may be performed at one temperature or at more than one temperature. The heating step can also function as a curing step. Optionally, the bonded nonwoven web can be contacted on a second side with the polysaccharide and a polymeric component. Optionally, the bonded nonwoven web can be calendared, for example by using calendar rolls, or using other methods known in the art.

In another embodiment is disclosed a nonwoven web, the nonwoven web comprising: a nonwoven substrate and a binder comprising a polysaccharide, wherein the polysaccharide comprises:
a) a graft copolymer comprising:
(i) a backbone comprising dextran with a weight-average molecular weight (Mw) of at least about 100000 Daltons, and
(ii) poly alpha-1,3-glucan side chains comprising at least about 95% alpha-1,3-glucosidic linkages; and/or
b) a crosslinked graft copolymer, wherein the graft copolymer portion of the crosslinked graft copolymer comprises:
(i) a backbone comprising dextran, and
(ii) poly alpha-1,3-glucan side chains comprising at least about 50% alpha-1,3-glucosidic linkages;

and wherein the nonwoven substrate further comprises bicomponent fibers. As used herein, "bicomponent fibers" means fibers composed of two or more polymer types (or variants of the same polymer) extruded from the same spinneret with both polymers within the same filament in a sheath/core or side-by-side orientation. In a sheath/core orientation, one polymer type forms a core and a second polymer type surrounds it as a sheath. In a side-by side orientation, the polymers have a bilateral relation.

The bicomponent fibers can have a side-by-side or sheath/core orientation. The bicomponent fibers can have a length in the range of from about 2 mm to about 60 mm. The bicomponent fibers can be uniform in length or can have a range of lengths. In one embodiment, the bicomponent fibers can comprise a thermoplastic material. The bicomponent fibers can comprise polyolefin, polytetrafluoroethylene, polyester, polyvinyl acetate, polyvinyl chloride acetate, polyvinyl butyral, acrylic resins, polyamide, polyvinyl chloride, polyvinylidene chloride, polystyrene, polyvinyl alcohol, polyurethanes, or cellulosic resins. Examples of suitable olefins include polyethylene, polypropylene, polybutylene, and copolymers thereof. Examples of suitable polyesters include polyethylene terephthalate. Examples of suitable acrylic resins include polymethylacrylate and polymethylmethacrylate. Examples of suitable cellulosic resins include cellulosic nitrate, cellulosic acetate, cellulosic acetate butyrate, ethyl cellulose, and copolymers of these. In one embodiment, the bicomponent fiber comprises a first component having a lower melting temperature than the second component. In one embodiment, the bicomponent fiber comprises a component having a melting temperature in the range of about 75° C. and 175° C. Examples of useful bicomponent fiber compositions include olefin/polyester compositions in a sheath/core orientation, for example polyethylene/polyethylene terephthalate compositions. In one embodiment, the bicomponent fibers comprise a polyethylene/polyethylene terephthalate composition. In a sheath/core bicomponent fiber, the core can also be made of a thermosetting resin such as phenol-formaldehyde, phenol furfural, urea-formaldehyde, melamine-formaldehyde, or silicon rubber. The bicomponent fibers can be treated or untreated. Nonwoven substrates comprising bicomponent fibers can be obtained commercially or prepared using methods known in the art.

The binder comprises the polysaccharide in an amount in the range of from about 15 weight percent to about 99 weight percent, based on the total weight of the binder. In one embodiment, the binder comprises 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 weight percent polysaccharide, based on the total weight of the binder.

In one embodiment, the nonwoven web comprises a nonwoven substrate comprising cellulosic fibers and a binder comprising a polysaccharide, wherein the nonwoven substrate further comprises bicomponent fibers comprising a polyethylene/polyethylene terephthalate composition, and the polysaccharide comprises a graft copolymer comprising (i) a backbone comprising dextran with a weight-average molecular weight (Mw) of at least about 100000 Daltons, and (ii) poly alpha-1,3-glucan side chains comprising at least about 95% alpha-1,3-glucosidic linkages. In another embodiment, the nonwoven web comprises a nonwoven substrate comprising cellulosic fibers and a binder comprising a polysaccharide, wherein the nonwoven substrate further comprises bicomponent fibers comprising a polyethylene/polyethylene terephthalate composition, and the polysaccharide comprises a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages.

In one embodiment, the nonwoven web comprises a nonwoven substrate comprising cellulosic fibers and a binder comprising a polysaccharide, wherein the nonwoven substrate further comprises bicomponent fibers comprising a cellulosic resin, and the polysaccharide comprises a graft copolymer comprising (i) a backbone comprising dextran with a weight-average molecular weight (Mw) of at least about 100000 Daltons, and (ii) poly alpha-1,3-glucan side chains comprising at least about 95% alpha-1,3-glucosidic linkages. In another embodiment, the nonwoven web comprises a nonwoven substrate comprising cellulosic fibers and a binder comprising a polysaccharide, wherein the nonwoven substrate further comprises bicomponent fibers comprising a cellulosic resin, and the polysaccharide comprising a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages.

In one embodiment, nonwoven webs can be prepared using a process comprising the steps:

a) providing a nonwoven substrate having a first surface and comprising side-by-side or sheath/core bicomponent fibers;

b) providing a polysaccharide comprising:

A) a graft copolymer comprising:
   (i) a backbone comprising dextran with a weight-average molecular weight (Mw) of at least about 100000 Daltons, and
   (ii) poly alpha-1,3-glucan side chains comprising at least about 95% alpha-1,3-glucosidic linkages; and/or B) a crosslinked graft copolymer, wherein the graft copolymer portion of the crosslinked graft copolymer comprises:
   (i) a backbone comprising dextran, and
   (ii) poly alpha-1,3-glucan side chains comprising at least about 50% alpha-1,3-glucosidic linkages;

c) contacting at least a portion of the first surface of the nonwoven substrate with the polysaccharide;

d) heating the material obtained in step c) at a temperature in the range of about 90° C. to about 170° C. to form a bonded nonwoven web comprising the polysaccharide; and e) optionally, calendaring the bonded nonwoven web obtained in step d). In one embodiment, step c) further comprises adding water to the polysaccharide and/or to the surface of the nonwoven substrate. In another embodiment, step c) further comprises adding additional bicomponent fibers to the polysaccharide and/or to at least a portion of the first surface of the nonwoven substrate. In an additional embodiment, step c) further comprises one or both of: i) adding water to the polysaccharide and/or to the surface of the nonwoven substrate; and ii) adding bicomponent fibers to the polysaccharide and/or to at least a portion of the first surface of the nonwoven substrate. The composition of the additional bicomponent fibers can be the same as or different from the composition of the bicomponent fibers contained in the nonwoven substrate. The amount of additional bicomponent fibers added in step c) is typically an amount sufficient to promote consolidation of the nonwoven substrate and the polysaccharide in step d) heating the material obtained in step c).

In the contacting step, the polysaccharide can be used in a solid form, for example as dry powder or as wet cake. Alternatively, the polysaccharide can be used as a colloidal dispersion or as fibrids. In one embodiment, the steps of b) providing a polysaccharide and c) contacting the polysaccharide and the nonwoven substrate can be combined with step a) providing a nonwoven substrate comprising bicomponent fibers, which can allow the incorporation of particulate polysaccharide material as well as bicomponent fibers throughout the structure of the nonwoven substrate.

Optionally, a step of consolidating the coated nonwoven substrate can be performed. Consolidating may be performed by methods known in the art, for example by hydraulic needling.

The nonwoven webs disclosed herein can be useful in a variety of articles. In one embodiment, a nonwoven web can be in the form of, or comprised within, a personal care product, household product, medical product, agricultural product, or industrial product, for example. In another embodiment, the article can be an absorbing wipe, paper towel, tissue, or napkin. In certain embodiments, articles comprising a nonwoven web disclosed herein can be used as absorbent or superabsorbent materials, depending on the degree of absorption exhibited by the constituent graft copolymer or crosslinked graft copolymer. Examples of such materials include those that are hypoallergenic. A superabsorbent material herein has an absorption capacity with respect to an aqueous liquid herein of at least 15 g aqueous liquid/g graft copolymer, for example. A personal care product, household product, medical product, agricultural product, or industrial product in some embodiments can comprise a nonwoven web comprising an absorbent or superabsorbent material as disclosed herein.

Examples of personal care products and/or uses include absorbent personal hygiene products such as baby diapers, potty training pants, incontinence products (e.g., pads, adult diapers), and feminine hygiene products (e.g., sanitary napkins/pads, tampons, interlabial products, panty liners).

Examples of industrial products and/or uses include telecommunication cable wrappings; food pads; agricultural and forestry applications such as for retaining water in soil and/or to release water to plant roots; fire-fighting devices; and cleanup of acidic or basic aqueous solutions spills.

Examples of agricultural products and/or uses include as geotextiles, seeding or growing containers, and horticulture mats. Geotextiles are permeable fabrics which, when used in association with soil, have the ability to separate, filter, reinforce, protect, or drain. Geotextiles can be used to stabilize loose soil and prevent erosion. Seeding containers, growing containers, and horticultural mats are products comprising a nonwoven web as disclosed herein and containing at least one of a plant, seed, groundcover, fertilizer, bulb, chemical soil, nonchemical soil, herbicide, insecticide, and/or ground or plant treatment.

Examples of medical products and/or uses include wound healing dressings such as bandages and surgical pads; phantoms for ultrasound-based imaging; hospital bed sheets; sanitary towels; controlled drug release devices; cell immobilization islets; three-dimensional cell culture substrates; bioactive scaffolds for regenerative medicine; stomach bulking devices; and disposal of controlled drugs.

Personal care products, household products, and/or medical products in some embodiments herein can absorb a bodily fluid such as urine, blood, blood serum, liquid fecal matter (e.g., diarrhea), bile, stomach acid/juice, vomit, amniotic fluid, breast milk, cerebrospinal fluid, exudate, lymph, mucus (e.g., nasal drainage, phlegm), peritoneal fluid, pleural fluid, pus, rheum, saliva, sputum, synovial fluid, sweat, and/or tears.

The nonwoven webs disclosed herein can also be useful in articles such as laminates or pouched laminates. The laminate may comprise two substrates (a first substrate and a second substrate) that are bonded together through a binder comprising a polysaccharide, with or without an adhesive. The pouch may be sealed on one side or around an edge, for example by lamination. As used herein, "pouched laminate" means an article including one or more discrete pockets therein, containing there within a plurality of discrete particles of polysaccharide. Suitable pockets can be individual cells, strips of cells, or multiple cells in both length and width providing a type of "quilt". In one embodiment the first and second substrates can be the same, for example comprising the same material. In another embodiment the first and second substrates can be different, for example comprising different materials. The substrate can be a nonwoven web comprising natural and/or synthetic fibers; tissue; towel; synthetic or biodegradable netting; peat papers; other sheet materials or films such as polylactic acid (PLA) film. Pouched laminates can be made using methods known in the art and as disclosed herein in Example 6.

Articles such as laminates and pouched laminates can be used as absorbent pads, wipes, as a component of a personal care product or for agricultural purposes such as seeding or growing containers and horticulture mats.

The nonwoven webs disclosed herein can be useful in laminates having a sandwich structure, for example polysaccharide disposed between two layers of nonwoven substrate. Optionally, an additional layer of a polymeric substrate can be placed in contact with at least one of the nonwoven substrates, optionally with polysaccharide disposed between the nonwoven substrate and the polymeric layer. In another embodiment, polysaccharide can be disposed between a layer of nonwoven substrate and a polymeric layer. The polymeric layer can comprise polyethylene, polypropylene, ethylene copolymer, polyvinyl butyrate, polylactic acid, polyvinyl alcohol, polyamide, polyether thermoplastic elastomers, polyesters, polyether esters, ethylene vinyl alcohol copolymers, starch, or a combination thereof.

Non-limiting examples of nonwoven webs, articles comprising nonwoven webs, and methods disclosed herein include:

1. A nonwoven web comprising a nonwoven substrate and a binder comprising a polysaccharide, wherein the polysaccharide comprises:

a) poly alpha-1,3-glucan;

b) a poly alpha-1,3-glucan ether compound represented by Structure I:

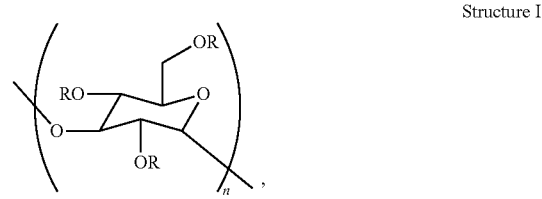

Structure I wherein (i) n is at least 6, (ii) each R is independently an H or a positively charged organic group, and (iii) the compound has a degree of substitution of about 0.001 to about 3.0;

c) a graft copolymer comprising (i) a backbone comprising dextran with a weight-average molecular weight (Mw) of at least about 100000 Daltons, and (ii) poly alpha-1,3-glucan side chains comprising at least about 95% alpha-1,3-glucosidic linkage;

d) a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages;

e) a poly alpha-1,3-glucan ester compound represented by Structure III:

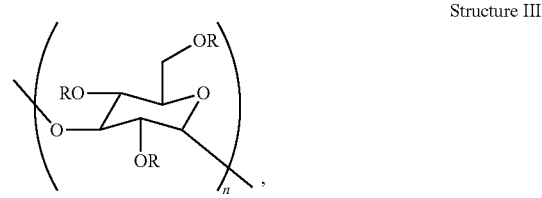

Structure III wherein (i) n is at least 6; (ii) each R is independently an —H or a first group comprising —CO—$C_x$—COOH, wherein the —$C_x$— portion of said first group comprises a chain of 2 to 6 carbon atoms; and (iii) the compound has a degree of substitution with the first group of about 0.001 to about 3; or f) a combination thereof.

2. The nonwoven web of embodiment 1, wherein the nonwoven substrate is an air laid nonwoven substrate, a multi-bonded air laid nonwoven substrate, a carded nonwoven substrate, a wet laid nonwoven substrate, a spun lace nonwoven substrate, a meltblown nonwoven substrate, or a spun bond nonwoven substrate.

3. The nonwoven web of embodiment 1 or 2, wherein the nonwoven substrate comprises natural fibers.

4. The nonwoven web of embodiment 1, 2, or 3, wherein the nonwoven substrate comprises synthetic fibers.

5. The nonwoven web of embodiment 1, 2, 3, or 4, wherein the synthetic fibers comprise rayon, polyester, polyamide, polyolefin, or combinations thereof.

6. The nonwoven web of embodiment 1, 2, 3, 4, or 5, wherein the binder further comprises a polymeric component.

7. The nonwoven web of embodiment 1, 2, 3, 4, 5, or 6, wherein the binder further comprises a polymeric component, and the polymeric component comprises a polymer polymerized from one or more of acrylic monomers, vinyl monomers, styrene monomers, or a combination thereof.

8. The nonwoven web of embodiment 1, 2, 3, 4, 5, 6, or 7, wherein the nonwoven substrate comprises cellulosic fibers, the polysaccharide comprises poly alpha-1,3-glucan, and the binder further comprises vinyl acetate ethylene copolymer.

9. The nonwoven web of embodiment 1, 2, 3, 4, 5, 6, 7, or 8, wherein the web comprises the binder in an amount from about 5 wt % to about 40 wt %, based on the total weight of the nonwoven substrate and the binder.

10. The nonwoven web of embodiment 1, 2, 3, 4, 5, 6, 7, 8, or 9, wherein the binder further comprises starch; hydroxyalkyl starch; modified starch; polyvinyl alcohol; ethylcellulose; hydroxyethylcellulose; methylcellulose; hydroxymethylcellulose; carboxymethylcellulose; sodium, potassium, or magnesium salts of carboxymethylcellulose; dextrin; gum arabic; a surfactant; or mixtures thereof.

11. The nonwoven web of embodiment 1, 2, 3, 4, 5, 6, 7, 8, 9, or 10, wherein the polysaccharide is in the form of fibrids.

12. The nonwoven web of embodiment 1, 2, 3, 4, 5, 6, 7, 8, 9, 10, or 11, wherein the polysaccharide comprises poly alpha-1,3-glucan.

13. The nonwoven web of embodiment 1, 2, 3, 4, 5, 6, 7, 8, 9, 10, or 11, wherein the polysaccharide comprises a poly alpha-1,3-glucan ether compound represented by Structure I:

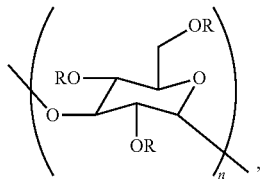

Structure I wherein (i) n is at least 6, (ii) each R is independently an H or a positively charged organic group, and (iii) the compound has a degree of substitution of about 0.001 to about 3.0.

14. The nonwoven web of embodiment 1, 2, 3, 4, 5, 6, 7, 8, 9, 10, 11, or 13, wherein the polysaccharide comprises a poly alpha-1,3-glucan ether compound and the positively charged organic group comprises a substituted ammonium group, a quaternary ammonium group, an alkyl group, or a hydroxy alkyl group.

15. The nonwoven web of embodiment 1, 2, 3, 4, 5, 6, 7, 8, 9, 10, 11, 13, or 14, wherein the polysaccharide comprises a poly alpha-1,3-glucan ether compound and the positively charged organic group comprises a trimethylammonium group.

16. The nonwoven web of embodiment 1, 2, 3, 4, 5, 6, 7, 8, 9, 10, 11, 13, 14, or 15, wherein the polysaccharide comprises a poly alpha-1,3-glucan ether compound and the positively charged organic group comprises a quaternary ammonium hydroxypropyl group.

17. The nonwoven web of embodiment 1, 2, 3, 4, 5, 6, 7, 8, 9, 10, or 11, wherein the polysaccharide comprises a) a graft copolymer comprising (i) a backbone comprising dextran with a weight-average molecular weight (Mw) of at least about 100000 Daltons, and (ii) poly alpha-1,3-glucan side chains comprising at least about 95% alpha-1,3-glucosidic linkages; and/or b) a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages.

18. The nonwoven web of embodiment 1, 2, 3, 4, 5, 6, 7, 8, 9, 10, or 11, wherein the polysaccharide comprises a poly alpha-1,3-glucan ester compound represented by Structure III:

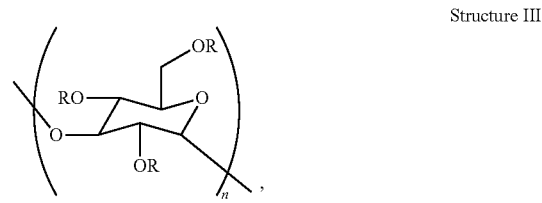

Structure III wherein (i) n is at least 6; (ii) each R is independently an —H or a first group comprising —CO—$C_x$—COOH, wherein the —$C_x$— portion of said first group comprises a chain of 2 to 6 carbon atoms; and (iii) the compound has a degree of substitution with the first group of about 0.001 to about 3.

19. The nonwoven web of embodiment 1, 2, 3, 4, 5, 6, 7, 8, 9, 10, 11, 12, 13, 14, 15, 16, 17, or 18, wherein the nonwoven substrate comprises bicomponent fibers.

20. The nonwoven web of embodiment 19, wherein the bicomponent fibers comprise polyolefin, polytetrafluoroethylene, polyester, polyvinyl acetate, polyvinyl chloride acetate, polyvinyl butyral, acrylic resins, polymethylacrylate, polymethylmethacrylate, polyimide, polyvinyl chloride, polyvinylidene chloride, polystyrene, polyvinyl alcohol, polyurethane, or cellulosic resins.

21. The nonwoven web of embodiment 19 or 20, wherein the bicomponent fibers have a side-by-side or sheath/core orientation.

22. The nonwoven web of embodiment 19, 20, or 21, wherein the bicomponent fibers comprise a polyethylene/polyethylene terephthalate composition.

23. An article comprising the nonwoven web of embodiment 1, 2, 3, 4, 5, 6, 7, 8, 9, 10, 11, 12, 13, 14, 15, 16, 17, 18, 19, 20, 21, or 22.

24. An article of embodiment 23, wherein the article is an absorbing wipe; paper towel; tissue; napkin; or a component of a personal care product, household product, agricultural product, or medical product.

25. An article of embodiment 23 or 24, wherein the article is a laminate or a pouched laminate.

26. A process for preparing the nonwoven web of embodiment 1, 2, 3, 4, 5, 6, 7, 8, 9, 10, 11, 12, 13, 14, 15, 16 17, 18, 19, 20, 21, or 22, the process comprising the steps:

a) providing a nonwoven substrate comprising a first surface;

b) contacting the first surface with a polysaccharide and with a polymeric component to form a coated nonwoven substrate;

c) heating the coated nonwoven substrate at a temperature in the range of about 90° C. to about 170° C. to form a bonded nonwoven web; and d) optionally, calendaring the bonded nonwoven web.

27. The process of embodiment 26, wherein the polysaccharide comprises a) poly alpha-1,3-glucan; b) a poly alpha-1,3-glucan ether compound represented by Structure I:

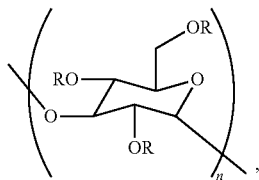

Structure I wherein (A) n is at least 6, (B) each R is independently an H or a positively charged organic group, and (C) the compound has a degree of substitution of about 0.05 to about 3.0; c) a graft copolymer comprising (i) a backbone comprising dextran with a weight-average molecular weight (Mw) of at least about 100000 Daltons, and (ii) poly alpha-1,3-glucan side chains comprising at least about 95% alpha-1,3-glucosidic linkages; d) a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages; e) a poly alpha-1,3-glucan ester compound represented by Structure III:

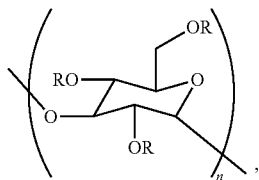

Structure III wherein (A) n is at least 6; (B) each R is independently an —H or a first group comprising —CO—$C_x$—COOH, wherein the —$C_x$— portion of said first group comprises a chain of 2 to 6 carbon atoms; and (C) the compound has a degree of substitution with the first group of about 0.001 to about 3; or a combination thereof.

28. The process of embodiment 26 or 27, wherein the polymeric component comprises a polymer polymerized from one or more of acrylic monomers, vinyl monomers, styrene monomers, or combinations thereof.

29. The process of embodiment 26, 27, or 28, wherein b) contacting the first surface with a polymeric is performed using an aqueous latex composition comprising the polymeric component, and optionally further comprising the polysaccharide.

30. The process of embodiment 26, 27, 28, or 29, wherein the nonwoven substrate is an airlaid nonwoven substrate, a multi-bonded airlaid nonwoven substrate, a carded nonwoven substrate, a wet laid nonwoven substrate, a spun lace nonwoven substrate, a meltblown nonwoven substrate, or a spun bond nonwoven substrate.

31. A process for preparing the nonwoven web of embodiment 19, 20, 21, or 22, the process comprising the steps:
a) providing a nonwoven substrate having a first surface and comprising side-by-side or sheath/core bicomponent fibers comprising a polyethylene/polyethylene terephthalate composition or at least one of polyolefin, polytetrafluoroethylene, polyester, polyvinyl acetate, polyvinyl chloride acetate, polyvinyl butyral, acrylic resins, polymethylacrylate, polymethylmethacrylate, polyamide, polyvinyl chloride, polyvinylidene chloride, polystyrene, polyvinyl alcohol, polyurethane, or cellulosic resins;
b) providing a polysaccharide comprising
A) a graft copolymer comprising (i) a backbone comprising dextran with a weight-average molecular weight (Mw) of at least about 100000 Daltons, and (ii) poly alpha-1,3-glucan side chains comprising at least about 95% alpha-1,3-glucosidic linkages; and/or
B) a crosslinked graft copolymer, wherein the graft copolymer portion of the crosslinked graft copolymer comprises (i) a backbone comprising dextran, and (ii) poly alpha-1,3-glucan side chains comprising at least about 50% alpha-1,3-glucosidic linkages;
c) contacting at least a portion of the first surface of the nonwoven substrate with the polysaccharide;
d) heating the material obtained in step c) at a temperature in the range of about 90° C. to about 170° C. to form a bonded nonwoven web comprising the polysaccharide; and
e) optionally, calendaring the bonded nonwoven web obtained in step d).

32. The process of embodiment 31, wherein step c) further comprises adding water to the polysaccharide and/or to the surface of the nonwoven substrate.

33. The process of embodiment 31 or 32, wherein step c) further comprises adding bicomponent fibers to the polysaccharide and/or to at least a portion of the first surface of the nonwoven substrate.

34. The process of embodiment 31, 32, or 33, wherein the nonwoven substrate is an air laid nonwoven substrate, a multi-bonded air laid nonwoven substrate, a carded nonwoven substrate, a wet laid nonwoven substrate, a spun lace nonwoven substrate, a meltblown nonwoven substrate, or a spun bond nonwoven substrate.

EXAMPLES

The following abbreviations are used: "CD" refers to cross direction, that is, the width dimension within the plane of the fabric, that is perpendicular to the direction in which the fabric is produced by the machine; "MD" refers to machine direction, which is the long direction within the plane of the fabric, that is the direction in which the fabric is produced by the machine; "NWSP" refers to Nonwovens Standard Procedure; "wt %" means weight percent; "min" means minute(s); "g" means grams; "g·m$^{-2}$", "g/m$^2$", and "gsm" mean grams per square meter; "gs$^{-1}$" means gram/second; "mL" means milliliter(s); "mm" means millimeter(s); "N" means Newton; "cm" means centimeter(s); "m$^2$" means square meters; "m$^3$" means cubic meters; "Ex." means Example; and "Comp. Ex." means Comparative Example.

Representative Preparation of Poly Alpha-1,3-Glucan

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

Trimethyl ammonium hydroxypropyl poly alpha-1,3-glucan was prepared similarly to the methods disclosed in published patent application WO 2015/095358, which is incorporated herein in its entirety. The ratio of etherification agent to poly alpha-1,3-glucan can be adjusted to achieve the desired DoS.

Both poly alpha-1,3-glucan and trimethyl ammonium hydroxypropyl poly alpha-1,3-glucan having a DoS of about 0.02 were used in fibrid form in some of the Examples herein below. Glucan fibrids can be prepared as disclosed in published patent application WO 2016/196022. As used herein, the term "neutral fibrids" refers to fibrids comprising poly alpha-1,3-glucan and the term "cationic fibrids" refers to fibrids comprising trimethyl ammonium hydroxypropyl poly alpha-1,3-glucan.

Examples 1A, 1B, 1C, 1D, 1E, and 1F

Comparative Example A

Six different binder formulations using varying amounts of vinyl acetate-ethylene (VAE) copolymer latex and a dispersion of an α-1,3-linked polysaccharide (poly alpha-1,3-glucan as homopolymer) as wet cake were formulated. The formulations 1A, 1B, 1C, 1D, 1E, and 1F are detailed in Table 1, as is the formulation for Comparative Example A, which did not contain any poly alpha-1,3-glucan.

TABLE 1

Latex:Polysaccharide Binder Formulations

| Example | Comp. Ex. A | 1A | 1B | 1C | 1D | 1E | 1F |
|---|---|---|---|---|---|---|---|
| Total Solids Content (wt %, dry basis) | 20 | 20 | 20 | 20 | 20 | 20 | 7 |
| Vinamul Elite 25 (wt %, dry basis) | 20 | 16 | 14 | 13 | 12 | 10 | 0 |
| Glucan (wt %, dry basis) | 0 | 4 | 6 | 7 | 8 | 10 | 7 |
| Ratio VAE:Glucan | 100:0 | 80:20 | 70:30 | 65:35 | 60:40 | 50:50 | 0:100 |

A stock solution of 50 wt % aqueous dispersion of VAE latex, Celanese Vinamul Elite 25, was used to make each dispersion. The polysaccharide used was a poly alpha-1,3-glucan wet cake containing 36% solids in water. All solutions were formulated as an aqueous dispersion of 20 wt % total solids, except Solution 1F that was only 7% total solids. The solution for Comparative Example A, containing 20 wt % VAE, was made by diluting down the stock VAE solution with deionized water. The remaining formulations were made by first homogenizing the polysaccharide cake in the total amount of deionized water needed to make the formulation for ~4 minutes, or until homogenous. That polysaccharide solution was then manually mixed with the corresponding amount of latex emulsion to achieve the final total weight percent solids.

Each formulation was used as a binder on airlaid nonwovens. The 70 gsm airlaid nonwovens were made of cellulose wood pulp from Georgia-Pacific Packaging & Cellulose. The binder was applied using a spray gun pressurized at 2 bar, targeting a total loading of ~40 wt % of the structure. Each nonwoven was sprayed on one side at ~20 wt %, cured in an oven for 4 minutes at 140° C., and then sprayed and cured on the opposite side in an identical manner. Due to viscosity limitations, solutions 1D and 1E were not able to be sprayed and tested. Details on binder pick up and web density are shown in Table 2.

TABLE 2

Analysis of Spray-bonded Airlaid Nonwovens

| Example | Comp. Ex. A | 1A | 1B | 1C | 1F |
|---|---|---|---|---|---|
| Binder Pick-up % | 44.29 | 50.97 | 45.35 | 55.35 | 46.52 |
| Areal density before spraying (g · m$^{-2}$) | 73.60 | 69.10 | 74.80 | 74.60 | — |
| Areal density after spraying (g · m$^{-2}$) | 94.30 | 104.32 | 107.93 | 115.64 | — |

The water absorbance was then measured using EDANA Standard WSP 010.1.RO (15). The absorbance data shown in Table 3 shows that dosing in poly alpha-1,3-glucan does not have a significant effect on water absorbance.

TABLE 3

Water Absorbance of Bonded Airlaid Nonwovens

| Example | Comp. Ex. A | 1A | 1B | 1C | 1 F |
|---|---|---|---|---|---|
| Water Absorbance, % | 782.2 | 855.56 | 864.09 | 882.72 | 834.05 |
| CV % | 13.09 | 9.17 | 12.90 | 12.92 | 7.72 |

Figure 2:
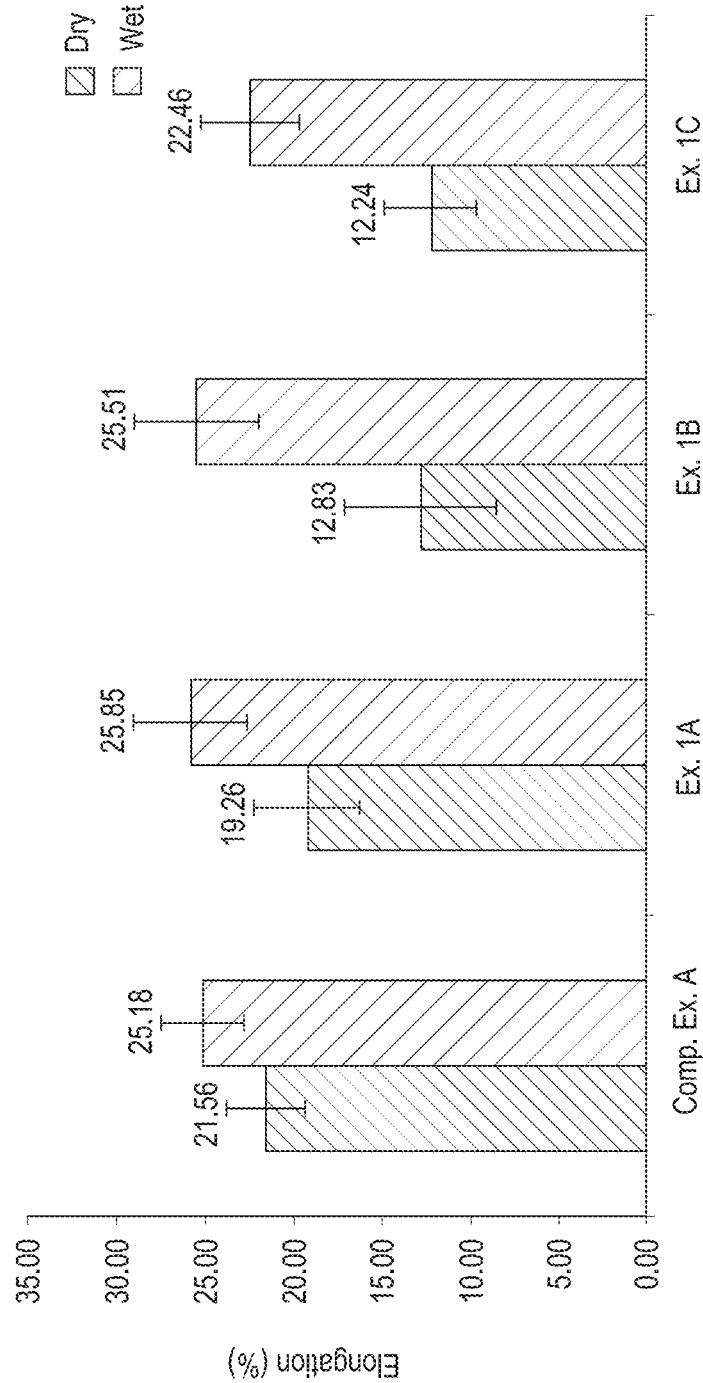
FIG. 2 is a graphical representation of the dry and wet elongation of the bonded airlaid nonwovens of Comparative Example A and Examples 1A (80:20), 1B (70:30), and 1C (65:35).

The tensile strength and elongation were tests according to EDANA Standard NWSP 110.1.RO (15). The samples were tested in replicates of five and the average values are displayed in FIG. 1 (Dry and Wet Tensile Strength of Bonded Airlaids of Comparative Example A and Examples 1A (80:20), 1B (70:30), and 1C (65:35)) and FIG. 2 (Dry and Wet Elongation of Bonded Airlaids of Comparative Example A and Examples 1A, 1B, and 1C). The results show that 20-35 wt % of the VAE can be replaced with the polysaccharide without a reduction in wet or dry tensile strength of the bonded webs. Incorporation of the polysaccharide does make the bonded webs more stiff. FIG. 2 reflects this and shows that the dry elongation is reduced at higher loadings of polysaccharide. The wet elongation, however, remains relatively the same.

The speed of absorption was tested for Comparative Example A, Example 1C, and Example 1F using a KRUSS 100 Tensiometer. Each sample was tested in triplicate for its absorption rate of distilled water. For the test, a 2×3 cm piece of bonded airlaid was clamped vertically to the instrument and then lowered down until it touched the surface of the deionized water in a dish below. The airlaid and water were allowed to interact for 300 seconds, and during this time the mass of water absorbed by the sample was recorded by the instrument. The total absorbency and rate of absorption for the samples is shown in Table 4. The data shows that incorporating glucan into the airlaid structure increases the speed of absorbency.

TABLE 4

Speed of Absorption of Bonded Airlaid Nonwovens

| Example | Comp. Ex. A | 1C | 1F |
|---|---|---|---|
| Water Absorbency (%) | 1153.04 | 659.41 | 973.65 |
| CV % | 4.24 | 5.41 | 5.95 |

TABLE 4-continued

Speed of Absorption of Bonded Airlaid Nonwovens

| Example | Comp. Ex. A | 1C | 1F |
|---|---|---|---|
| Rate of Absorption (gs$^{-1}$) | 0.0076 | 0.0109 | 0.012 |
| Saturation after 300 seconds | ¾ Saturated | ¾ Saturated | Fully Saturated |

The liquid transport capability was tested for Comparative Example A, Example 1C, and Example 1F using the droplet test. The test was run in triplicate with 8×8 cm squares of bonded airlaid. The testing liquid used for the test was a 0.05 wt % aqueous solution of blue pigment, Direct Blue 71 sourced from Sigma Aldrich, in distilled water. For the test, a 500 µl volume of testing liquid was applied to the center of the airlaid using a single-channel pipette. A digital camera then recorded the propagation of the liquid through the sample over the course of 300 seconds. The diameter of the stain was measured from 0 to 300 seconds using Pro Image analysis software on the top and bottom of the sample.

Figure 3:
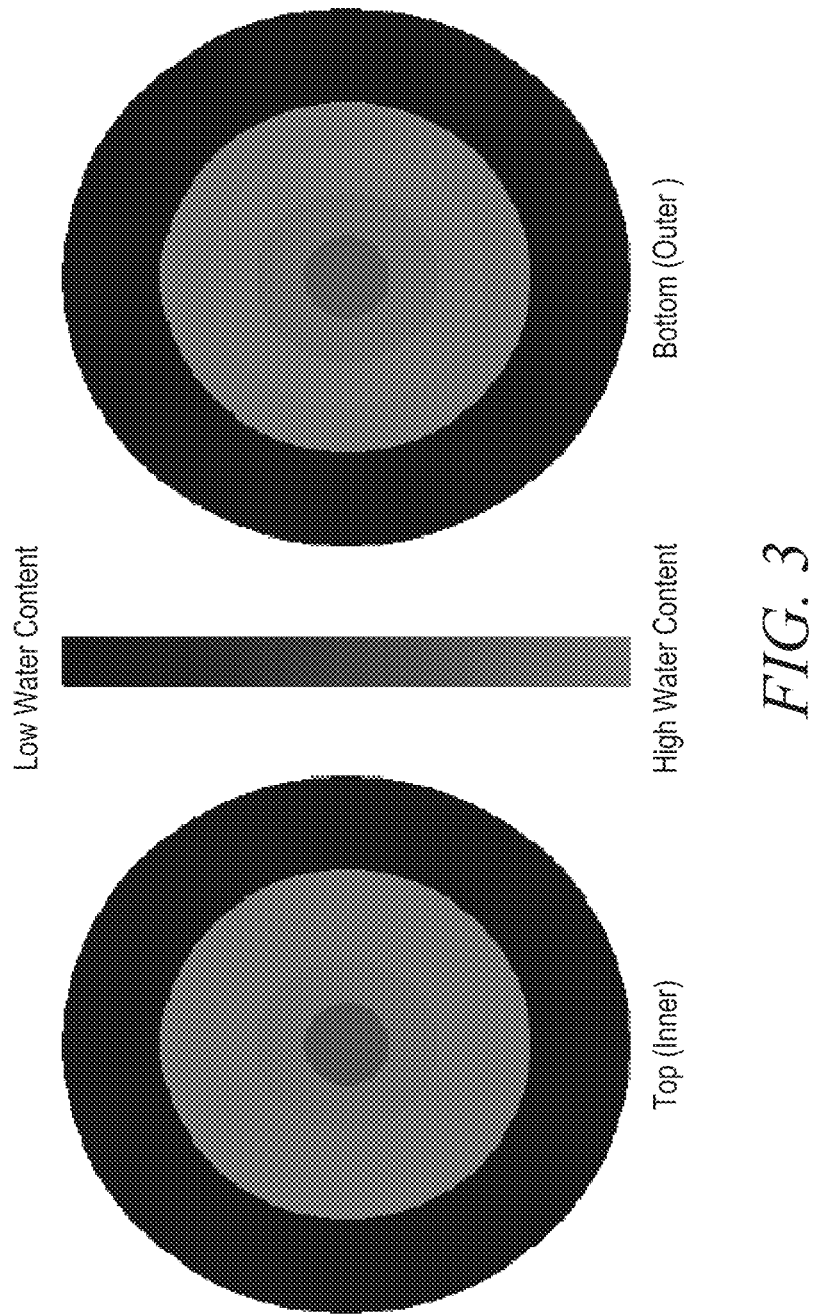
FIG. 3 is a graphical representation of the liquid transport chromatogram of Example 1F.
Figure 4:
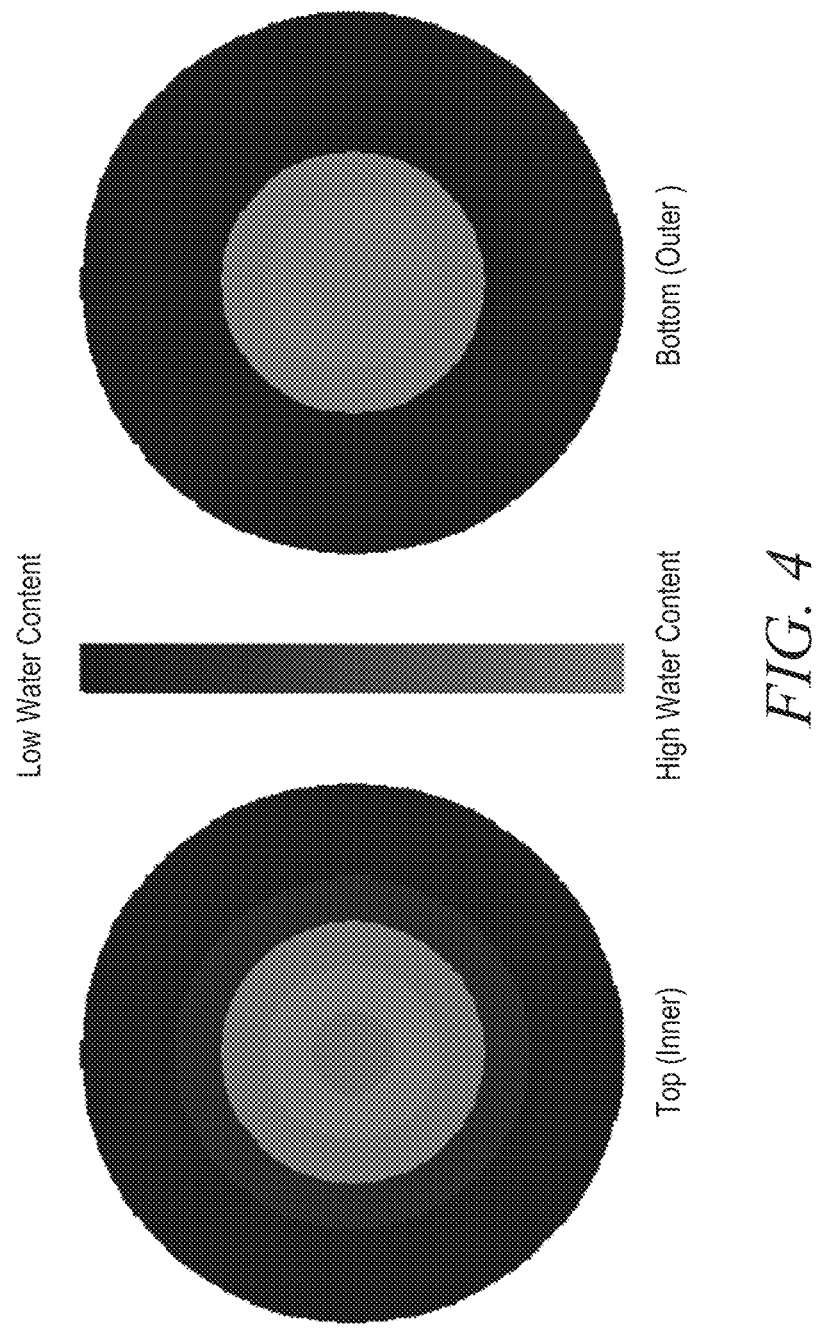
FIG. 4 is a graphical representation of the liquid transport chromatogram of Example 1C.
Figure 5:
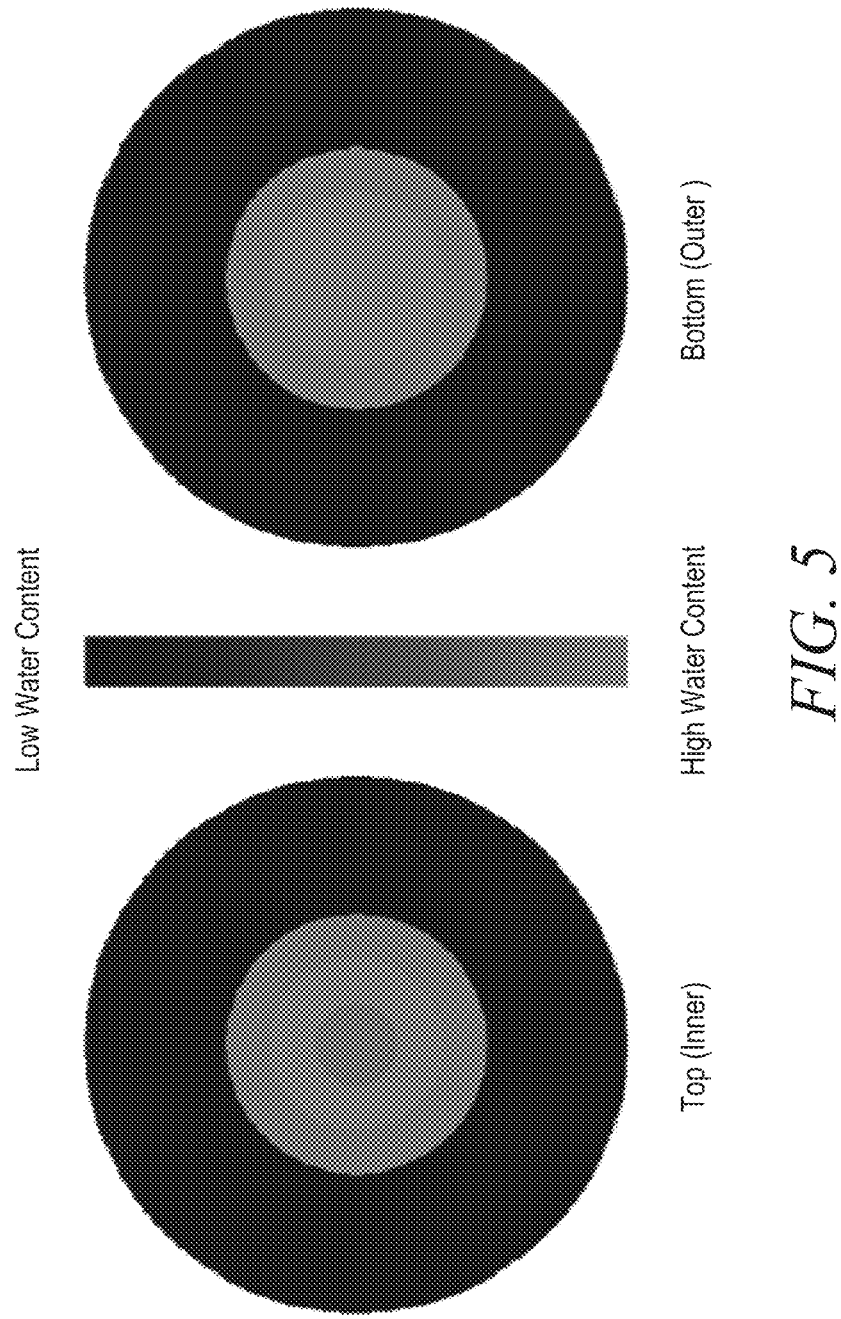
FIG. 5 is a graphical representation of the liquid transport chromatogram of Comparative Example A.

The scale in the chromatogram shows that a dark coloration indicates low water content, and a lighter blue represents areas of high water content. Comparing the liquid transport chromatograms of Comparative Example A (FIG. 5), Example 1C (FIG. 4), and Example 1F (FIG. 3), it is observed that as the amount of glucan in the binder is increased the liquid transport capability is also increased. This can be of use in products where wicking rate is important, like feminine hygiene products, diapers, and incontinence products.

Examples 2-6

In Example 2 through Example 6, four samples of branched polysaccharides containing both alpha-1,3 and alpha-1,6 linkages were used to prepare nonwoven webs and, in some cases, pouched laminate articles comprising the nonwoven webs. The polysaccharide samples are referred to herein as Polysaccharides A, B, C, and D. These polysaccharides were graft copolymers comprising (i) a backbone comprising dextran with a weight-average molecular weight (Mw) of at least about 100000 Daltons, and (ii) poly alpha-1,3-glucan side chains comprising at least about 95% alpha-1,3-glucosidic linkages. These polysaccharide samples were prepared using methods similar to those disclosed in published patent application WO 2017/079595 (see Example 7 therein, for example), which is incorporated herein in its entirety.

For each of Polysaccharides A, B, C, and D, Table 5 provides information on the % alpha-1,6-glucosidic linkage content (determined by NMR) of the polysaccharide, as well as the weight/weight ratio of dextran to sucrose used in preparing each polysaccharide sample.

TABLE 5

Polysaccharides Used in Example 2-Example 6

| Polysaccharide | Alpha-1,6-Linkage Content, % | Dextran:Sucrose Ratio (wt/wt) Used in Synthesis |
|---|---|---|
| A | 26 | 4.8 |
| B | 43 | 7.9 |
| C | 58 | 10.1 |
| D | 82 | 17.3 |

Examples 2A-2H

Through-air dried (TAD) tissue laminates were prepared using 38 gsm ICO TAD tissue and Polysaccharide A, B, C, or D as the binder.

To form the laminate, 1 g of dry powdered polysaccharide was spread evenly over a 100 mm×100 mm square of TAD tissue. The structure was then sprayed with a known amount of water applied as an atomized spray to activate the polysaccharide binder. Another 100 mm×100 mm piece of TAD tissue was placed on top to create a sandwiched system. The structure then was bonded by pressing for 300 seconds between a 90° C. steel heated press against a silicone base.

Each of Polysaccharide A, B, C, and D was used separately as a binder to produce eight identical laminates containing polysaccharide and two laminates which did not contain any polysaccharide; the production differed only slightly in the amount of water that was used to bind the TAD tissues together. Five laminates each were tested for absorbance of tap water or saline (0.9 wt % sodium chloride) and the average values are shown in Tables 6 and 7 below.

To test absorbance, each laminate was immersed in either tap water or 0.9 wt % sodium chloride solution at approximately 22° C. for 5 minutes. The laminate was then removed from the water or sodium chloride solution and allowed to drip from one corner for 20 seconds before weighing. The total absorbance was calculated using Equation 1 below.

Absorbance (%)=(final weight−start weight)×100     Equation 1:

The base absorbency for a 100 mm by 100 mm sheet of ICO TAD tissue was measured in replicates of five identically in deionized water and saline. When percent improvement over base tissue is calculated it is based off an absorption of 572 mL/m² of deionized water and 550 mL/m² of 0.9 wt % sodium chloride for two sheets of TAD.

TABLE 6

Average Laminate Composition and Saline Absorbency

| Example | Polysaccharide | Added Water Content (gsm) | Weight of Total TAD (gsm) | Polysaccharide Added (gsm) | Final Laminate Weight After Drying (g) | Saline Absorbency (mL/m²) | % Improvement Over Base Tissue |
|---|---|---|---|---|---|---|---|
| 2A | A | 32.4 | 70 | 100 | 180.2 | 999 | 82 |
| 2B | B | 38.2 | 70.8 | 100 | 180 | 1189.8 | 116 |
| 2C | C | 26.2 | 71 | 100 | 178 | 1258.2 | 129 |
| 2D | D | 31 | 71.2 | 100 | 172.6 | 1589.8 | 189 |

TABLE 7

Average Laminate Composition and Water Absorbency

| Example | Poly-saccharide | Added Water Content (gsm) | Weight of Total TAD (gsm) | Poly-saccharide Added (gsm) | Final Laminate Weight After Drying (g) | Water Absorbency (mL/m²) | % Improvement Over Base Tissue |
|---|---|---|---|---|---|---|---|
| 2E | A | 41 | 73 | 100 | 187 | 1140 | 99 |
| 2F | B | 38 | 74 | 100 | 188 | 1341 | 134 |
| 2G | C | 36 | 69 | 100 | 180 | 1295 | 126 |
| 2H | D | 44 | 71 | 100 | 181 | 1774 | 210 |

Test results show improvements in water and saline absorption upon the addition of the polysaccharide binder. The nonwoven comprising Polysaccharide A had the least improvement on water absorption while the nonwoven comprising Polysaccharide D clearly had the largest impact. On average there is a moderate drop off on performance in using saline solution over tap water.

Example 3

Tissue laminates were produced using Polysaccharide A, B, C, and D separately as a binder. The tissue used to construct the laminates was a Grigeo two ply tissue paper of 16 gsm per ply, which is a standard grade 2-ply tissue, for example for use as toilet paper. Typical specifications for Grigeo tissue paper are shown in Table 8. The fibre blend used to make the tissue was 100% virgin cellulosic pulp.

TABLE 8

Grigeo Tissue Paper Properties

| Property, units | Test Method | Value |
|---|---|---|
| Grammage, g/m² | EN ISO 12625-6 | 16 +/− 5% |
| Stretch at break, % | EN ISO 12625-4 | 15 +/− 1 |
| Absorption, not less, mm | EN ISO 8787 | 20 |
| Tensile force MD, not less, N (50 × 100 mm) | EN ISO 12625-4 | 7.0 |
| Tensile force CD, not less, N (50 × 100 mm) | EN ISO 12625-4 | 3.5 |
| Paper width, mm | — | 2750 |
| Core diameter (inside), mm | — | 76, 152, 254 |

To form each laminate, 1 g of dry, powdered Polysaccharide A, B, C, or D was spread evenly over a 100 mm×100 mm square of Grigeo tissue. The structure was then sprayed with a known amount of water applied as an atomized spray to activate the polysaccharide binder. Another 100 mm×100 mm piece of Grigeo tissue was placed on top to create a sandwiched system. The structure then was bonded by pressing for 300 seconds between a 90° C. steel heated press against a silicone base.

Each of Polysaccharide A, B, C, and D was used separately to produce ten identical laminates containing polysaccharide, and two laminates which did not contain any polysaccharide were also produced; the production differed only slightly in the amount of water that was used to bind the Grigeo tissues together. Five laminates each were tested for its absorbance of tap water and saline (0.9 wt % sodium chloride) and the average values are shown in the Tables 9 and 10.

To test absorbance each laminate was immersed in either tap water or 0.9 wt % sodium chloride solution at approximately 22° C. for 5 minutes. The laminate was then removed from the water or sodium chloride solution and allowed to drip from one corner for 20 seconds before weighing. The total absorbance was calculated using Equation 1 above.

The base absorbency for a 100 mm by 100 mm sheet of Grigeo Flushable wipes was measured in replicates of five identically in deionized water and saline. When percent improvement over base tissue is calculated it is based off an absorption of 567 mL/m² of deionized water and 527 mL/m² of 0.9 wt % sodium chloride for two sheets of Grigeo wipes.

TABLE 9

Grigeo Laminate Composition and Deionized Water Absorbency

| Example | Poly-saccharide | Added Water Content (gsm) | Weight of Total Tissue (gsm) | Poly-saccharide Added (gsm) | Final Laminate Weight After Drying (g) | Water Absorbency (mL/m²) | Additional Absorption from Polysaccharide (mL/m²) | % Improvement over Base Tissue (without Polysaccharide) |
|---|---|---|---|---|---|---|---|---|
| 3A-1 | A | 62 | 63 | 100 | 172 | 902 | 335 | 59 |
| 3A-2 |   | 64 | 63 | 100 | 175 | 889 | 322 | 57 |
| 3A-3 |   | 64 | 64 | 100 | 174 | 858 | 291 | 51 |
| 3A-3 |   | 54 | 64 | 100 | 172 | 829 | 262 | 46 |
| 3A-4 |   | 56 | 65 | 100 | 171 | 785 | 218 | 38 |
| Average* |   | 60 | 64 | 100 | 173 | 853 | 286 | 50 |
| 3B-1 | B | 48 | 63 | 100 | 169 | 1129 | 562 | 99 |
| 3B-2 |   | 52 | 64 | 100 | 172 | 1197 | 630 | 111 |
| 3B-3 |   | 43 | 63 | 100 | 169 | 1205 | 638 | 113 |
| 3B-4 |   | 63 | 64 | 100 | 170 | 1161 | 594 | 105 |
| 3B-5 |   | 48 | 63 | 100 | 169 | 1173 | 606 | 107 |
| Average* |   | 51 | 63 | 100 | 170 | 1173 | 606 | 107 |
| 3C-1 | C | 44 | 63 | 100 | 165 | 974 | 407 | 72 |
| 3C-2 |   | 64 | 63 | 100 | 167 | 920 | 353 | 62 |

TABLE 9-continued

Grigeo Laminate Composition and Deionized Water Absorbency

| Example | Poly-saccharide | Added Water Content (gsm) | Weight of Total Tissue (gsm) | Poly-saccharide Added (gsm) | Final Laminate Weight After Drying (g) | Water Absorbency (mL/m²) | Additional Absorption from Polysaccharide (mL/m²) | % Improvement over Base Tissue (without Polysaccharide) |
|---|---|---|---|---|---|---|---|---|
| 3C-3 | | 61 | 64 | 100 | 167 | 756 | 189 | 33 |
| 3C-4 | | 59 | 64 | 100 | 171 | 1059 | 492 | 87 |
| 3C-5 | | 59 | 63 | 100 | 168 | 936 | 369 | 65 |
| Average* | | 57 | 63 | 100 | 168 | 929 | 362 | 64 |
| 3D-1 | D | 64 | 64 | 100 | 164 | 933 | 366 | 65 |
| 3D-2 | | 65 | 65 | 100 | 165 | 1494 | 927 | 163 |
| 3D-3 | | 62 | 62 | 100 | 166 | 1041 | 474 | 84 |
| 3D-4 | | 63 | 63 | 100 | 168 | 930 | 363 | 64 |
| 3D-5 | | 59 | 59 | 100 | 166 | 1198 | 631 | 111 |
| Average* | | 63 | 63 | 100 | 166 | 1119 | 552 | 97 |

*Values given in these rows are averaged values for each column, for all examples in the Table using the same Polysaccharide, i.e. Polysaccharide A

TABLE 10

Grigeo Laminate Composition and Saline Absorbency

| Example | Poly-saccharide | Added Water Content (gsm) | Weight of Total Tissue (gsm) | Poly-saccharide Added (gsm) | Final Laminate Weight After Drying (g) | Saline Absorbency (mL/m²) | Additional Absorption from Polysaccharide (mL/m²) | % Improvement over Base Tissue (without Polysaccharide) |
|---|---|---|---|---|---|---|---|---|
| 3A-6 | A | 55 | 62 | 100 | 188 | 950 | 423 | 80 |
| 3A-7 | | 61 | 6 | 100 | 188 | 856 | 329 | 62 |
| 3A-8 | | 59 | 62 | 100 | 176 | 848 | 321 | 61 |
| 3A-9 | | 60 | 63 | 100 | 187 | 1002 | 475 | 90 |
| 3A-10 | | 59 | 63 | 100 | 181 | 722 | 195 | 37 |
| Average | | 59 | 63 | 100 | 184 | 876 | 349 | 66 |
| 3B-6 | B | 44 | 64 | 100 | 171 | 1218 | 691 | 131 |
| 3B-7 | | 47 | 63 | 100 | 174 | 1207 | 680 | 129 |
| 3B-8 | | 53 | 63 | 100 | 179 | 1212 | 685 | 130 |
| 3B-9 | | 38 | 62 | 100 | 171 | 1125 | 598 | 113 |
| 3B-10 | | 69 | 63 | 100 | 174 | 1094 | 567 | 108 |
| Average | | 50 | 63 | 100 | 174 | 1171 | 644 | 122 |
| 3C-6 | C | 49 | 63 | 100 | 168 | 995 | 468 | 89 |
| 3C-7 | | 37 | 64 | 100 | 176 | 1078 | 551 | 105 |
| 3C-8 | | 37 | 63 | 100 | 171 | 1048 | 521 | 99 |
| 3C-9 | | 43 | 63 | 100 | 173 | 1076 | 549 | 104 |
| 3C-10 | | 40 | 62 | 100 | 169 | 982 | 455 | 86 |
| Average | | 41 | 63 | 100 | 171 | 1036 | 509 | 97 |
| 3D-6 | D | 39 | 64 | 100 | 168 | 1566 | 1039 | 197 |
| 3D-7 | | 59 | 64 | 100 | 165 | 1506 | 979 | 186 |
| 3D-8 | | 47 | 63 | 100 | 163 | 1143 | 616 | 117 |
| 3D-9 | | 57 | 63 | 100 | 166 | 1080 | 553 | 105 |
| 3D-10 | | 46 | 63 | 100 | 171 | 989 | 462 | 88 |
| Average | | 50 | 63 | 100 | 167 | 1257 | 730 | 139 |

*Values given in these rows are averaged values for each column, for all examples in the Table using the same Polysaccharide, i.e. Polysaccharide A Test results showed improvements in water and saline absorption upon the addition of the polysaccharide binder to the nonwoven. Absorbance of saline solution was higher than that of deionized water over the same period of time.

Example 4

Tissue laminates were produced using Polysaccharide A, B, C, or D as a binder. The tissue used to construct the laminates was a Hezhong Flushable 60 gsm tissue, which is typically used as a wipe. Typical specifications for Hezhong flushable tissue paper are shown in Table 11. The fiber blend used to make the Hezhong tissue was a blend of cellulose pulp and viscose.

TABLE 11

Technical Details for Hezhong Flushable Tissue

| Testing Parameter | Method | Units | Test Result |
|---|---|---|---|
| Weight | GB/T 24218-1 | g/m³ | 61.0 |
| Thickness | GB/T 24218-2 | mm | 0.45 |
| Tensile Strength, CD, dry | GB/T 24218-3 | N/2.5 cm | 9.2 |
| Tensile Strength, MD, dry | GB/T 24218-3 | N/2.5 cm | 15.0 |
| Breaking elongation, CD, dry | GB/T 24218-3 | % | 43.0 |
| Breaking elongation, MD, dry | GB/T 24218-3 | % | 21.7 |
| Tensile Strength, CD, wet | HZ standard | N/2.5 cm | 4.0 |
| Tensile Strength, MD, wet | HZ standard | N/2.5 cm | 4.9 |
| Breaking Elongation, CD, wet | HZ standard | % | 44.9 |

TABLE 11-continued

Technical Details for Hezhong Flushable Tissue

| Testing Parameter | Method | Units | Test Result |
|---|---|---|---|
| Breaking Elongation, MD, wet | HZ standard | % | 25.3 |
| Dispersible | HZ standard | — | 0 |

To form the laminate, 1 g of dry, powdered Polysaccharide A, B, C, or D was spread evenly over a 100 mm×100 mm square of Hezhong tissue. The structure was then sprayed with a known amount of water applied as an atomized spray to activate the polysaccharide binder. Another 100 mm×100 mm piece of Hezhong tissue was placed on top to create a sandwiched system. The structure then was bonded by pressing for 300 seconds between a 90° C. steel heated press against a silicone base.

Each of Polysaccharide A, B, C, and D was used separately to produce ten identical laminates containing polysaccharide, and two laminates which did not contain any polysaccharide; the production differed only slightly in the amount of water that was used to bind the Hezhong tissues together. Five laminates each were tested for its absorbance of tap water and saline (0.9 wt % sodium chloride) and the average values are shown in the Tables 12 and 13.

To test absorbance each laminate was immersed in either tap water or 0.9 wt % sodium chloride solution at approximately 22° C. for 5 minutes. The laminate was then removed from the water or sodium chloride solution and allowed to drip from one corner for 20 seconds before weighing. The total absorbance was calculated using Equation 1 above.

The base absorbency for a 100 mm by 100 mm sheets of Hezhong Flushable wipes was measured in replicates of five identically in deionized water and saline. When percent improvement over base tissue is calculated it is based off an absorption of 1246 mL/m$^2$ of deionized water and 1178 mL/m$^2$ of 0.9 wt % sodium chloride for two sheets of Hezhong wipes.

TABLE 12

Hezhong Laminate Composition and Deionized Water Absorbency

| Example | Poly-saccharide | Added Water Content (gsm) | Weight of Total Tissue (gsm) | Poly-saccharide Added (gsm) | Final Laminate Weight After Drying (g) | Water Absorbency (mL/m$^2$) | Additional Absorption from Polysaccharide (mL/m$^2$) | % Improvement over Base Tissue (without Polysaccharide) |
|---|---|---|---|---|---|---|---|---|
| 4A-1 | A | 64 | 117 | 100 | 224 | 1363 | 117 | 9 |
| 4A-2 |   | 59 | 115 | 100 | 222 | 1383 | 137 | 11 |
| 4A-3 |   | 77 | 115 | 100 | 225 | 1379 | 133 | 11 |
| 4A-4 |   | 74 | 115 | 100 | 226 | 1353 | 107 | 9 |
| 4A-5 |   | 113 | 115 | 100 | 228 | 1381 | 135 | 11 |
| Average* |   | 77 | 115 | 100 | 225 | 1372 | 126 | 10 |
| 4B-1 | B | 54 | 116 | 100 | 222 | 1709 | 463 | 37 |
| 4B-2 |   | 82 | 115 | 100 | 221 | 1720 | 474 | 38 |
| 4B-3 |   | 79 | 114 | 100 | 221 | 1675 | 429 | 34 |
| 4B-4 |   | 82 | 116 | 100 | 222 | 1749 | 503 | 40 |
| 4B-5 |   | 100 | 115 | 100 | 222 | 1697 | 451 | 36 |
| Average* |   | 79 | 115 | 100 | 222 | 1710 | 464 | 37 |
| 4C-1 | C | 97 | 115 | 100 | 225 | 1577 | 331 | 27 |
| 4C-2 |   | 70 | 116 | 100 | 220 | 1636 | 390 | 31 |
| 4C-3 |   | 76 | 118 | 100 | 221 | 1617 | 371 | 30 |
| 4C-4 |   | 91 | 116 | 100 | 224 | 1565 | 319 | 26 |
| 4C-5 |   | 87 | 117 | 100 | 226 | 1733 | 487 | 39 |
| Average* |   | 84 | 116 | 100 | 223 | 1626 | 380 | 30 |
| 4D-1 | D | 58 | 115 | 100 | 217 | 1659 | 413 | 33 |
| 4D-2 |   | 87 | 115 | 100 | 218 | 1536 | 290 | 23 |
| 4D-3 |   | 70 | 116 | 100 | 220 | 1637 | 391 | 31 |
| 4D-4 |   | 111 | 118 | 100 | 226 | 1500 | 254 | 20 |
| 4D-5 |   | 68 | 118 | 100 | 225 | 1640 | 394 | 32 |
| Average* |   | 79 | 116 | 100 | 221 | 1594 | 348 | 28 |

*Values given in these rows are averaged values for each column, for all examples in the Table using the same Polysaccharide, i.e. Polysaccharide A

TABLE 13

Hezhong Laminate Composition and Saline Absorbency

| Example | Poly-saccharide | Added Water Content (gsm) | Weight of Total Tissue (gsm) | Poly-saccharide Added (gsm) | Final Laminate Weight After Drying (g) | Saline Absorbency (mL/m$^2$) | Additional Absorption from Polysaccharide (mL/m$^2$) | % Improvement over Base Tissue (without Polysaccharide) |
|---|---|---|---|---|---|---|---|---|
| 4A-6 | A | 64 | 119 | 100 | 224 | 1614 | 436 | 37 |
| 4A-7 |   | 59 | 119 | 100 | 222 | 1498 | 320 | 27 |
| 4A-8 |   | 77 | 117 | 100 | 225 | 1573 | 395 | 34 |
| 4A-9 |   | 74 | 119 | 100 | 293 | 1459 | 281 | 24 |
| 4A-10 |   | 113 | 120 | 100 | 333 | 1515 | 337 | 29 |
| Average* |   | 77 | 119 | 100 | 296 | 1532 | 354 | 30 |

TABLE 13-continued

Hezhong Laminate Composition and Saline Absorbency

| Example | Poly-saccharide | Added Water Content (gsm) | Weight of Total Tissue (gsm) | Poly-saccharide Added (gsm) | Final Laminate Weight After Drying (g) | Saline Absorbency (mL/m²) | Additional Absorption from Polysaccharide (mL/m²) | % Improvement over Base Tissue (without Polysaccharide) |
|---|---|---|---|---|---|---|---|---|
| 4B-6 | B | 88 | 117 | 100 | 222 | 1686 | 508 | 43 |
| 4B-7 |   | 107 | 119 | 100 | 221 | 1574 | 396 | 34 |
| 4B-8 |   | 50 | 117 | 100 | 221 | 1745 | 567 | 48 |
| 4B-9 |   | 58 | 119 | 100 | 222 | 1691 | 513 | 44 |
| 4B-10 |   | 72 | 120 | 100 | 222 | 1706 | 526 | 45 |
| Average* |   | 75 | 118 | 100 | 222 | 1680 | 502 | 43 |
| 4C-6 | C | 54 | 116 | 100 | 222 | 1562 | 384 | 33 |
| 4C-7 |   | 63 | 117 | 100 | 224 | 1663 | 485 | 41 |
| 4C-8 |   | 47 | 114 | 100 | 222 | 1547 | 369 | 31 |
| 4C-9 |   | 46 | 117 | 100 | 224 | 1567 | 389 | 33 |
| 4C-10 |   | 66 | 177 | 100 | 225 | 1465 | 287 | 24 |
| Average* |   | 55 | 128 | 100 | 223 | 1561 | 383 | 33 |
| 4D-6 | D | 35 | 118 | 100 | 222 | 1486 | 308 | 26 |
| 4D-7 |   | 38 | 117 | 100 | 220 | 1838 | 660 | 56 |
| 4D-8 |   | 26 | 117 | 100 | 223 | 1604 | 426 | 36 |
| 4D-9 |   | 40 | 118 | 100 | 25 | 1501 | 323 | 27 |
| 4D-10 |   | 33 | 117 | 100 | 221 | 1641 | 463 | 39 |
| Average* |   | 34 | 117 | 100 | 222 | 1614 | 436 | 37 |

*Values given in these rows are averaged values for each column, for all examples in the Table using the same Polysaccharide, i.e. Polysaccharide A Test results show that water and saline absorption are not significantly enhanced by incorporating Polysaccharide A, B, C, or D into the nonwoven web.

The absorbency in saline solution was tested as above for 5 and 10 minutes to look for differences in absorbency over time. The averaged values are shown in Table 14. No significant increase in saline absorbency was observed for nonwovens containing Polysaccharides A and B, while nonwovens containing Polysaccharides C and D showed a significant increase in uptake after 10 minutes.

TABLE 14

Saline Absorbency of Laminates Over Time

| Example | Polysaccharide | Saline Absorbency 5 min (mL/m²) | % Improvement over Base Tissue 5 min | Saline Absorbency 10 min (mL/M20 | % Improvement over Base Tissue 10 min |
|---|---|---|---|---|---|
| 4A | A | 1532 | 30 | 1622 | 38 |
| 4B | B | 1680 | 43 | 1749 | 48 |
| 4C | C | 1561 | 33 | 1799 | 53 |
| 4D | D | 1614 | 37 | 2088 | 77 |

Example 5

Nonwoven laminates were produced using Polysaccharide A, B, C, or D as a binder. The nonwoven substrate used to construct the laminates was a Harper Hygienics Arvell nonwoven containing 42% polypropylene (PP) and 58% cellulose fluff pulp as a blend and having 45 gsm basis weight. The Arvell nonwoven was thermoembossed, calendar type Universal 2. Typical specifications for the Arvell nonwoven are shown below in Table 15; typical applications of the Arvell nonwoven include wound care.

TABLE 15

Information from Preliminary Product Data Sheet for Arvell Polypropylene/Cellulose Nonwoven

| Property | Unit | Target | Range | Test Method |
|---|---|---|---|---|
| Basis Weight | g/m² | 45 | 40 +/− 50 | NWSP 130.1 |
| Thickness (under load of 0.05 N/cm²) | mm | 0.56 | 0.43 +/− 0.70 | NWSP 120.6 |

TABLE 15-continued

Information from Preliminary Product Data Sheet for Arvell Polypropylene/Cellulose Nonwoven

| Property | Unit | Target | Range | Test Method |
|---|---|---|---|---|
| Tensile Strength, MD | N/Scm | 23 | 19 +/− 29 | NWSP 110.4 |
| Tensile Strength, CD | N/Scm | 8.5 | 6.5 +/− 11 | NWSP 110.4 |
| Elongation at Break, MD | % | 28 | 19 +/− 36 | NWSP 110.4 |
| Elongation at Break, CD | % | 35 | 25 +/− 50 | NWSP 110.4 |
| Absorption Capacity | % | 750 | 600 +/− 900 | NWSP 10.1 |

To form the laminate, 1 g of dry, powdered Polysaccharide A, B, C, or D was spread evenly over a 100 mm×100 mm square of Arvell nonwoven. The structure was then sprayed with a known amount of water applied as an atomized spray to activate the polysaccharide binder. Another 100 mm×100 mm piece of Arvell nonwoven was placed on top to create a sandwiched system. The structure then was bonded by pressing for 300 seconds between a 90° C. steel heated press against a silicone base.

Each of Polysaccharide A, B, C, and D was used separately to produce twelve identical laminates containing polysaccharide, and two laminates which did not contain any polysaccharide were produced; the production differed only slightly in the amount of water that was used to bind the nonwoven together. Three laminates with each polysaccharide were tested for absorbance of saline (0.9 wt % sodium chloride solution) and the average values are shown in Table 16.

To test absorbance each laminate was immersed in 0.9 wt % sodium chloride solution at approximately 22° C. for five minutes and ten minutes. The laminate was then removed from the sodium chloride solution and allowed to drip from one corner for 20 seconds before weighing. The total absorbance was calculated using Equation 1 above.

The base absorbency for a 100 mm by 100 mm sheets of Arvell nonwoven was measured in replicates of three identically in saline. When percent improvement over base tissue is calculated it is based off an absorption of 799 mL/m$^2$ of 0.9 wt % sodium chloride solution for two sheets of Arvell nonwoven.

Table 11. The fiber blend used to make the Hezhong tissue was cellulose pulp and viscose.

Figure 6:
FIG. 6 is a reproduction of an image of the steel tool used to make the pouched laminates of Example 6.

To make the cellular pad, a steel tool with 16 indentations as shown in FIG. 6 was coated with Texicryl 13-525, a modified styrene acrylic copolymer from Scott Bader. Each indentation is approximately 20 mm by 20 mm. Only the outline of the rim was coated. The amount of Texicryl 13-525 applied is shown in Tables 17 and 18. A 100 mm by 100 mm sheet of Hezhong Flushable tissue was then stamped with this coated tool, transferring the Texicryl 13-525 to the tissue.

When the Texicryl 13-525 had dried, the tissue was placed back onto the tool, with the Texicryl-side facing upward. Pressure was applied to create 16 indentations in the tissue. Each indentation was filled with 0.15 g of powdered Polysaccharide B. Polysaccharide B is a branched mixed linkage graft copolymer, consisting of 43% alpha-1,6 linkages and 57% alpha-1,3 linkages. When finished, another 100 mm by 100 mm sheet of Hezhong Flushable tissue that had similarly been stamped with the Texicryl 13-525, was placed on top of the filled sheet. An identical steel tool, heated to 170° C., was placed on top of the structure and pressure was applied for 300 seconds. The heat and pressure activated the Texicryl 13-525 to bind the sheets together, forming a pouched laminate.

Figure 7:
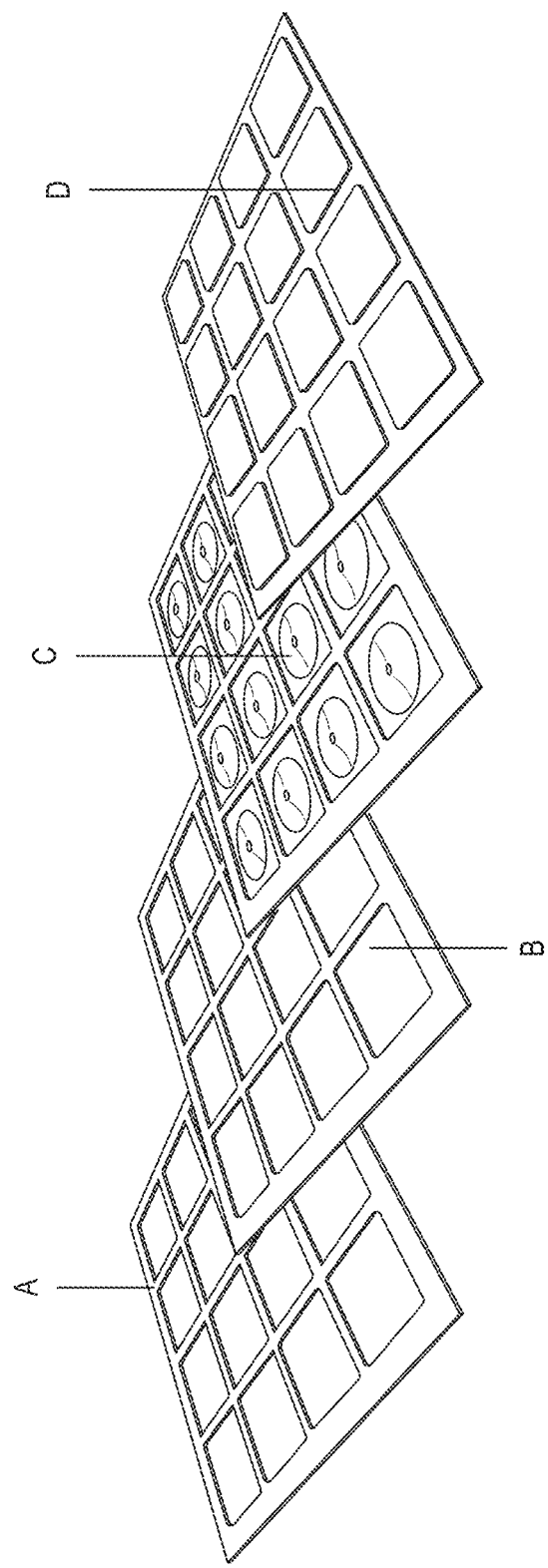
FIG. 7 is a pictorial representation of the process used to produce the laminate articles of Example 6.

FIG. 7 is a pictorial representation of the process used to produce the pouched laminates of Example 6. Step A shows a non-indented cellular pad (tissue patterned with a dried layer of modified styrene acrylic copolymer applied with the use of the tool shown in FIG. 6). Step B represents the 16

TABLE 16

Arvell Laminate Composition and Saline Absorbency

| Example | Poly-saccharide | Added Water Content (gsm) | Weight of Total Tissue (gsm) | Poly-saccharide Added (gsm) | Final Laminate Weight After Drying (g) | Water Absorbency 5 min (mL/m$^2$) | % Improvement over Base Tissue 5 min | Water Absorbency 10 min (mL/m$^2$) | % Improvement over Base Tissue 10 min |
|---|---|---|---|---|---|---|---|---|---|
| 5A-1 | A | 58 | 87 | 100 | 198 | 1066 | 33 | 1090 | 36 |
| 5A-2 |   | 59 | 90 | 100 | 202 | 990 | 24 | 988 | 24 |
| 5A-3 |   | 77 | 90 | 100 | 204 | 1097 | 37 | 1132 | 42 |
| Average* |   | 65 | 89 | 100 | 201 | 1051 | 32 | 1070 | 34 |
| 5B-1 | B | 84 | 90 | 100 | 203 | 1686 | 111 | 1677 | 110 |
| 5B-2 |   | 67 | 94 | 100 | 207 | 1574 | 97 | 1692 | 112 |
| 5B-3 |   | 66 | 97 | 100 | 210 | 1745 | 118 | 1817 | 127 |
| Average* |   | 72 | 94 | 100 | 207 | 1668 | 109 | 1729 | 116 |
| 5C-1 | C | 80 | 94 | 100 | 216 | 1373 | 72 | 1382 | 73 |
| 5C-2 |   | 56 | 91 | 100 | 208 | 1328 | 66 | 1486 | 86 |
| 5C-3 |   | 61 | 86 | 100 | 203 | 1247 | 56 | 1337 | 67 |
| Average* |   | 66 | 90 | 100 | 209 | 1316 | 65 | 1402 | 75 |
| 5D-1 | D | 73 | 90 | 100 | 199 | 1383 | 73 | 2019 | 153 |
| 5D-2 |   | 70 | 91 | 100 | 201 | 1632 | 104 | 1840 | 130 |
| 5D-3 |   | 66 | 92 | 100 | 202 | 1897 | 137 | 2148 | 169 |
| Average* |   | 70 | 91 | 100 | 201 | 1637 | 105 | 2002 | 151 |

*Values given in these rows are averaged values for each column, for all examples in the Table using the same Polysaccharide, i.e. Polysaccharide A Test results showed improvements in saline absorption upon the addition of the Polysaccharide B and D as binder to the nonwoven, with minimal enhancements from Polysaccharides A and C. Only the nonwoven containing polysaccharide D showed an enhancement in saline absorbency after 10 minutes.

Example 6

Pouched absorbent laminates were made using Polysaccharide B and Hezhong Flushable 60 gsm tissue. Technical details for Hezhong Flushable tissue are shown above in indentations made in the cellular pad. Step C indicates the placement of polysaccharide in each of the 20 mm×20 mm cells (0.15 g per cell). Step D shows placement of the top layer over the cells before application of pressure and heat to form a pouched laminate.

Ten pouched laminates were made identically, the details of which are shown in Tables 17 and 18. The pouched laminates were tested in replicates of 5 for their absorption.

To test absorbance each laminate was immersed in either tap water or 0.9 wt % sodium chloride solution at approximately 22° C. for 5 minutes or 10 minutes. The laminate was then removed from the water or sodium chloride solution and allowed to drip from one corner for 20 seconds before weighing. The total absorbance was calculated using Equation 1 above. The absorbency for each test is shown below in Tables 17 and 18.

the pulp slurry at either 0.5 or 1.5 percent (by weight), as indicated in Table 19. For Comparative Examples C, D, E, F, G, and H, neutral corn starch (obtained from Archer Daniels Midland), cationic corn starch (obtained from

TABLE 17

Average Laminate Composition and Deionized Water Absorbency

| Example | Weight of Total Tissue in Laminate (gsm) | Texicryl 13-525 Coat Weight (gsm) | Total Polysaccharide (gsm) | Total Structure Weight Before Sealing (gsm) | Total Water Absorbency 5 min (mL/m$^2$) | Total Water Absorbency 10 min (mL/m$^2$) | Additional Absorption from Polysaccharide (mL/m$^2$) | % Improvement over Base Tissue |
|---|---|---|---|---|---|---|---|---|
| 6-1 | 115 | 37 | 240 | 392 | 2766 | 2824 | 1520 | 122 |
| 6-2 | 114 | 20 | 240 | 374 | 2807 | 2725 | 1561 | 125 |
| 6-3 | 116 | 25 | 240 | 381 | 2707 | 2714 | 1461 | 117 |
| 6-4 | 113 | 42 | 240 | 395 | 2633 | 2670 | 1387 | 111 |
| 6-5 | 114 | 45 | 240 | 399 | 2659 | 2732 | 1413 | 113 |
| Average* | 114 | 34 | 240 | 388 | 2714 | 2733 | 1468 | 118 |

*Values given in this row are averaged values for each column

TABLE 18

Average Laminate Composition and Saline Absorbency

| Example | Weight of Total Tissue in Laminate (gsm) | Texicryl 13-525 Coat Weight (gsm) | Total Polysaccharide (gsm) | Total Structure Weight Before Sealing (gsm) | Total Saline Absorbency 5 min (mL/m$^2$) | Total Saline Absorbency 10 min (mL/m$^2$) | Additional Absorption from Polysaccharide (mL/m$^2$) | % Improvement over Base Tissue |
|---|---|---|---|---|---|---|---|---|
| 6-6 | 114 | 46 | 240 | 400 | 2715 | 2730 | 1537 | 130 |
| 6-7 | 117 | 38 | 240 | 395 | 2598 | 2684 | 1420 | 121 |
| 6-8 | 116 | 25 | 240 | 381 | 2633 | 2652 | 1455 | 124 |
| 6-9 | 114 | 41 | 240 | 395 | 2666 | 2703 | 1488 | 126 |
| 6-10 | 104 | 45 | 240 | 389 | 2605 | 2710 | 1427 | 121 |
| Average* | 113 | 39 | 240 | 392 | 2643 | 2696 | 1465 | 124 |

*Values given in this row are averaged values for each column

The base absorbency for 100 mm by 100 mm sheets of Hezhong Flushable wipes was measured in replicates of five identically in deionized water and saline. When percent improvement over base tissue is calculated it is based off an absorption of 1246 mL/m$^2$ of deionized water and 1178 mL/m$^2$ of 0.9 wt % sodium chloride for two sheets of Hezhong wipes.

Test results showed marked improvements in water and saline absorption for the pouched structures containing Polysaccharide B in comparison to a pouched structure without Polysaccharide B. There is no significant additional water absorption after five minutes, the structure is fully saturated at that time. No significant decrease in absorbency is noted between the deionized water and 0.9 wt % saline solution, showing absorbency is not compromised in the presence of electrolytes.

Example 7

Comparative Examples B-H

Handsheets were formed with an 80:20 blend of eucalyptus and Södra black fibers using the procedure described below. Comparative Example B contained no additives. For Examples 7A and 7B, cationic poly alpha-1,3-glucan fibrids were added to the pulp slurry at either 0.5 or 1.5 percent (by weight), as indicated in Table 19 below. For Examples 7C and 7D, neutral poly alpha-1,3-glucan fibrids were added to the pulp slurry at either 0.5 or 1.5 percent (by weight), as indicated in Table 19. For Comparative Examples C, D, E, F, G, and H, neutral corn starch (obtained from Archer Daniels Midland), cationic corn starch (obtained from Archer Daniels Midland), or polyacrylamide (obtained from Chinafloc) were added to the pulp slurry at either 0.5 or 1.5 percent (by weight), as indicated in Table 19.

Wetlaying is a modified paper-making process. Short fibers are dispersed in water and continuously mixed. Additives can be added to the pulp slurry for increased strength of the dry, final web. The suspension is then drained, fibers laid on a mesh, and water removed at high suction. The webs are subsequently dried at room temperature.

The wood pulp fibers consisted of 80% Eucalyptus and 20% Södra black. The pulp sheets as supplied were added in water and processed using a valley beater to open and fibrillate the fibers. A valley beater has a rotating height-adjustable bladed roller; the impact between the rotating blades and the inside wall fibrillate the wood pulp fibers. In general, the slurry produced has a dry pulp concentration of 1.7 wt %. To prepare the suspension for wetlaying, the slurry was then re-diluted to target a concentration of 0.3-0.4 wt %. This is a typical dilution level to minimize fiber-to-fiber interaction in the liquid suspension. Clumping can be expected if there is an excessive concentration the fibers. The additives were dispersed in water at high shear strength using a Unidrive 1000 homogenizer. The dispersion was incorporated in the pulp slurry to target the add-on level and continuously mixed using an IKA propeller stirrer. A given volume (approximately 400 mL) of stock preparation was measured to target an areal density of 60 g·m$^{-2}$.

Air suction was applied to remove the excess water. The resulting sample was a 16 cm diameter handsheet, which was dried unrestrained at room temperature.

The areal density, thickness, dry and wet tensile strength, dry and wet elongation, and burst strength were measured as described below. The average of five samples for each metric are listed in Table 20.

Areal Density:

The weight of five 100 mm×100 mm samples for each material was measured using a two-decimal place digital balance. Mass per unit area was determined in accordance with WSP 130.1.R4.

Thickness:

The thickness of the samples was determined using a Thwing Albert Instrument Company Progage tester in accordance with WSP 120.6.R4 (12) at an applied pressure 500 Pa over a 25 cm$^2$ test area. The thickness was measured on various samples.

Tensile Strength Test Method:

A Zwick tensometer was employed to evaluate the tensile strength of the fabrics according to EDANA standard NWSP 110.4.RO (15)—option A. The standard sample width was 25 mm. The samples were clamped in the Zwick tester at 75 mm gauge length. The loading force was applied at a constant extension rate of 300 mm·min$^{-1}$. Readings of the applied force and elongation were taken at the point of material rupture. Five specimens were tested.

For the wet tensile strength, the samples were saturated with tap water and put through a pad mangle at a pressure which was adjusted to give 200-300% wet pick-up which was calculated using the following equation:

$$\text{Pick-up} = \frac{\text{wet weight} - \text{dry weight}}{\text{dry weight}} \times 100$$

Burst Strength Test Method:

Burst strength was measured according to ISO 13839-2: 1998 using a James Heal Burst Strength Tester (Model 140 Truburst 3). This standard describes a pneumatic pressure method for the determination of bursting strength and bursting distension of textile fabrics.

Five specimens were tested; a test specimen was clamped over a 7.3 cm$^2$ diaphragm by means of a circular clamping ring. Air pressure was increased below the diaphragm causing distension of both the diaphragm and the fabric, which is mounted over it. The machine calibrates the pressure increase to achieve the test specimen burst within 20 seconds +/−5 seconds from the start of the test, which is when the diaphragm first starts applying the pressure from below. The bursting strength is the maximum burst pressure registered on the pressure gauge.

TABLE 19

Handsheet Compositions, Areal Density, and Thickness

| Example | Amount of Additive | Handsheet Areal Density [g · m − 2] | Handsheet Thickness [mm] |
| --- | --- | --- | --- |
| Comp. Ex. B | — | 67.8 ± 1.5 | 0.20 ± 0.01 |
| 7A | 0.5 wt % cationic fibrids | 69.1 ± 0.6 | 0.2 ± 0.01 |
| 7B | 1.5 wt % cationic fibrids | 68.6 ± 0.9 | 0.2 ± 0.01 |
| 7C | 0.5 wt % neutral fibrids | 68.5 ± 0.9 | 0.2 ± 0.01 |
| 7D | 1.5 wt % neutral fibrids | 69.0 ± 1.1 | 0.2 ± 0.01 |
| Comp. Ex. C | 0.5 wt % cationic corn starch | 67.2 ± 2.4 | 0.2 ± 0.01 |
| Comp. Ex. D | 1.5 wt % cationic corn starch | 65.6 ± 1.7 | 0.2 ± 0.01 |
| Comp. Ex. E | 0.5 wt % neutral corn starch | 68.2 ± 1.0 | 0.2 ± 0.01 |
| Comp. Ex. F | 1.5 wt % neutral corn starch | 67.8 ± 0.4 | 0.2 ± 0.01 |
| Comp. Ex. G | 0.5 wt % Polyacrylamide | 65.5 ± 1.2 | 0.2 ± 0.01 |
| Comp. Ex. H | 1.5 wt % Polyacrylamide | 67.8 ± 1.0 | 0.2 ± 0.01 |

TABLE 20

Handsheet Properties

| Example | Dry Tensile Strength [N/2.5 mm] | Dry Elongation [%] | Wet Tensile Strength [N/2.5 mm] | Wet Elongation [%] | Burst strength [kPa] |
| --- | --- | --- | --- | --- | --- |
| Comp. Ex. B | 41.6 ± 2.0 | 1.3 ± 0.1 | 1.0 ± 0.2 | 3.0 ± 0.7 | 49.2 ± 3.7 |
| 7A | 47.4 ± 3.3 | 1.5 ± 0.2 | 1.0 ± 0.2 | 2.4 ± 0.7 | 56.5 ± 2.2 |
| 7B | 55.0 ± 2.3 | 1.6 ± 0.2 | 1.2 ± 0.1 | 3.1 ± 0.6 | 60.0 ± 4.6 |
| 7C | 49.0 ± 2.0 | 1.4 ± 0.2 | 0.8 ± 0.1 | 2.4 ± 0.7 | 57.7 ± 4.6 |
| 7D | 55.6 ± 1.5 | 1.7 ± 0.2 | 1.2 ± 0.1 | 3.5 ± 0.8 | 62.7 ± 3.6 |
| Comp. Ex. C | 44.4 ± 2.9 | 1.7 ± 0.4 | 0.9 ± 0.1 | 2.5 ± 0.5 | 52.6 ± 3.6 |
| Comp. Ex. D | 51.4 ± 2.3 | 2.2 ± 0.2 | 1.2 ± 0.2 | 3.7 ± 0.6 | 57.4 ± 4.2 |
| Comp. Ex. E | 43.3 ± 2.2 | 1.5 ± 0.3 | 1.0 ± 0.1 | 2.7 ± 0.4 | 51.1 ± 4.7 |
| Comp. Ex. F | 48.9 ± 3.4 | 1.7 ± 0.1 | 1.1 ± 0.1 | 3.1 ± 0.7 | 53.6 ± 4.4 |
| Comp. Ex. G | 46.2 ± 2.7 | 1.7 ± 0.2 | 0.9 ± 0.1 | 2.3 ± 0.3 | 47.0 ± 4.3 |
| Comp. Ex. H | 48.2 ± 1.8 | 1.8 ± 0.1 | 1.1 ± 0.1 | 2.6 ± 0.4 | 52.8 ± 5.3 |

The results show there was no significant difference in wet strength between the handsheets containing additives and the handsheet with no additives (Comparative Example B). However, all of the additives provided a significant increase in dry strength for the handsheets, with 1.5 weight percent of neutral or cationic poly alpha-1,3-glucan fibrids providing the largest increase.

Example 8

Handsheets were formed using the procedure of Example 7 except using a blend of pulp, Tencel® fibers, and neutral poly alpha-1,3-glucan fibrids. Tencel® is a textile fiber made from regenerated cellulose, typically from eucalyptus trees. The pulp used was an 80:20 blend of eucalyptus and Södra black fibers. The eucalyptus fibers were 0.7 mm (SR 19), obtained from Celbi. The Södra Black Z fibers were 2.7 mm (SR 19), obtained from Södra. The Tencel® used was a 1.4 dtex 10 mm fiber, obtained from Lenzing. The amount of pulp in each handsheet was kept constant. The pulp was reduced on a 1:1 basis as the amount of poly alpha-1,3-glucan fibrid was increased. Comparative Example J was prepared without poly alpha-1,3-glucan fibrids. Compositions of the handsheets and their areal density and thickness are provided in Table 21 below.

The poly alpha-1,3-glucan fibrids were dispersed in water at high shear strength using a Unidrive 1000 homogeniser. The dispersion was incorporated in the pulp slurry to target the add-on level along with the 10 mm Tencel® fibers. The slurry was continuously mixed using an IKA propeller stirrer. A given volume (approximately 400 mL) of stock preparation was measured to target an areal density of 60 g·m$^{-2}$.

Air suction was applied to remove the excess water. The resulting sample was a 16 cm diameter handsheet, which was dried unrestrained at room temperature.

The dried webs were re-wetted and hydroentangled using a 0.5 m wide pilot Perfojet hydroentanglement system. The un-bonded web of fibers were passed under a series of high-pressure water jet strips which entangle the fibers of the web. Frictional forces allow these entangled fibers to create a bonded substrate. One injector was used to complete multiple passes, each time the webs were re-fed into the machine they were turned over to allow the opposite side to be entangled. The webs were entangled on both sides at 10 bar and 50 bar. The conveyor mesh and speed were kept constant at 70-mesh and 22 m·min-1, respectively.

The high pressure water can push fibers through the mesh, resulting in a drop in basis weight. Based on sample mass before and after hydroentanglement, poly alpha-1,3-glucan fibrid retention was calculated. It was estimated that in the reference sample, the main fiber loss was pulp as the Tencel® fibers used were 10 mm in length, while the pulp was approximately 2 mm long. The same loss of pulp was estimated in all of the samples. There was 0.15 g loss in the reference sample, and this was assumed to be the standard pulp loss for all the entangled samples. Any other weight loss was attributed to a loss of poly alpha-1,3-glucan fibrids.

Before testing of the webs commenced, they were dried in open air for up to 24 hours. The samples were then tested for areal density, thickness, and dry and wet tensile strength as described for Example 7. Specific tensile strength was determined as follows:

To normalize the data for sample weight, the specific strength is calculated using the following equation:

$$\text{Specific Tensile Strength} = \frac{\text{Tensile Strength}\left[\frac{N}{25\text{ mm}}\right]}{\text{Mass of the Sample [g]}}$$

The average value of 5 replicates for each metric is given in Table 22.

TABLE 21

Handsheet Compositions, Areal Density, and Thickness

| Example | Targeted Composition | Composition Adjusted for Loss after Entanglement | Areal Density [g · m − 2] | Thickness [mm] |
|---|---|---|---|---|
| Comp. Ex. J | 70:30 Pulp:Tencel ® | 67:33 Pulp:Tencel ® | 67.6 ± 0.5 | 1.2 ± 0.02 |
| 8A | 70:25:5 Pulp:Tencel ®:Fibrids | 68:29:3 Pulp:Tencel ®:Fibrids | 66.0 ± 0.6 | 1.2 ± 0.04 |
| 8B | 70:15:15 Pulp:Tencele ®Fibrids | 74:18:8 Pulp:Tencel ®:Fibrids | 61.1 ± 0.9 | 1.0 ± 0.03 |

TABLE 22

Handsheet Properties

| Example | Dry Tensile Strength [N/2.5 mm] | Wet Tensile Strength [N/2.5 mm] | Dry Elongation [%] | Wet Elongation [%] | Dry Specific Tensile Strength (N/g) | Wet Specific Tensile Strength (N/g) |
|---|---|---|---|---|---|---|
| Comp. Ex. J | 25.6 ± 1.0 | 6.0 ± 0.8 | 18.5 ± 1.7 | 26.8 ± 3.3 | 112.4 | 25.8 |
| 8A | 24.6 ± 1.1 | 4.6 ± 0.9 | 11.9 ± 2.6 | 23.4 ± 3.3 | 110.9 | 20.4 |
| 8B | 21.3 ± 1.2 | 1.17 ± 0.2 | 5.8 ± 0.9 | 23.6 ± 2.0 | 111.5 | 5.9 |

The retention of the fibrid in the web after hydroentanglement is between 50 and 60%. There is not much reduction in dry specific tensile strength with the replacement of as much as half of the Tencel® with poly alpha-1,3-glucan fibrids. The wet specific tensile strength, however, is reduced as the amount of Tencel® fibers is reduced and the amount of poly alpha-1,3-glucan fibrids is increased.

What is claimed is:

1. A nonwoven web comprising a nonwoven substrate and
   (a) a graft copolymer comprising:
      (i) a backbone comprising dextran, and
      (ii) poly alpha-1,3-glucan side chains comprising at least about 95% alpha-1,3-glucosidic linkages;
   or
   (b) a crosslinked graft copolymer, wherein the graft copolymer portion of the crosslinked graft copolymer comprises:
      (i) a backbone comprising dextran, and
      (ii) poly alpha-1,3-glucan side chains comprising at least about 50% alpha-1,3-glucosidic linkages.

2. The nonwoven web of claim 1, wherein the nonwoven substrate is an airlaid nonwoven substrate, a multi-bonded airlaid nonwoven substrate, a carded nonwoven substrate, a wet laid nonwoven substrate, a spun lace nonwoven substrate, a meltblown nonwoven substrate, or a spun bond nonwoven substrate.

3. The nonwoven web of claim 1, wherein the nonwoven substrate comprises natural fiber.

4. The nonwoven web of claim 1, further comprising a binder that comprises a polymer polymerized from one or more of acrylic monomers, vinyl monomers, or styrene monomers.

5. The nonwoven web of claim 1, comprising about 0.5 weight percent to about 50 weight percent of the graft copolymer or the crosslinked graft copolymer based on the total weight of the nonwoven substrate and the graft copolymer or the crosslinked graft copolymer.

6. The nonwoven web of claim 1, comprising the graft copolymer of (a).

7. The nonwoven web of claim 6, wherein the nonwoven substrate comprises bicomponent fibers having a side-by-side or sheath/core orientation, and the bicomponent fibers comprise a polyethylene/polyethylene terephthalate composition or at least one of polyolefin, polytetrafluoroethylene, polyester, polyvinyl acetate, polyvinyl chloride acetate, polyvinyl butyral, acrylic resin, polymethylacrylate, polymethylmethacrylate, polyimide, polyvinyl chloride, polyvinylidene chloride, polystyrene, polyvinyl alcohol, polyurethane, or cellulosic resin.

8. An article comprising the nonwoven web of claim 1.

9. The article of claim 8, wherein the article is an absorbing wipe, paper towel, tissue, or napkin.

10. The article of claim 8, wherein the article is a laminate or a pouched laminate.

11. The nonwoven web of claim 1, wherein the nonwoven substrate comprises synthetic fiber.

12. The nonwoven web of claim 11, wherein the synthetic fiber comprises rayon, polyester, polyamide, or polyolefin.

13. The nonwoven web of claim 1, wherein the nonwoven substrate comprises bicomponent fiber.

14. The nonwoven web of claim 1, comprising the crosslinked graft copolymer of (b).

15. The nonwoven web of claim 6, wherein the dextran has a weight-average molecular weight of at least about 100000 Daltons.

16. The article of claim 8, wherein the article is a household product, agricultural product, or medical product.

17. The article of claim 8, wherein the article is a personal care product.

18. The article of claim 17, wherein the personal care product is selected from baby diapers, potty training pants, incontinence products, or feminine hygiene products.

* * * * *